(12) United States Patent
Schulz et al.

(10) Patent No.: US 7,118,796 B2
(45) Date of Patent: Oct. 10, 2006

(54) MULTI-PLY ABSORBENT PAPER PRODUCT HAVING IMPRESSED PATTERN

(75) Inventors: Gayln A. Schulz, Greenville, WI (US); Gary L. Worry, Appleton, WI (US); Kang C. Yeh, Neenah, WI (US); Thomas N. Kershaw, Neenah, WI (US)

(73) Assignee: Fort James Corporation, Atlanta, GA (US)

( * ) Notice: Subject to any disclaimer, the term of this patent is extended or adjusted under 35 U.S.C. 154(b) by 0 days.

(21) Appl. No.: 11/002,651

(22) Filed: Dec. 3, 2004

(65) Prior Publication Data

US 2005/0098281 A1    May 12, 2005

Related U.S. Application Data

(62) Division of application No. 09/564,800, filed on May 5, 2000.

(60) Provisional application No. 60/162,981, filed on Nov. 1, 1999.

(51) Int. Cl.
*B32B 3/00*    (2006.01)
*D21H 11/00*   (2006.01)

(52) U.S. Cl. ............... 428/166; 428/154; 428/172; 162/109

(58) Field of Classification Search ............ 428/154, 428/166, 172; 162/109, 111, 113
See application file for complete search history.

(56) References Cited

U.S. PATENT DOCUMENTS 1,541,977 A    6/1925 Lorenz (Continued)

FOREIGN PATENT DOCUMENTS

DE    298 08 740    8/1998

(Continued)

OTHER PUBLICATIONS

Co-pending parent U.S. Appl. No. 09/564,800, filed May 5, 2000.

(Continued)

*Primary Examiner*—Donald J. Loney
(74) *Attorney, Agent, or Firm*—Finnegan, Henderson, Farabow, Garrett & Dunner, L.L.P.

(57) ABSTRACT

A multi-ply tissue includes a first cellulosic embossed ply having an emboss pattern applied over a portion of its surface and a second cellulosic embossed ply of tissue. The first ply is contact laminated to the second ply so that the primary adhesion between the plies of tissue is the result of contact between cellulosic fibers. The first and second plies contact one another in contact areas, with the contact areas between the first and second plies defining compliant voids. The contact areas between the first ply and the second ply are elongated and/or rounded contact areas. A method of forming a multi-ply tissue involves conveying a base sheet through a nip between an impression roll and a pattern roll to produce an embossed base sheet having a back side possessing projections, applying adhesive to the back side of the embossed base sheet at spaced apart locations, and applying a flat backing sheet to the back side of the embossed base sheet so that the backing sheet adheres to the back side of the embossed base sheet at said spaced apart locations. A method of producing an embossed tissue involves successively conveying a base sheet through a nip between a first impression roll and a pattern roll, and conveying the base sheet through another nip between the pattern roll and a second impression roll, wherein the second impression roll is made of rubber having a lower hardness than the rubber from which the first impression roll is made.

5 Claims, 50 Drawing Sheets

U.S. PATENT DOCUMENTS

| | | |
|---|---|---|
| 2,714,340 A | 8/1955 | Brown |
| RE24,361 E | 9/1957 | Brown |
| 3,399,101 A | 8/1968 | Magid |
| 3,414,459 A | 12/1968 | Wells |
| 3,466,212 A | 9/1969 | Clayton et al. |
| 3,536,561 A | 10/1970 | Griffiths |
| 3,547,723 A | 12/1970 | Gresham |
| 3,556,907 A | 1/1971 | Nystrand |
| 3,650,882 A | 3/1972 | Thomas |
| 3,673,026 A | 6/1972 | Brown |
| 3,708,366 A | 1/1973 | Donnelly |
| 3,940,529 A | 2/1976 | Hepford et al. |
| 3,953,638 A | 4/1976 | Kemp |
| 4,100,017 A | 7/1978 | Flautt, Jr. |
| 4,320,162 A | 3/1982 | Schulz |
| 4,441,962 A | 4/1984 | Osborn, III |
| 4,483,728 A | 11/1984 | Bauernfeind |
| 4,543,142 A | 9/1985 | Kuepper et al. |
| 5,093,068 A | 3/1992 | Schulz |
| 5,215,617 A | 6/1993 | Grupe |
| 5,269,983 A | 12/1993 | Schulz |
| 5,686,168 A | 11/1997 | Laurent et al. |
| 5,695,607 A | 12/1997 | Oriaran et al. |
| 5,736,223 A | 4/1998 | Laurent |
| 5,743,999 A | 4/1998 | Kamps et al. |
| 5,817,400 A | 10/1998 | Chen et al. |
| 5,840,404 A | 11/1998 | Graff |

FOREIGN PATENT DOCUMENTS

| | | |
|---|---|---|
| EP | 1 096 069 A2 | 5/2001 |
| GB | 2255745 A | 11/1992 |
| IT | 324796 | 2/1935 |
| JP | 54-156071 | 12/1979 |

OTHER PUBLICATIONS

European Search Report for Application No. 00 12 3758 (EP 1 096 069 A2).

Office Action dated Jul. 17, 2006, in Application No. 09/564,800.

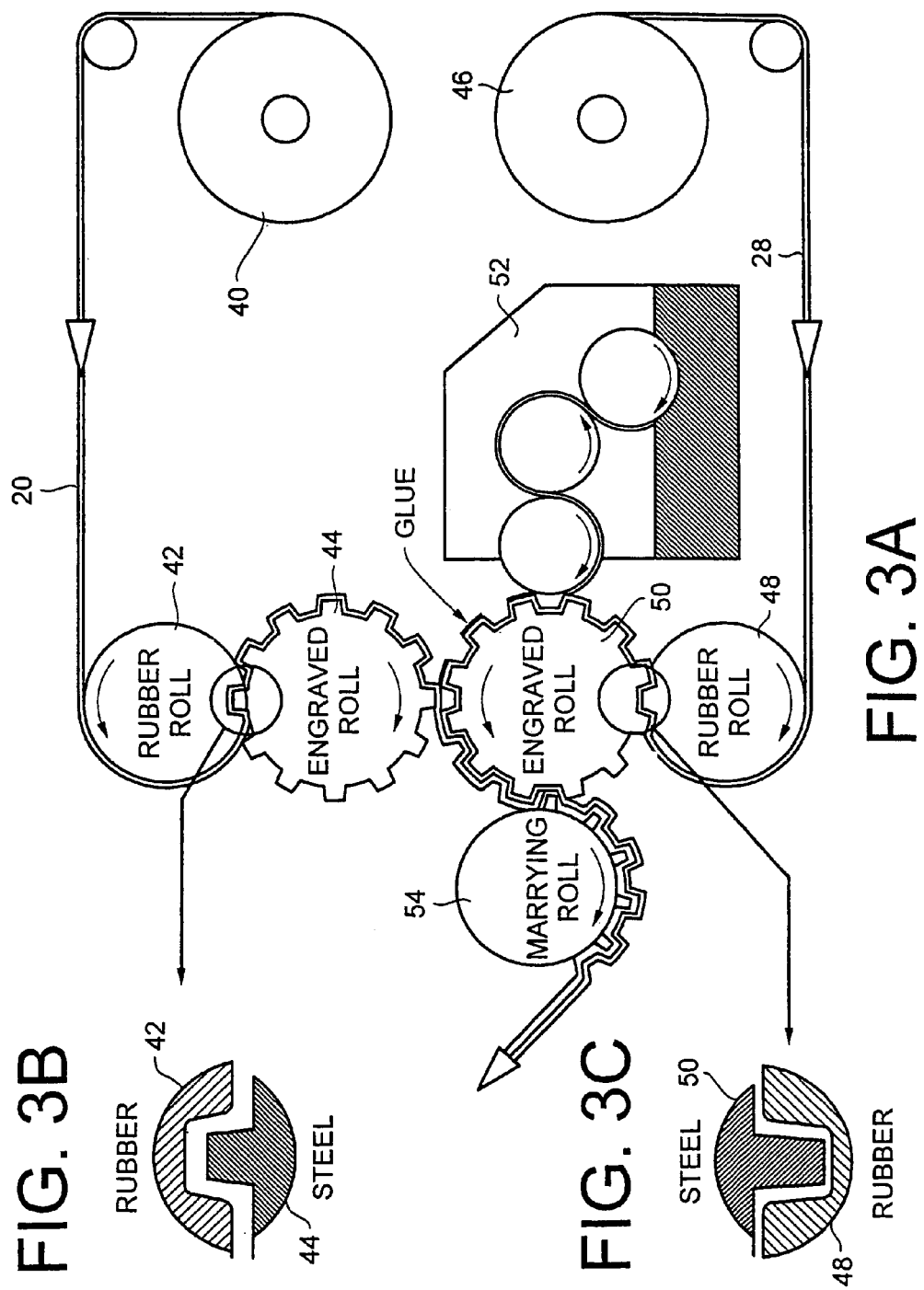

THE COMPARISON BETWEEN DIFFERENTIAL DEPTH EMBOSSING (DDE) AND CONVENTIONAL EMBOSSING

THE COMPARISON BETWEEN DIFFERENTIAL DEPTH EMBOSSING (DDE) AND CONVENTIONAL EMBOSSING

THE COMPARISON BETWEEN DIFFERENTIAL DEPTH EMBOSSING (DDE) AND CONVENTIONAL EMBOSSING

THE COMPARISON BETWEEN DIFFERENTIAL DEPTH EMBOSSING (DDE) AND CONVENTIONAL EMBOSSING

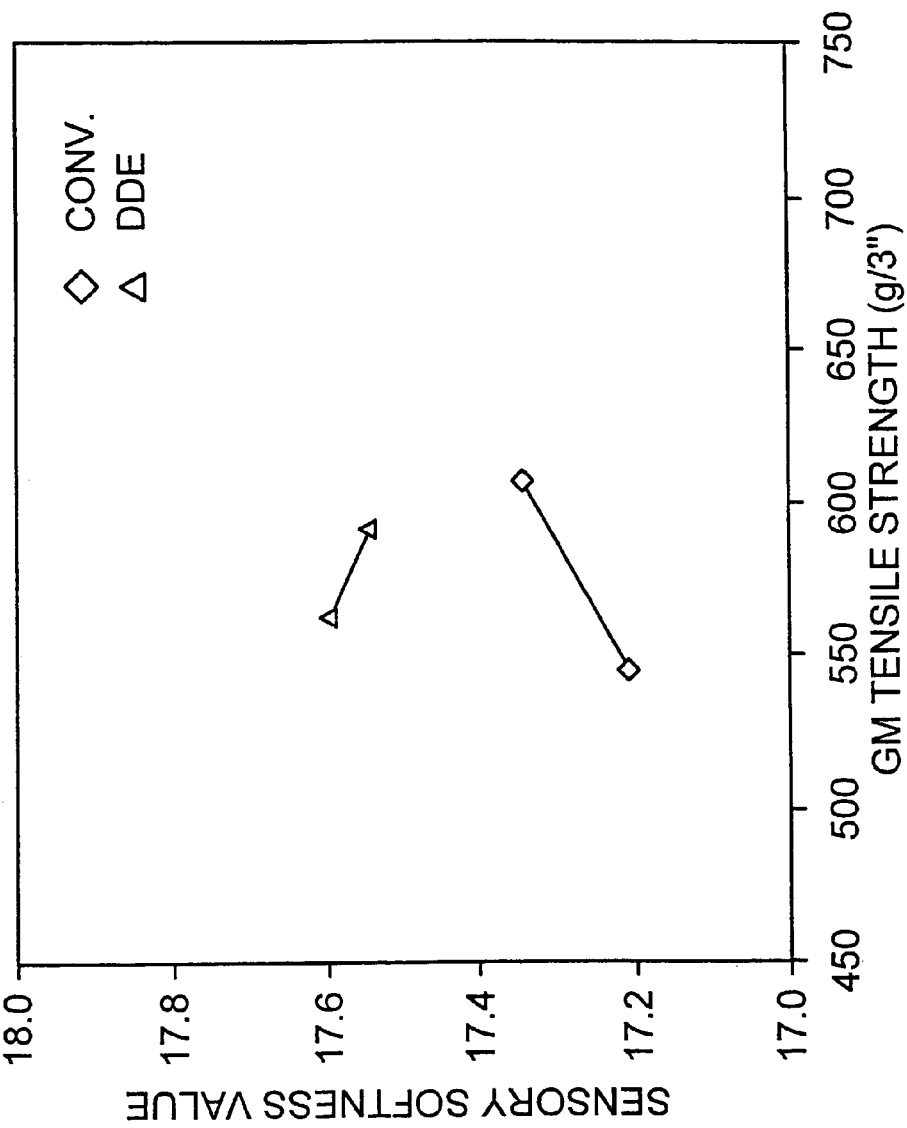

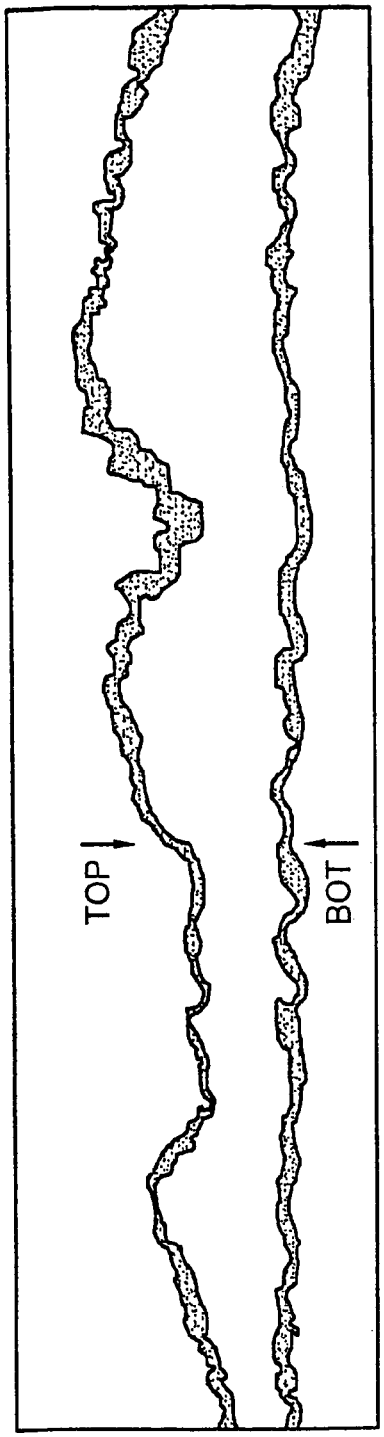
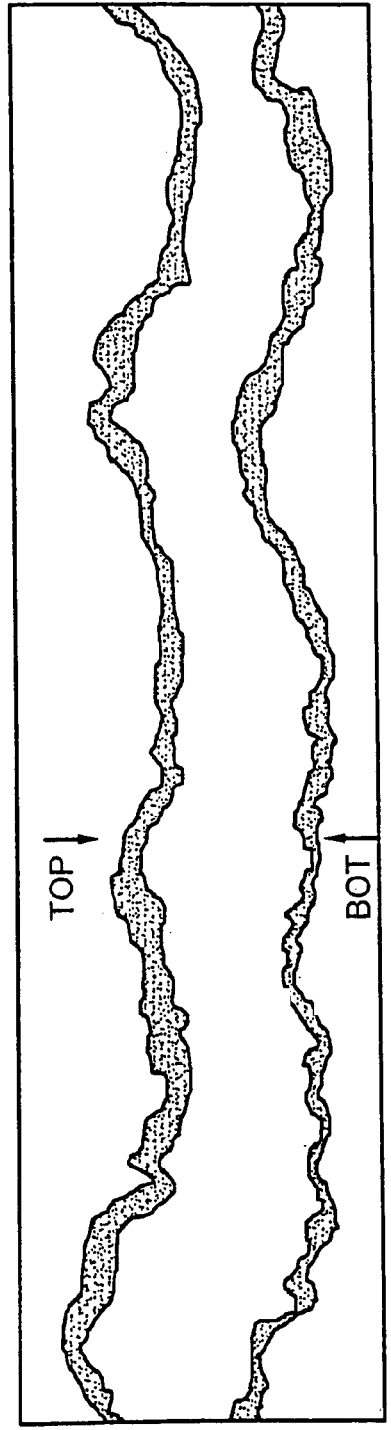
FIG. 19A
FIG. 19B

DDE PROCESS

CONVENTIONAL PROCESS

DDE PROCESS

CONVENTIONAL PROCESS

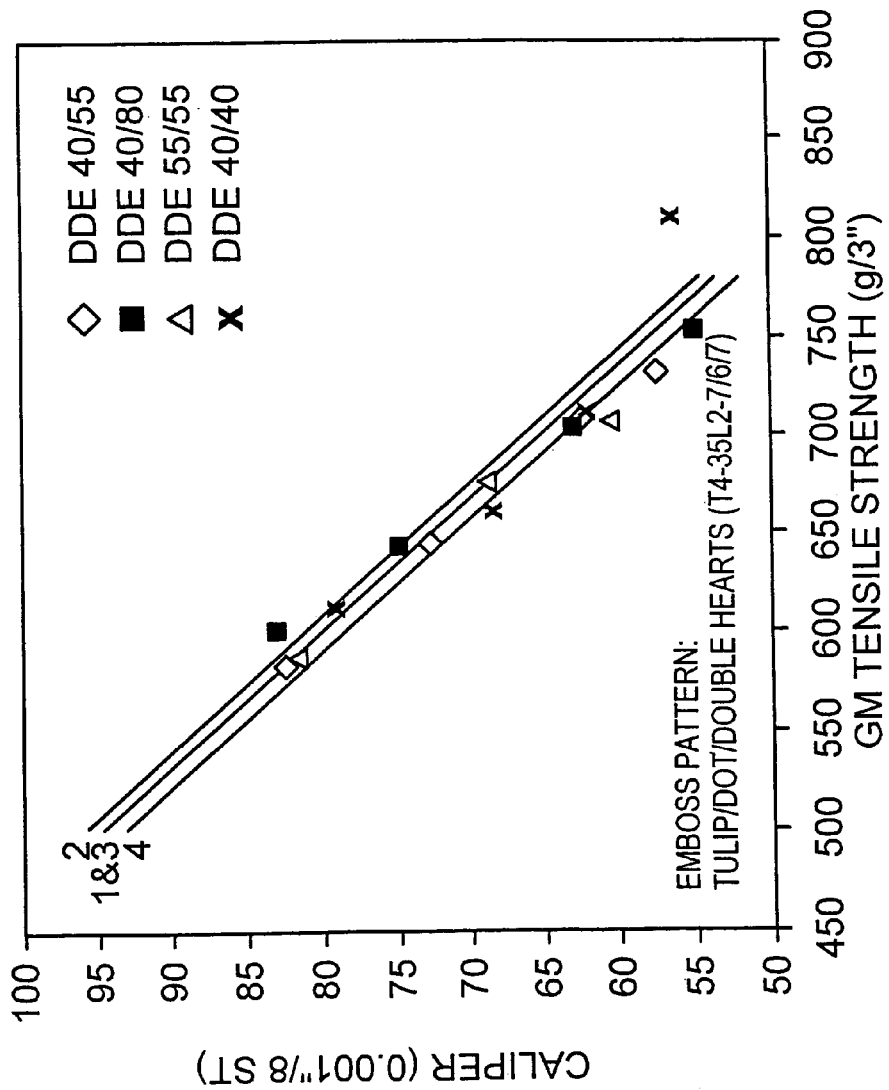

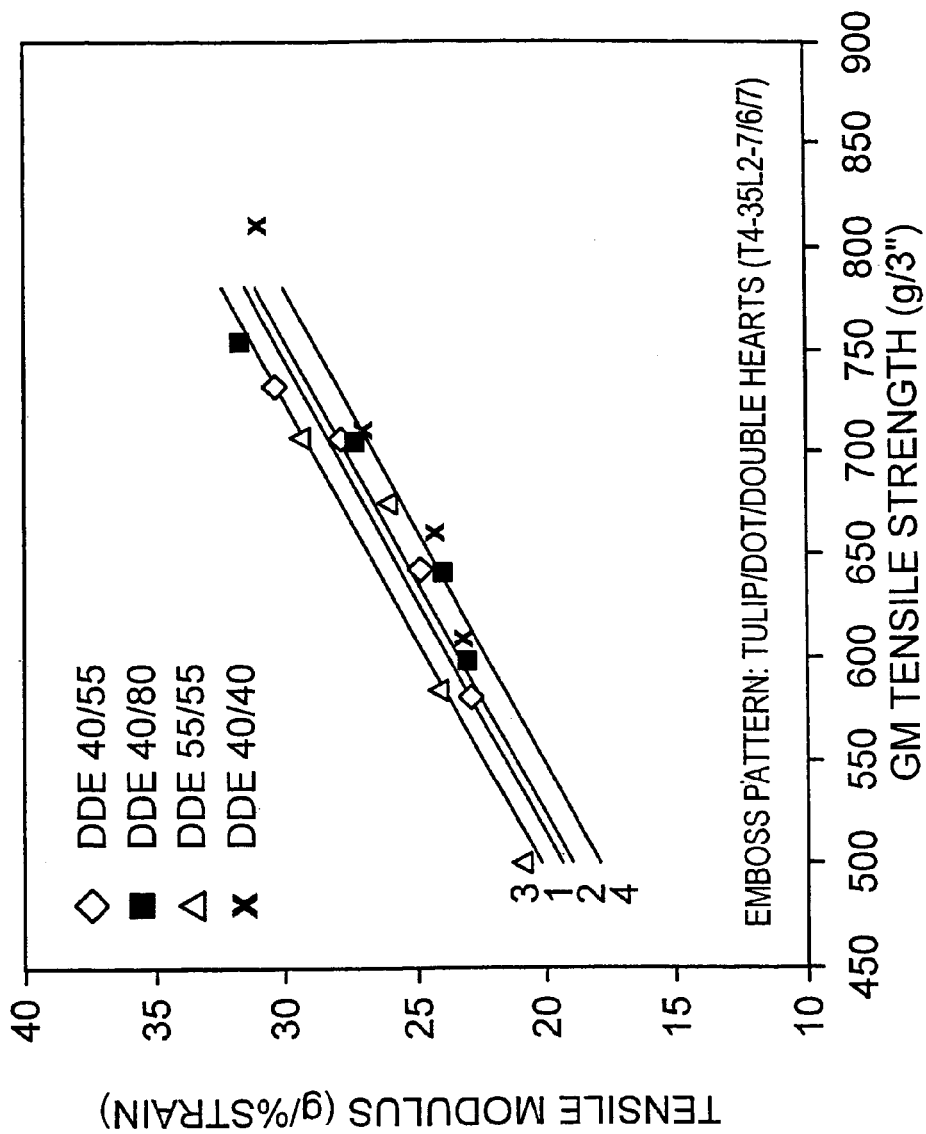

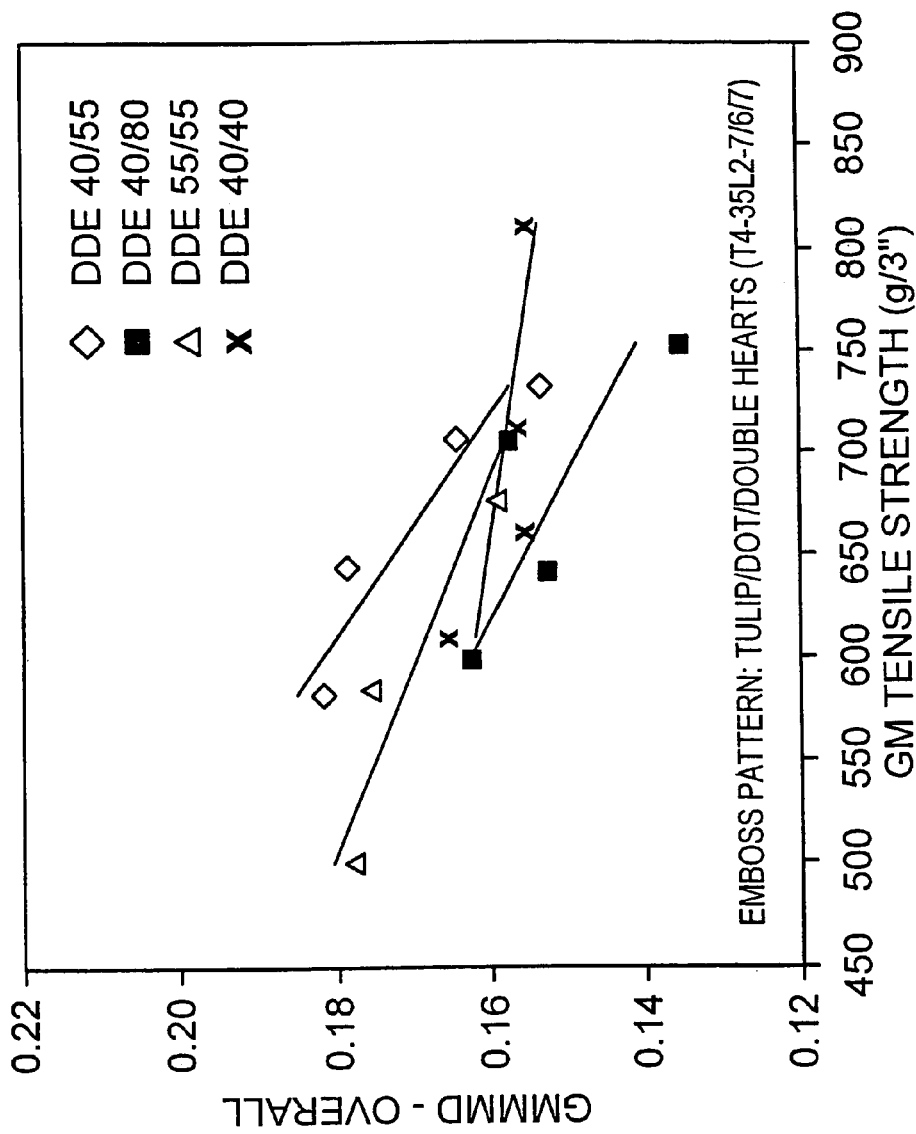

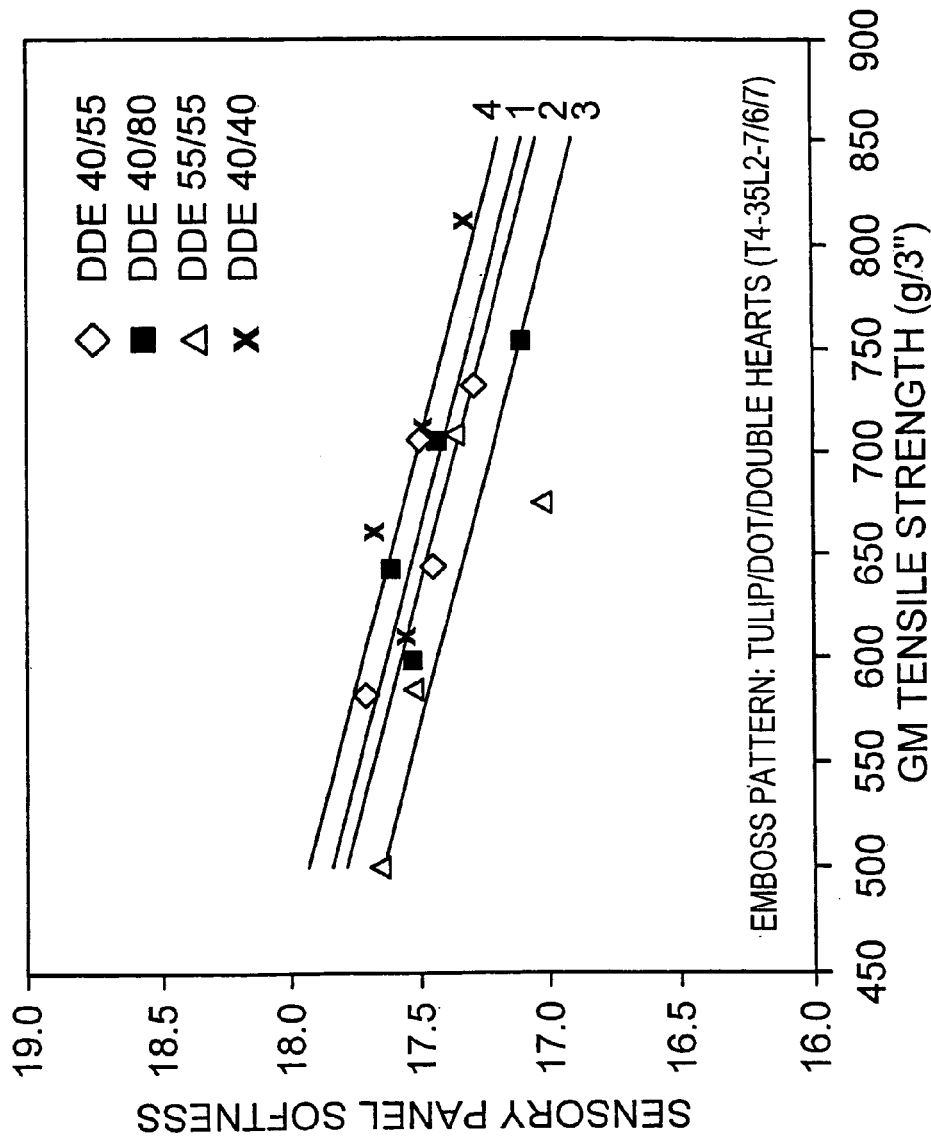

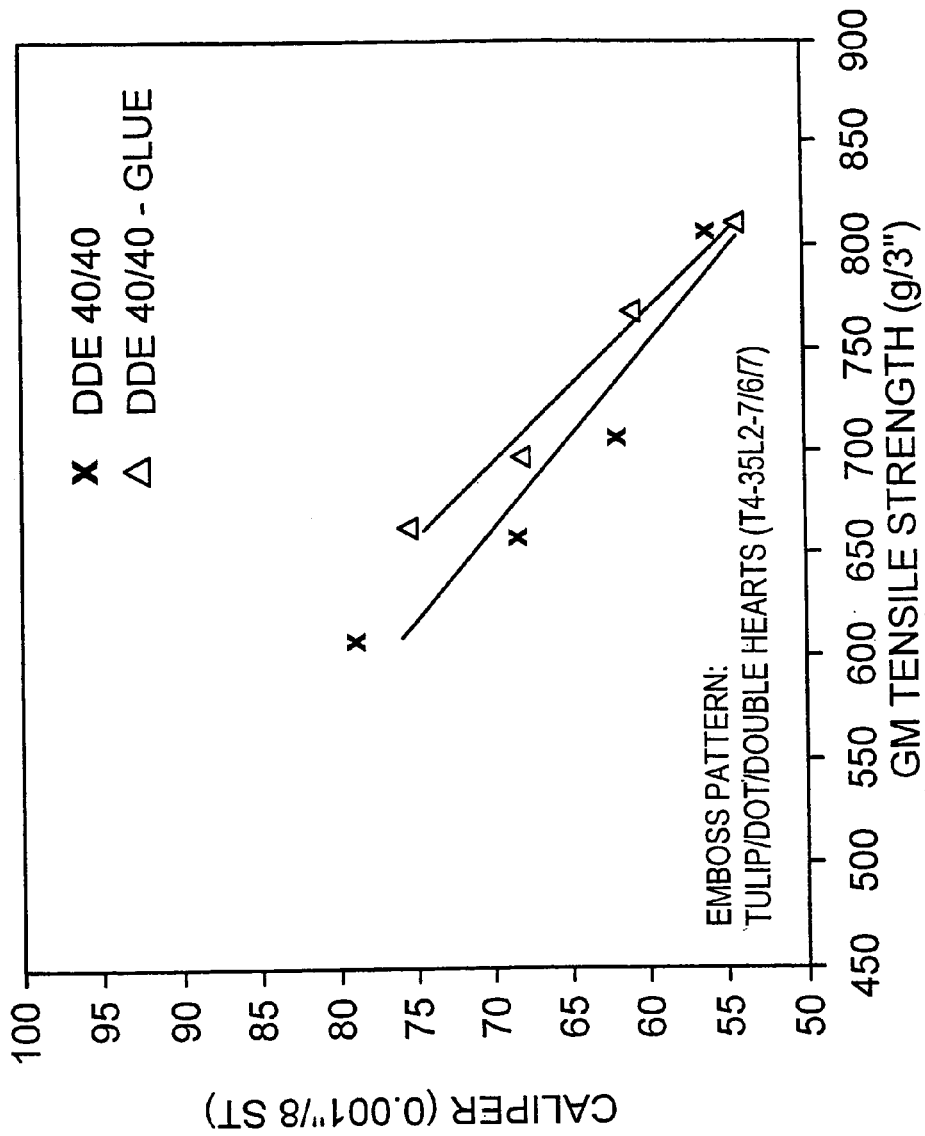

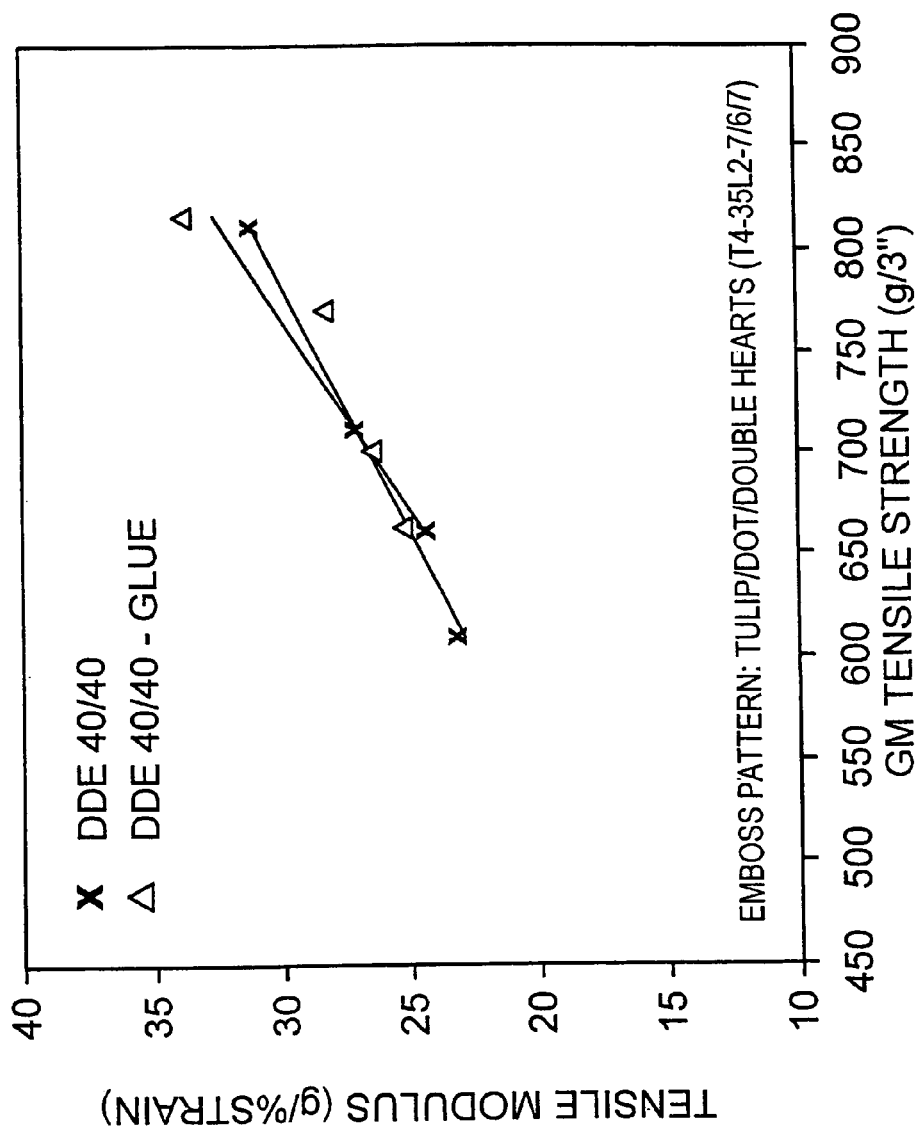

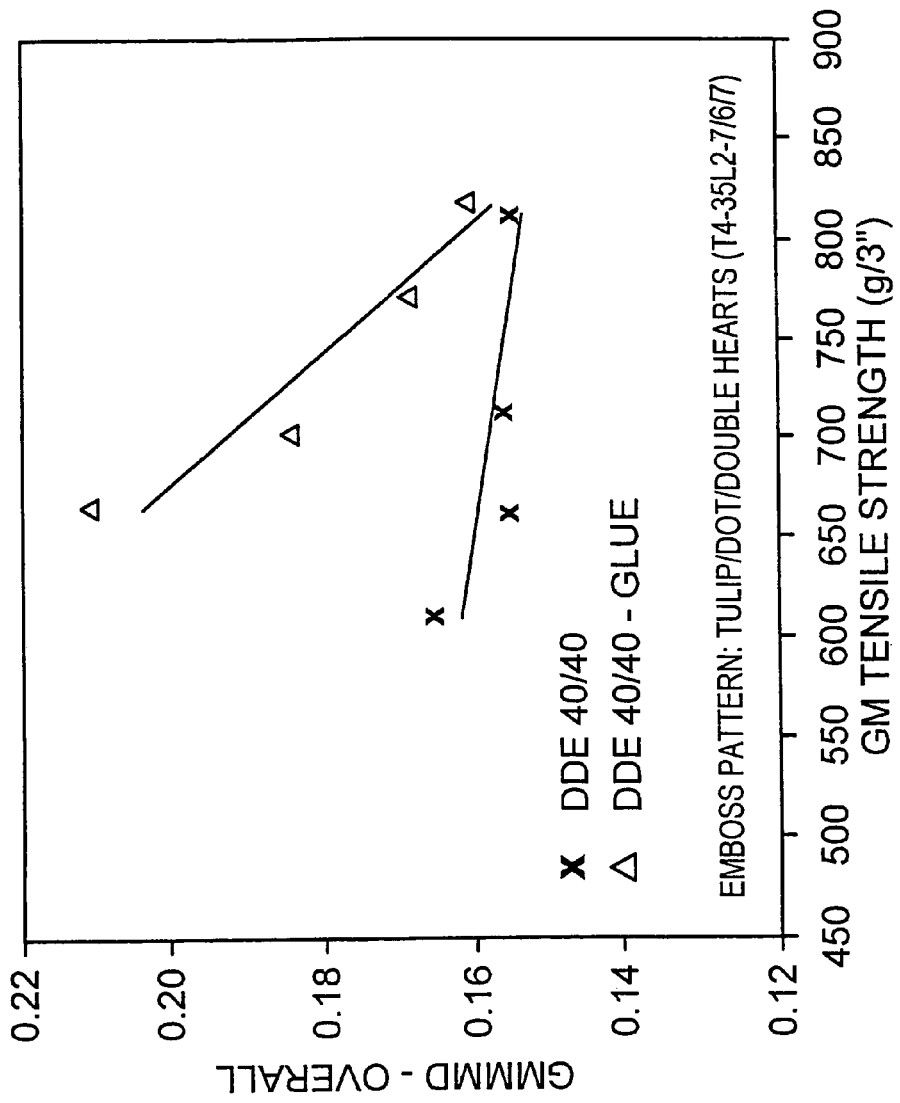

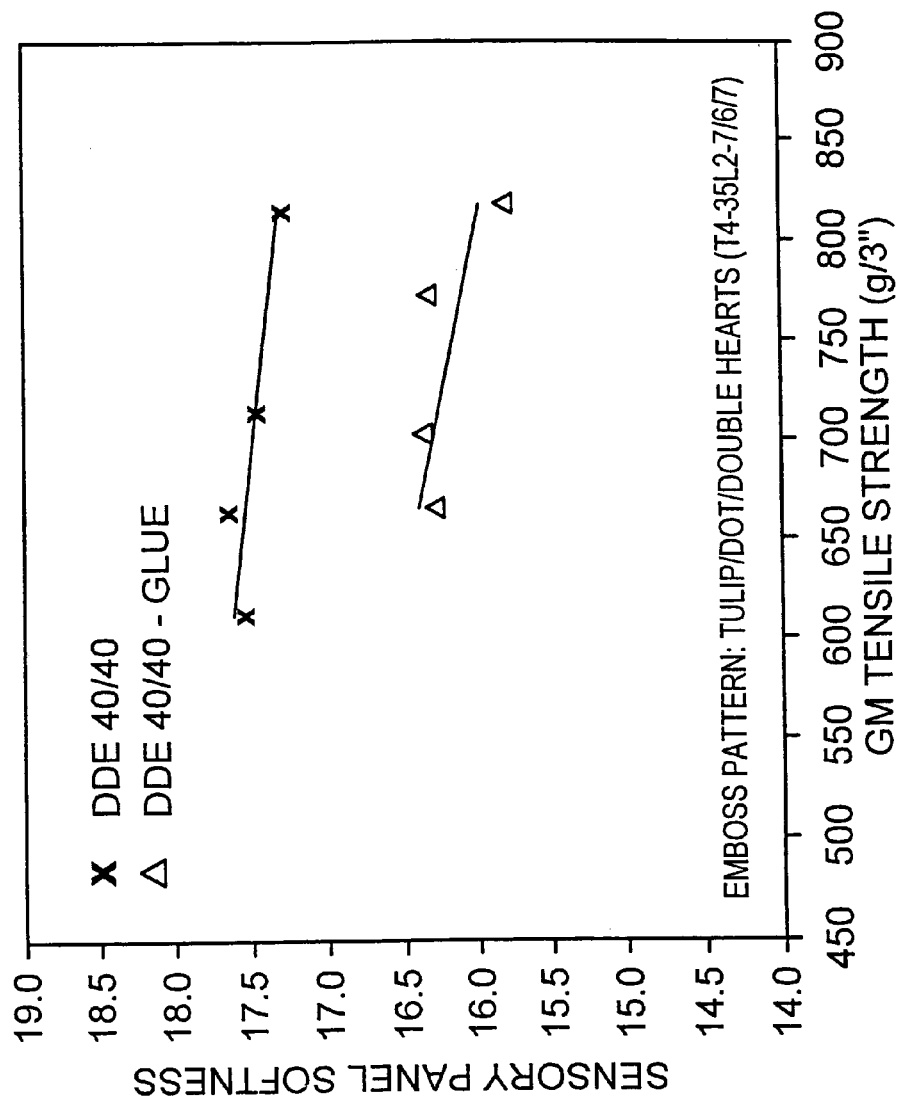

EFFECT OF ADHESIVE ON DDE TISSUE PRODUCT

EFFECT OF EMBOSS PATTERN/PROCESS ON 2-PLY TISSUE PRODUCT

MULTI-PLY ABSORBENT PAPER PRODUCT HAVING IMPRESSED PATTERN

This application is a division of U.S. application Ser. No. 09/564,800, filed May 5, 2000, which claims priority to and the benefits under 35 U.S.C. § 119(e) of U.S. Application Ser. No. 60/162,981, filed Nov. 1, 1999, both of which are incorporated herein by reference in their entireties.

FIELD OF THE INVENTION

This invention generally relates to absorbent paper products, including tissue paper, towels, wipes and napkins. More particularly, the present invention pertains to an embossed multi-ply absorbent paper product.

BACKGROUND OF THE INVENTION

Consumer acceptance of absorbent paper products such as tissue paper products and the like is influenced by the perceived softness of the tissue product. Indeed, the consumer's perception of the desirability of one tissue product over another is based in significant respects on the perceived relative softness of the tissue products; the tissue product that is perceived to be more soft is typically perceived to be more acceptable.

Thus, tissue paper should ideally possess a relatively high emboss definition and bulk, and a relatively high degree of perceived puffiness and softness. The emboss definition and bulk of the tissue paper is commonly found to affect the perceived softness of the tissue paper. In addition, the tissue paper should possess sufficient strength. However, it is typically the case that improving one or more of these parameters of the tissue paper adversely affects one or more of the other parameters. For example, applying a very heavy embossing to the tissue product increases the embossing definition and bulk of the tissue paper, but also increases the friction so that the perceived softness is reduced. Also, a reduction in the strength of the tissue product results. On the other hand, a less heavily embossed tissue product might possess better strength characteristics and smoothness attributes, but the perceived puffiness and softness of the tissue product would be adversely affected.

Conventional deep embossing of two-ply tissue paper involves conveying two plies of tissue paper through a nip formed between a steel roll and a rubber roll. While this type of embossing is able to provide better emboss definition and puffiness, it also increases the back side friction which thus reduces tissue softness. Also, the rather heavy embossing adversely affects the strength of the resulting multi-ply tissue.

U.S. Pat. No. 3,708,366 describes a method of producing two-ply paper towel in which one ply is more severely embossed than the other ply. This patent is not specifically related to the manufacture of tissue paper products. Moreover, the patent describes that the preferred embossments are in the shape of a frustum of a cone. This embossment shape produces non-elongated and rather sharply defined contact regions between the two plies which have been found to result in a paper towel product having a rather harsh feel. While this resulting feel of the product may be acceptable from the standpoint of paper towel products such as that with which the aforementioned patent is concerned, it is a result that is not well suited for tissue paper products.

There thus exists a need for a tissue product having better perceived softness and bulk along with better emboss definition, without unduly degrading the strength characteristics of the tissue product.

A need also exists for a tissue that is heavily embossed, but which does not have the roughened characteristics typically associated with such heavily embossed tissue. When multiple sheets are embossed together, the nubs or protuberances on the back side of the tissue are perceived as being rough by the consumer.

A need also exists for a one ply embossed sheet that does not possess a two-sided look or appearance. One ply embossed sheets are typically embossed with matched steel-to-steel rolls and this produces the undesirable two sided look or appearance. Aside from this, the use of steel-to-steel emboss rolls to produce the one ply embossed tissue creates undesirable paper dust and has a tendency to damage the steel emboss rolls.

SUMMARY OF THE INVENTION

According to one aspect of the invention, a multi-ply tissue includes a first cellulosic embossed ply having an emboss pattern applied over from three to twelve percent of its surface to a depth of at least about thirty thousandths of an inch, and a second cellulosic embossed ply of tissue in which the depth of emboss applied to the second ply is no more than about 80% of the depth of emboss applied to the first ply. The first ply is contact laminated to the second ply, with the primary adhesion between the plies of tissue being the result of contact between cellulosic fibers rather than through an intermediate adhesive. The first and second plies contact one another in contact areas, with the contact areas between the first and second plies defining compliant voids and with the total contact area being no more than about fifteen percent of the area of the tissue sheets.

According to another aspect of the invention, a method of producing a two ply tissue involves embossing a first ply of tissue so that the first ply of tissue possesses an emboss pattern and embossing a second ply of tissue so that the second ply of tissue possesses an emboss pattern, with the first ply being more heavily embossed than the second ply. The first and second plies are nested together to contact laminate the first ply to the second ply with contact areas between the first and second plies, the contact areas being elongated or gently rounded.

In accordance with another aspect of the invention, a method of producing a two ply tissue involves conveying a base sheet through a nip between an impression roll sometimes made of rubber and a pattern roll sometimes made of steel to emboss a pattern on the base sheet and produce an embossed base sheet having a back side possessing projections produced by the pattern roll, applying adhesive to the back side of the embossed base sheet at spaced apart locations so that portions of the back side of the embossed base sheet between the projections are devoid of adhesive, and applying a flat backing sheet that is devoid of embossing to the back side of the embossed base sheet to cause the backing sheet to adhere to the back side of the embossed base sheet at the spaced apart locations.

A still further aspect of the invention involves a multi-ply sheet that includes an embossed base sheet having a back side possessing projections, adhesive on the back side of the embossed base sheet at spaced apart locations so that portions of the back side of the embossed base sheet between the projections are devoid of adhesive, and a flat backing sheet devoid of embossing and adhered to the back side of the embossed base sheet at the spaced apart locations.

Another aspect of the invention involves a method of producing an embossed tissue that involves conveying a base sheet through a nip between a first impression roll and a pattern roll to push portions of the base sheet into indented portions of the pattern roll, conveying the base sheet through a nip between the pattern roll and a second impression roll made of rubber having a lower hardness than the rubber from which the first impression roll is made to push the portions of the base sheet further into the indented portions of the pattern roll to produce an embossed tissue.

BRIEF DESCRIPTION OF THE DRAWING FIGURES

The foregoing and additional details and features associated with the present invention will become more apparent from the following detailed description considered with reference to the accompanying drawing figures in which like elements are designated by like reference numerals and wherein:

FIG. 3A is a schematic illustration of an alternative arrangement for carrying out double depth embossing in accordance with the present invention;

FIG. 3B is a cross-sectional view of a portion of the interface between one of the pattern rolls and one of the impression rolls shown in FIG. 3A;

FIG. 3C is a cross-sectional view of a portion of the interface between the other pattern roll and impression roll used in the apparatus shown in FIG. 3A;

FIG. 17 is a graph of GM tensile strength versus sensory softness value comparing the embossing technique of the present invention and conventional embossing;

FIG. 19a is a magnified cross-sectional view of a multi-ply tissue produced in accordance with the embossing technique of the present invention;

FIG. 19b is a magnified cross-sectional view of a multi-ply tissue produced in accordance with conventional embossing;

FIG. 22 is a graph of GM tensile illustrating the effect of different rubber hardness of the impression roll;

FIG. 23 is a graph of GM tensile strength versus tensile modulus illustrating the effect of different rubber hardness of the impression roll;

FIG. 24 is a graph of GM tensile strength versus GMMMD illustrating the effect of rubber hardness of the impression roll on the tissue product;

FIG. 25 is a graph of GM tensile strength versus sensory panel softness illustrating the effect of rubber hardness of the impression roll on the tissue product formed in accordance with the present invention;

FIG. 26 is a graph of GM tensile strength versus caliper illustrating the effect of adhesive on a tissue product produced in accordance with the embossing technique of the present invention;

FIG. 27 is a graph of GM tensile strength versus tensile modulus illustrating the effect of adhesive on the tissue product produced in accordance with the embossing technique of the present invention;

FIG. 28 is a graph of GM tensile strength versus GMMMD illustrating the effect of adhesive on the tissue product produced in accordance with the embossing technique of the present invention;

FIG. 29 is a graph of GM tensile strength versus sensory panel softness illustrating the effect of adhesive on the tissue product produced in accordance with the embossing technique of the present invention;

DETAILED DESCRIPTION OF THE INVENTION

Figure 1:
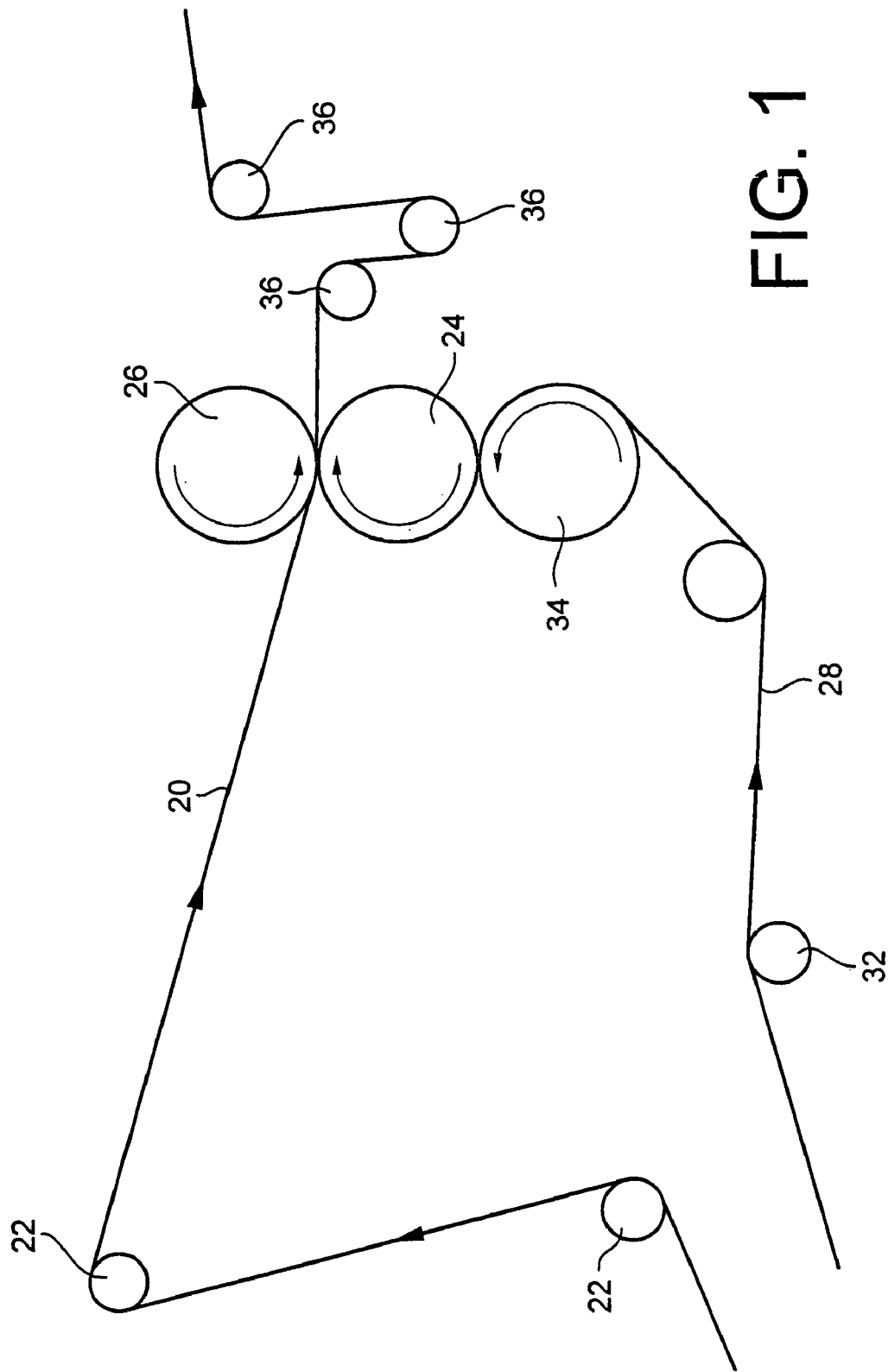
FIG. 1 is a schematic illustration of an apparatus for embossing a paper product in accordance with one aspect of the present invention.

Generally speaking, one aspect of the present invention relates to a multi-ply absorbent paper product possessing what is termed a differential depth emboss that contributes to imparting highly desirable characteristics and properties to the multi-ply paper product. One of the plies forming the multi-ply paper product is embossed relatively heavily while the other ply is relatively lightly embossed. By embossing one ply more heavily than the other, the resulting multi-ply paper product possesses better perceived softness and bulk along with better emboss definition, yet the strength of the resulting multi-ply paper product is not unduly degraded. The preservation of product strength results from less emboss damage of the lightly embossed ply. In accordance with the present invention, the differential depth emboss maintains a good emboss definition on the outside of the multi-ply paper product by virtue of the heavily embossed ply while at the same time reducing the backside friction. The differential depth embossing process deeply embosses the top ply first through higher penetration depth or higher nip pressure. The top ply is then joined to or nested with the bottom ply through a second nip which imparts shallower embossing through lower penetration depth or lower nip pressure.

The improved properties and characteristics of the multi-ply paper product associated with the present invention is also achieved by using the differential depth embossing in conjunction with an embossing pattern having particular characteristics. When the first and second plies are nested together, the plies become contact laminated to one another so that the primary adhesion between the sheets is the result of contact between cellulosic fibers rather than through an intermediate adhesive. The embossed pattern is specifically designed to avoid non-elongated sharply defined contact regions as it has been found through developmental efforts that contact regions having these characteristics produce a rather harsh feeling sheet. In the present invention, the embossed pattern is configured so that the contact region is either elongated and sharply defined (having a small radius of curvature along the edge between the emboss and the background) or non-elongated and gently rounded. The voids defined by these contact regions are thus compliant. The combination of the differential depth embossing and the particular characteristics of the embossed pattern together results in a multi-ply paper product such as tissue paper having significantly increased softness and puffiness characteristics, and improved bulk and emboss definition as compared to other known tissue products while at the same time possessing strength characteristics not commonly found in tissue paper having such attributes.

The present invention as described in more detail below has application to multi-ply paper products in which characteristics such as are softness, puffiness, bulk and emboss definition contribute to perceived product desirability. The paper products include absorbent paper, bathroom and facial tissue, napkins and towels. The detailed description set forth below makes reference to tissue paper, but it is to be understood that the present invention is equally applicable to these other types of multi-ply paper products.

The multi-ply tissue product according to the present invention is fabricated using the apparatus shown in FIG. 1. To produce the differential depth embossed tissue, a first tissue ply 20 is conveyed past a series of idler rollers 22 towards the nip that is located between a pattern roll 24 which may be made of steel and an impression roll 26 which may be made of rubber. The pattern roll 24 rotates in the clockwise direction while the impression roll 26 rotates in the counterclockwise direction. The first tissue ply 20 forms the bottom ply in the resulting multi-ply tissue.

A second tissue ply 28 is conveyed around an idler roller 32 and is then passed into a nip located between an impression roll 34 which may be made of rubber and the pattern roll 24. The second tissue ply 28 is adapted to form the top ply in the resulting multi-ply tissue. The second tissue ply 28 is rewound around the pattern roll 24 to form the outside of the multi-ply tissue. As the second tissue ply 28 passes through the nip between the pattern roll 24 and the impression roll 34, the second tissue ply 28 is heavily embossed. This heavy embossing of the second tissue ply imparts a high degree of emboss definition and perceived puffiness to the second tissue ply 28.

In contrast, the first tissue ply 20 that is fed through the nip between the pattern roll 24 and the impression roll 26 is only lightly embossed. That is, the first tissue ply is embossed to a lesser degree than the second tissue ply 28. The lightly embossed first tissue ply 20 is joined to or nested with the heavily embossed second tissue ply 28 at the nip between the pattern roll 24 and the impression roll 26. By virtue of being rewound on the pattern roll 24 and joined to the first tissue ply, the relatively high friction on the heavily embossed second tissue ply 28 faces towards the lightly embossed first tissue ply 20. By virtue of the relatively light embossing that occurs at the nip between the pattern roll 24 and the impression roll 26, the bottom side or inside of the two-ply tissue possesses a relatively low friction and thus a better perceived softness. The resulting multi-ply tissue exiting from the nip between the pattern roll 24 and the impression roll 26 is passed around a series of idler rolls 36 and is then wound on a take-up roll (not shown).

As mentioned above, the second tissue ply 28 is rather heavily embossed whereas the first tissue ply 20 is rather lightly embossed. This difference in the degree of embossment can be achieved in several ways. For example, the impression rolls 26, 34 can be made of materials having different degrees of softness to allow a higher penetration depth in the case of the nip between the pattern roll 24 and the impression roll 34 as compared to the nip between the pattern roll 24 and the impression roll 26. Alternatively, greater pressure can be applied at the nip between the pattern roll 24 and the impression roll 34 as compared to the nip between the pattern roll 24 and the impression roll 26. With the use of more pressure to achieve the different penetration depth, the impression rolls 26, 34 can have the same hardness or softness characteristics (e.g., 40–80 Shore Durometer A).

Figure 2:
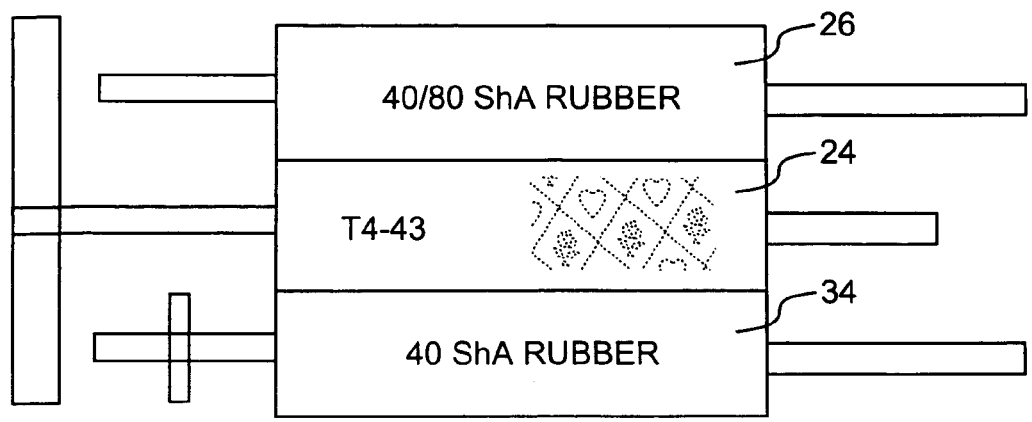
FIG. 2 is a front view of the roller arrangement used in the apparatus shown in FIG. 1.

FIG. 2 illustrates the emboss roll 24 situated between the two impression rolls 26, 34. FIG. 2 also illustrates one example of the pattern on the pattern roll 24 that has been found to produce, in conjunction with the differential depth emboss described above, multi-ply paper products such as tissues having better perceived softness and bulk along with better emboss definition yet without unduly degrading the strength of the multi-ply tissue. The characteristics of the emboss pattern and the way in which such characteristics contribute to the overall advantageous attributes of the multi-ply tissue will be discussed in more detail below.

FIG. 3A illustrates a slightly modified form of the apparatus for carrying out the differential depth embossing. Here, the first tissue ply 20 is fed from an unwinder 40 to the nip located between an impression roll 42 which may be made of rubber and a first pattern roll 44 which may be made of steel. The first tissue ply 20 is lightly embossed as it passes through the nip between the impression roll 42 and the first pattern roll 44. At the same time, the second tissue ply 28 is fed from an unwinder 46 towards the nip located between an impression roll 48 which may be made of rubber and a second pattern roll 50 which may be made of steel. The nip between the impression roll 48 and the second pattern roll 50 is designed to impart a heavy emboss to the second tissue ply 28.

FIG. 3B illustrates that the light emboss can be achieved by allowing the engravings on the first pattern roll 44 to penetrate into the impression roll 42 to a lesser extent as compared to the heavy emboss that is applied to the second tissue ply 28. This can be accomplished by using less pressure or by using an impression roll 42 made of a material that is not as easily penetrated as the impression roll 48, and/or by using a pattern roll 44 less engraved than the pattern roll 50. As shown in FIG. 3C, the heavy emboss applied to the second tissue ply 28 can be achieved by the engravings on the pattern roll 50 penetrating more deeply into the impression roll 48 through the use of greater pressure of a softer material for the impression roll 48, and/or deeper embossment on the pattern roller 50.

After the heavily embossed second tissue ply 28 passes through the nip between the impression roll 48 and the pattern roll 50, a gluing unit 52 applies glue to the projections that are formed on the exterior surface of the embossed second tissue ply 28 by virtue of the embossing. The heavily embossed second tissue ply 28 with the applied glue then advances further to a nip between the pattern roll 44 and the pattern roll 50. At this point, the lightly embossed first tissue ply 20 is nested with the heavily embossed second tissue ply 28 and are then conveyed around a marrying roll 54 and subsequently wound.

Figure 4A:
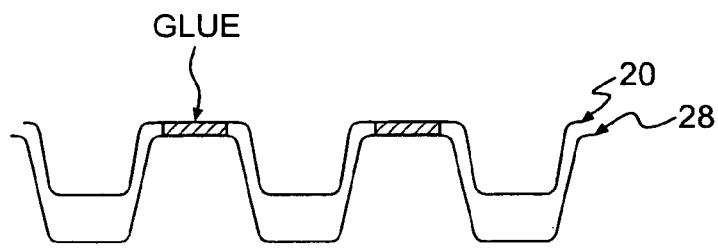
FIG. 4A is a schematic illustration of a multi-ply paper product produced in accordance with the present invention.
Figure 4B:
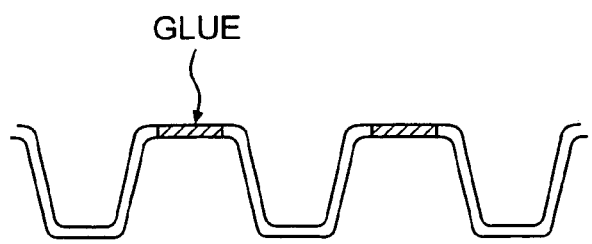
FIG. 4B is a schematic illustration of a multi-ply tissue product produced in accordance with known methods.

FIG. 4A generally illustrates the multi-ply tissue that results from the differential depth embossing technique illustrated in FIG. 3A. For comparison purposes, FIG. 4B illustrates a conventional multi-ply tissue formed by conveying two tissue plies through the nip formed between a steel engraved roll and a rubber roll. As can be seen, the two tissues forming the conventional multi-ply tissue are deeply nested within one another. In this conventional multi-ply tissue, the tissue may possess desirable emboss definition and perceived puffiness characteristics, but the tissue will be rather rough. In contrast, in the multi-ply tissue of the present invention as shown in FIG. 4A, the tissue will not only possess better perceived softness and bulk along with better emboss definition, but will also possess desirable strength characteristics by virtue of the lightly embossed first tissue ply 20.

Figure 5:
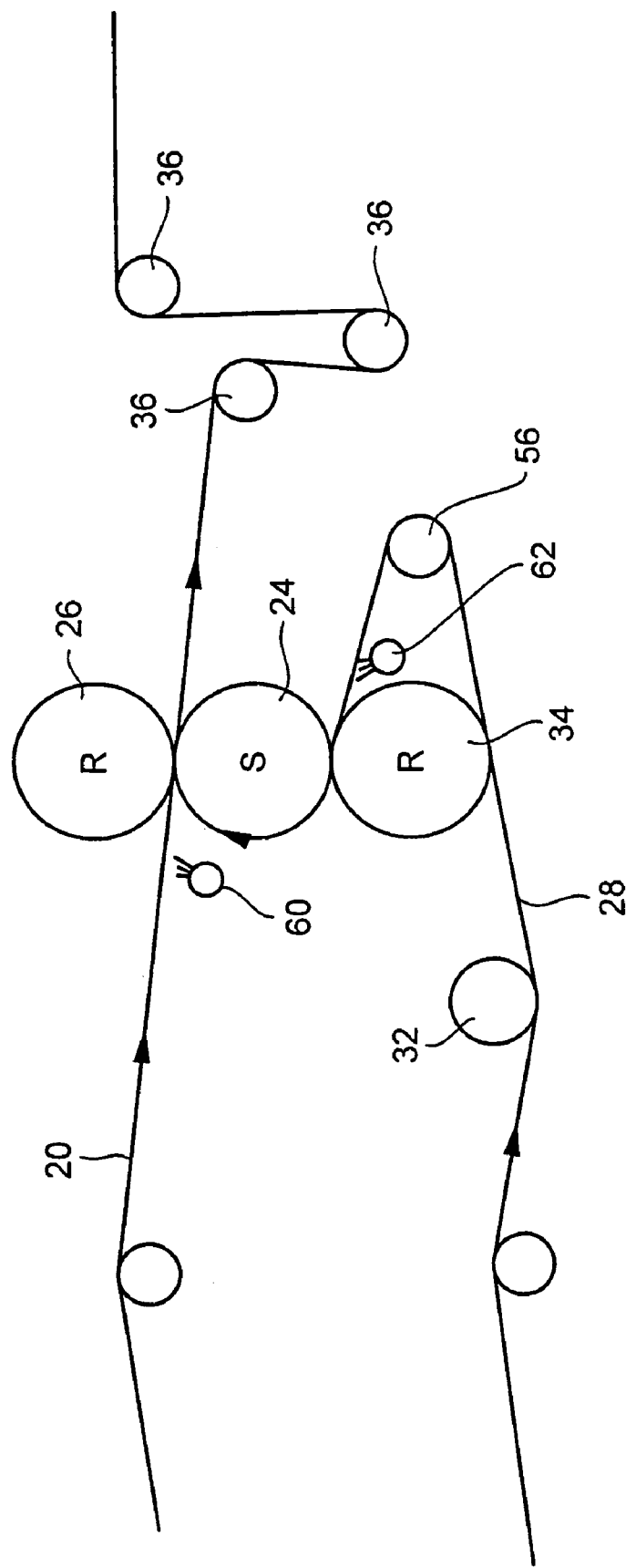
FIG. 5 is a schematic illustration of another apparatus for embossing a paper product in accordance with another aspect of the present invention.

FIG. 5 illustrates another variation on the apparatus shown in FIG. 1. In this version shown in FIG. 5, two preconditioning mechanisms 60, 62 are provided for preconditioning each of the tissue plies 20, 28 prior to entering the respective nips. The preconditioning mechanisms 60, 62 are designed to impart moisture and/or heat to the tissue plies 20, 28. The preconditioning mechanisms 60, 62 can be designed to apply moisture and heat to the tissue plies 20, 28 at the same time or can be designed to individually apply steam or moisture and heat to the tissue plies 20, 28 in successive stages. As a further alternative, the preconditioning mechanisms 60, 62 can be designed to apply only moisture or only heat to the tissue plies 20, 28. In a preferred form of the invention, the preconditioning mechanisms 60, 62 are in the form of steam showers that apply a combination of moisture and heat to the tissue plies 20, 28.

A first one of the preconditioning mechanisms 60 is positioned upstream of the nip located between the pattern roll 24 and the impression role 26 and a second one of the preconditioning mechanisms 62 is positioned upstream of the nip located between the pattern roll 24 and the impression roll 34. An additional idler roll 56 is also provided at the position shown in FIG. 5. The second tissue ply 28 is conveyed around this idler roll 56 prior to being subjected to the preconditioning treatment (i.e., moisture and/or heat) by the second preconditioning mechanism 62.

Although the arrangement shown in FIG. 5 has been found advantageous from the standpoint of enhancing product quality, other methods and arrangements for applying moisture and heat (e.g., steam) to the tissue plies 20, 28 that are known to skilled artisans can be employed and fall within the scope of the present invention. By way of example, steam can be applied to either or both sides of the plies 20, 28, and steam can be applied to the ply 28 ahead of the idler roller 56. Also, the idler roller 56 shown in FIG. 5 is not necessary for practicing the invention when steam is applied to the tissue ply 28 at a point between the idler roll 32 and the impression roll 34.

The arrangement shown in FIG. 5 has been found to be quite advantageous in that steam preconditioning each of the tissue plies 20, 28 prior to embossing provides a much higher caliper and lower tensile modulus as compared to tissue plies not subjected to steam preconditioning. Without being bound by theory, it is believed that preconditioning one or both of the plies with steam enables the plies to become more compliant and this allows an improved emboss definition to be imparted to the web. Better emboss definition is highly desirable as it helps enhance sheet caliper.

Figure 6A:
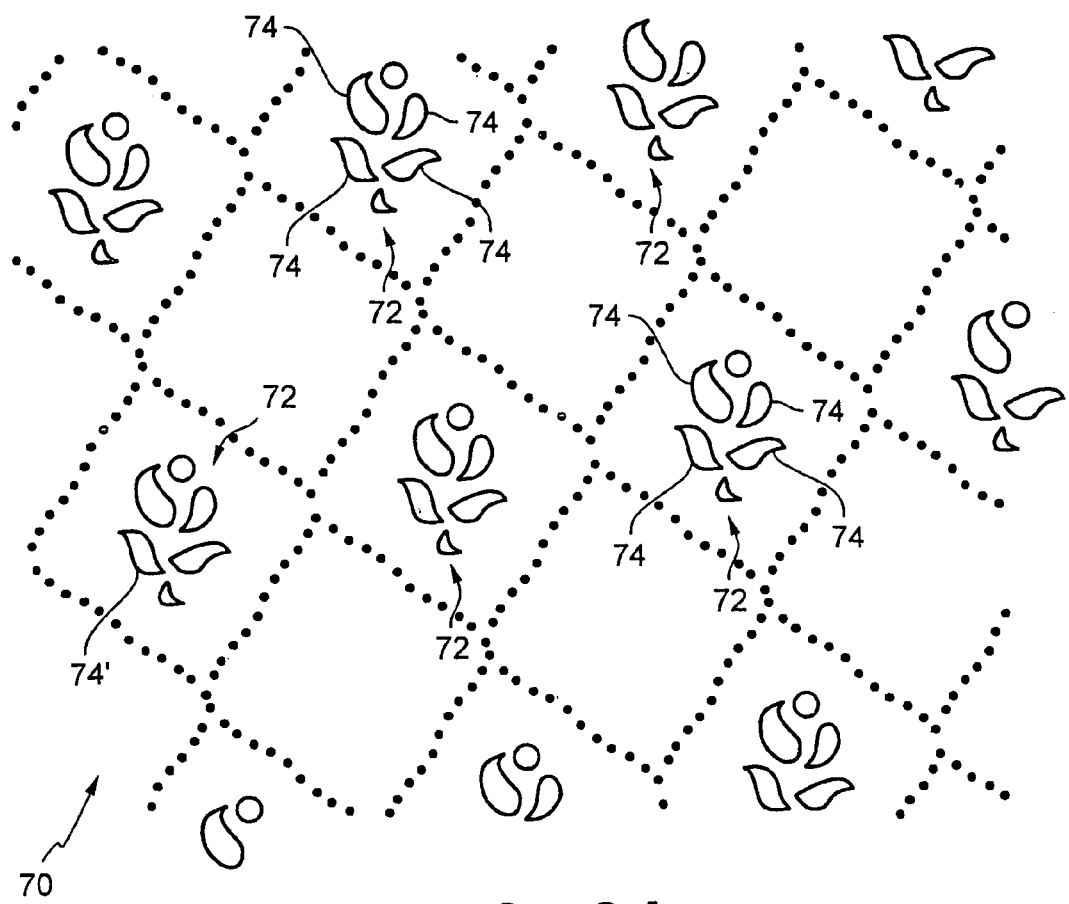
FIG. 6A is an illustration of one emboss pattern used in conjunction with the present invention.
Figure 7:
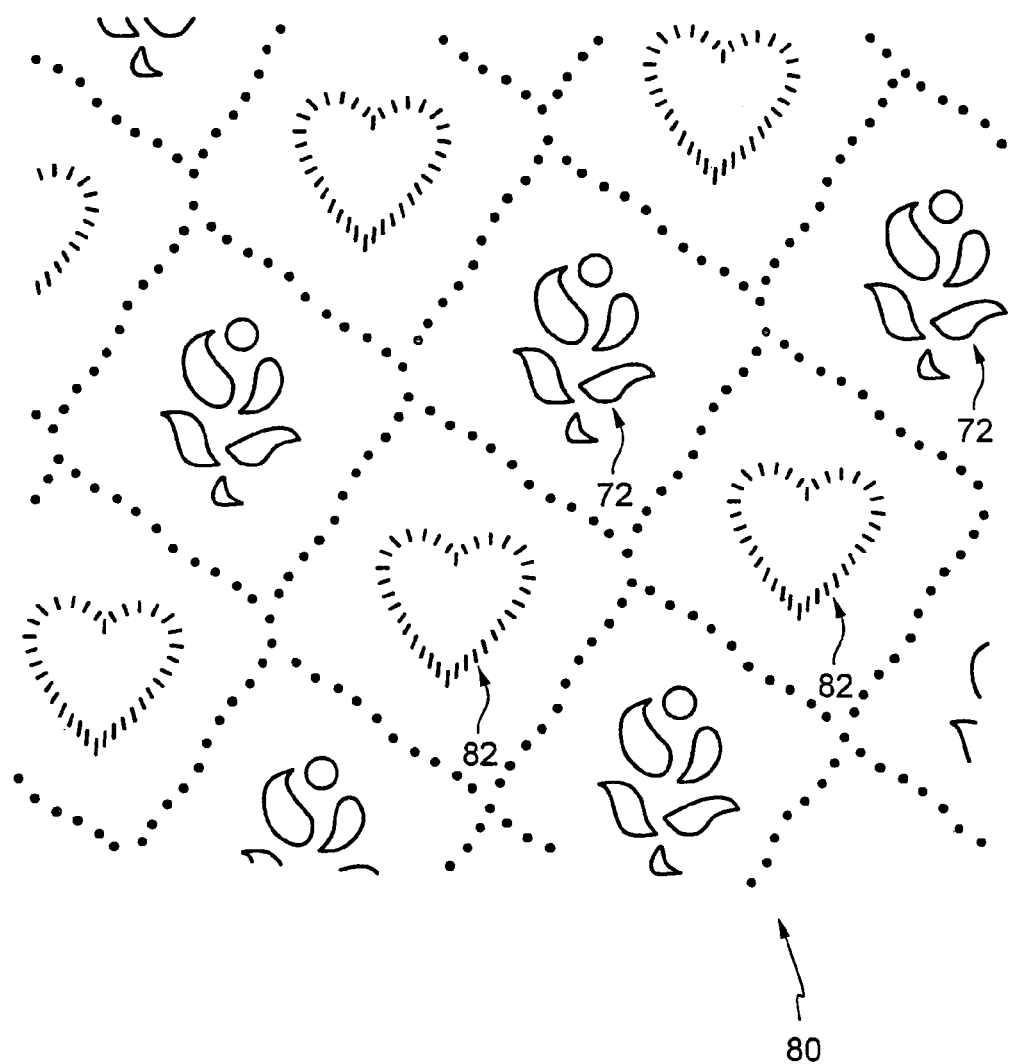
FIG. 7 is an illustration of a different emboss pattern used in connection with the present invention.
Figure 8:
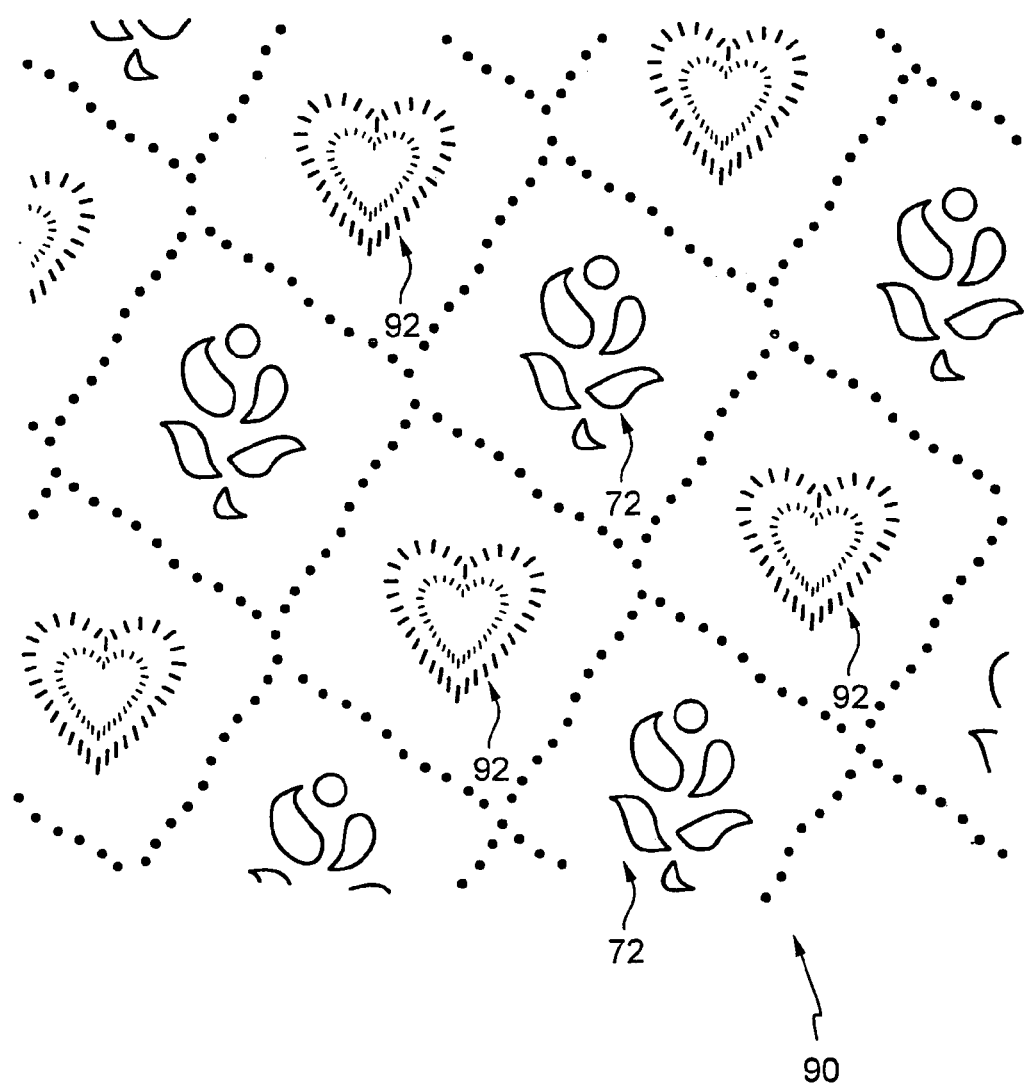
FIG. 8 is an illustration of a further emboss pattern used in connection with the present application.
Figure 9:
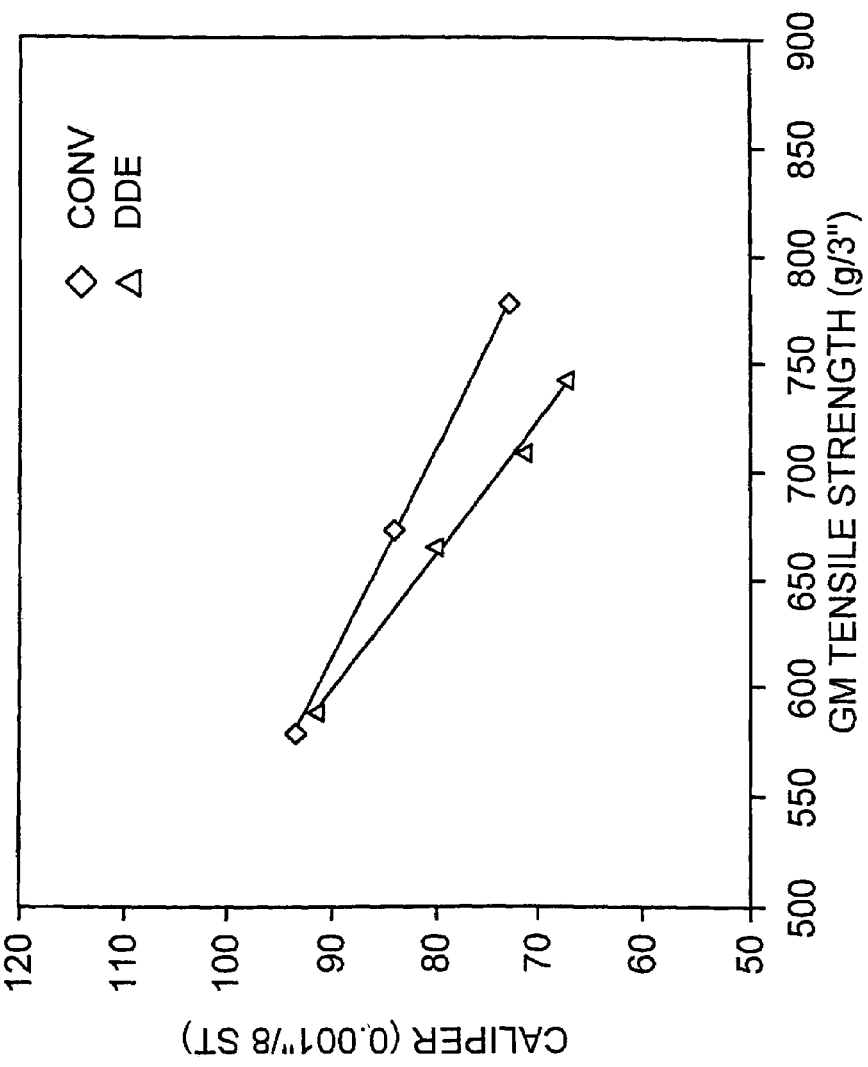
FIG. 9 is a graph of GM tensile strength versus caliper comparing the embossing technique of the present invention versus conventional embossing.

As mentioned above, the present invention is based on the discovery that unexpectedly advantageous results can be achieved by combining differential depth emboss with an emboss pattern having certain characteristics. FIGS. 6A, 7 and 8 illustrate three different emboss patterns that, in combination with the differential depth emboss, provide particularly advantageous results.

Figure 6B:
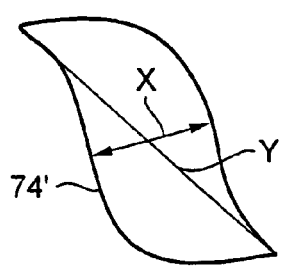
FIG. 6B is an enlarged illustration of one portion of the emboss pattern shown in FIG. 6A.

The emboss pattern 70 shown in FIG. 6A is in the form of a series of spaced apart flowers 72. The pattern also includes dots arranged in the shape of diamonds, at least some of which surround the flowers 72. Each of the flowers 72 is defined by emboss elements 74, substantially all of which are elongated in shape. FIG. 6B illustrates an enlarged version of one of the elongated emboss elements 74'. As can be seen, the elongated emboss element 74' is dimensioned so that the dimension y is significantly greater than the dimension x. The emboss element thus possesses an aspect ratio (i.e., y/x) greater than 1 (if the dimensions x and y were equal, the aspect ratio would be 1). The aspect ratio of the emboss element is preferably between about 1 and about 10, preferably greater than about 2. Without being bound by theory, it is believed that using emboss elements with aspect ratios between approximately 1 and approximately 10, greater than approximately 2 provides a smoother and puffier structure that is pleasing to the touch and thus perceived to be of softer quality.

FIG. 7 illustrates another preferred emboss pattern 80. Here, the emboss pattern is in the form of alternating and spaced apart flowers 72, like those shown in FIG. 6A, and hearts 82. The hearts provide an open emboss pattern. The aspect ratio of an individual heart is the contact area weight average of the individual aspect ratios of the components making up the heart. The pattern shown in FIG. 7 also includes dots arranged in the form of diamonds, with each diamond shaped arrangement of dots surrounding one of the flowers 72 and hearts 82.

FIG. 8 illustrates another preferred emboss pattern 90. Here, the emboss pattern is in the form of alternating and spaced apart flowers 72, like those shown in FIG. 6A, and double hearts 92 defined by a heart shaped emboss positioned within another heart shaped emboss. The pattern further includes dots likes those shown in FIG. 7 that are arranged in the form of diamonds each surrounding one of the flowers and double hearts. The double hearts provide an open emboss pattern. The aspect ratio of an individual double heart is the contact area weight average of the individual aspect ratios of the components making up the double heart.

A variety of tests were conducted on different tissue samples produced according to the differential depth emboss (DDE) of the present invention and tissue samples produced according to the conventional process in which two tissue plies are conveyed between a steel/rubber nip. The tests are discussed below, with the resulting data being summarized in various graphs and tables set forth below and in the drawing figures.

EXAMPLE 1

Figure 10:
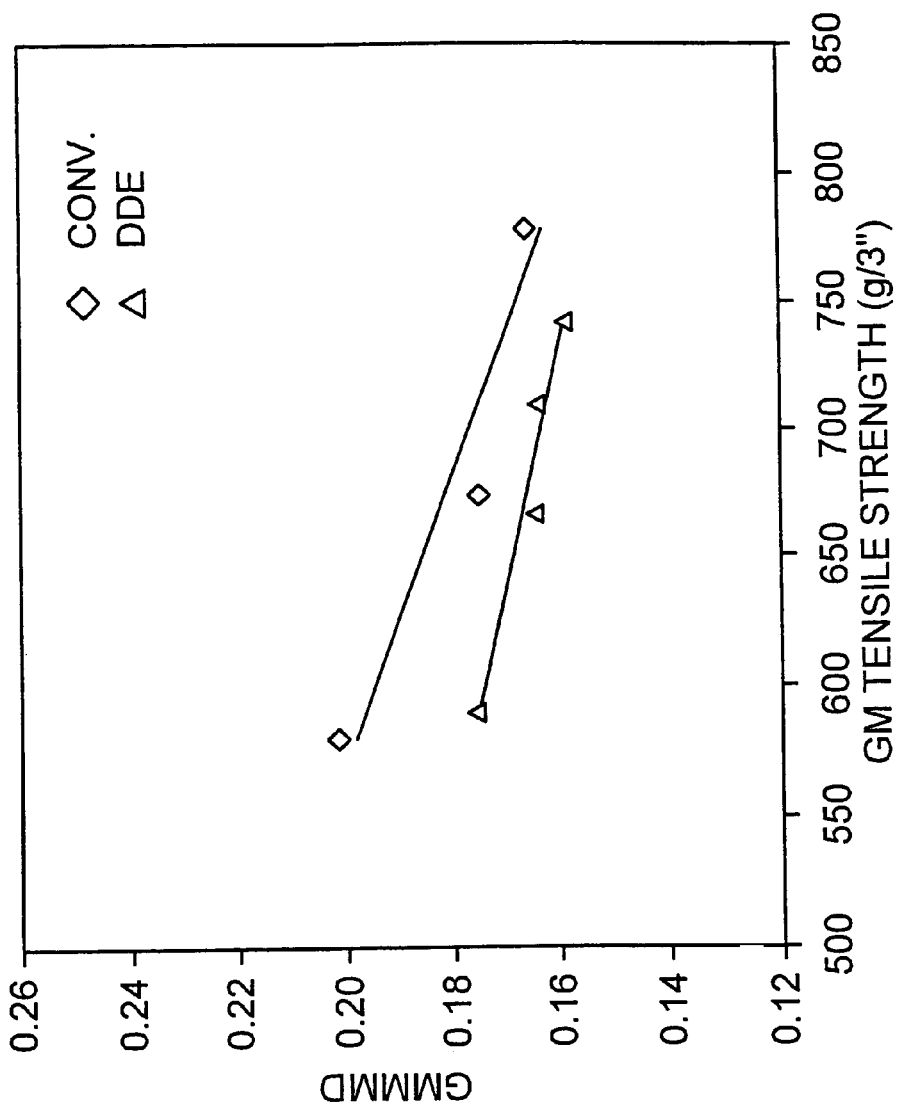
FIG. 10 is a graph of GM tensile strength versus GMMMD (friction) comparing the embossing technique of the present invention versus conventional embossing.
Figure 11:
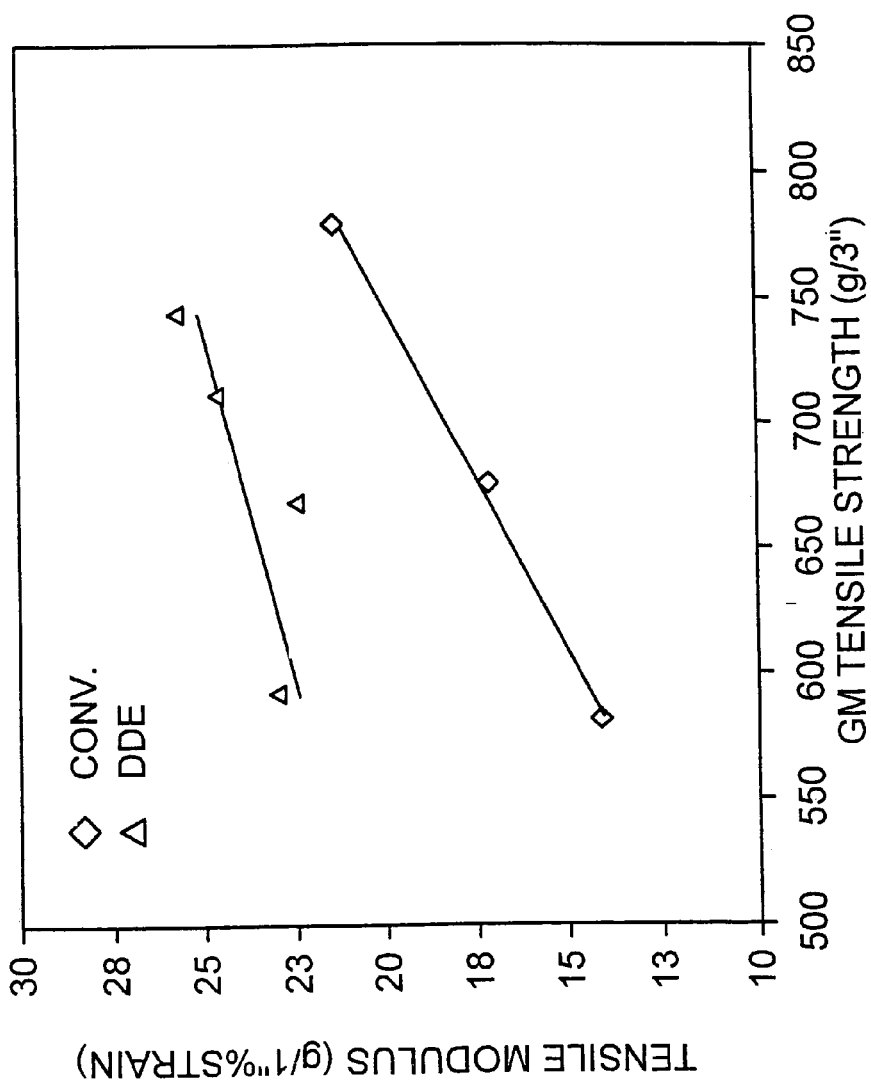
FIG. 11 is a graph of GM Tensile Strength versus tensile modulus comparing the embossing technique of the present invention and conventional embossing.
Figure 12:
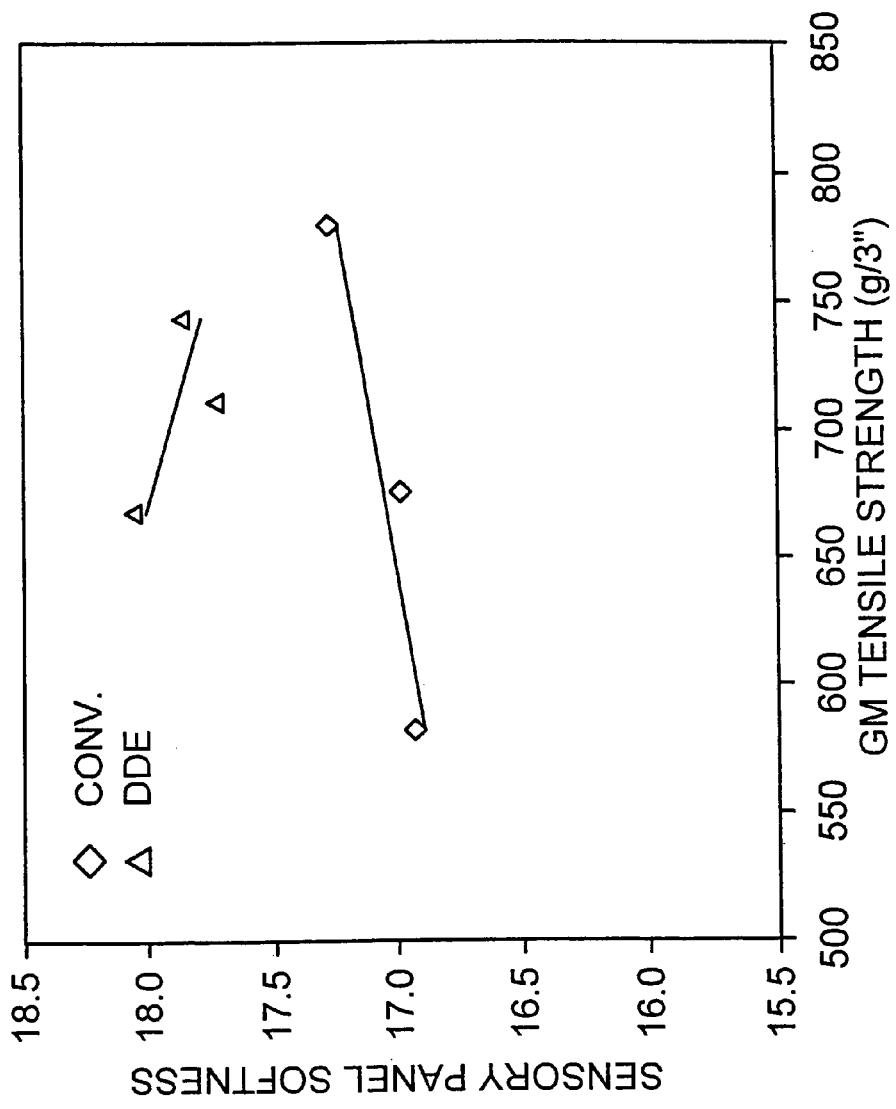
FIG. 12 is a graph of GM tensile strength versus sensory panel softness for the present invention and for conventional embossing.
Figure 13:
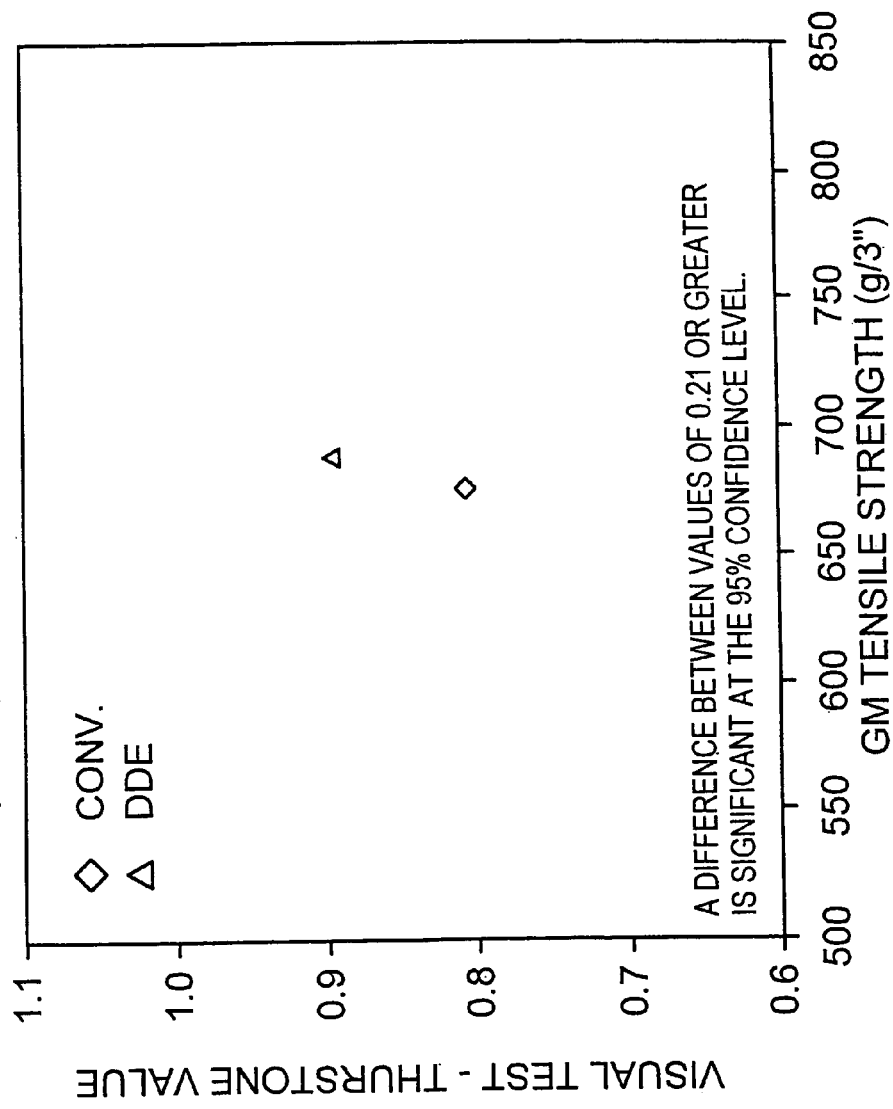
FIG. 13 is a graph of GM tensile strength versus visual test comparing the embossing technique of the present invention and conventional embossing.

This example provides a comparison between tissue product converted using the conventional emboss process and that converted using the differential depth embossing process. Tissue base sheets were made on a crescent former pilot paper machine using 15 degree bevel at a percent crepe of 22%. The base sheet furnish contains 65% Southern hardwood kraft and 35% Northern softwood kraft. Base sheets were converted to two-ply tissue using the conventional steel-to-rubber process and the differential depth emboss process. The rubber rolls with hardness 40 Shore Durometer A were used in both processes. Both processes used the same emboss pattern shown in FIG. 7. Each process converted base sheets at three or four penetration depths (or nip pressures). Physical properties of various tissue products were measured and compared. FIGS. 9–13 show the test results. It can be seen from FIG. 9 that the differential depth emboss process made product with slightly lower caliper at equal GM tensile strength (geometric mean strength which is equal to the square root of the product obtained by the multiplying MD dry tensile and CD dry tensile) than those converted using the conventional emboss process. FIG. 10 shows that the differential depth emboss process resulted in product with lower friction or GMMMD (friction deviation from the mean) at equal GM tensile strength. The differential depth emboss process produced product with higher tensile modulus at equal GM tensile strength as shown in FIG. 11. The high tensile modulus is caused by light embossing on the bottom ply. FIG. 12 shows that the differential depth emboss process made product with better sensory softness at equal GM tensile strength. Compared to the conventional product, the overall softness value of the differential depth embossing product is 0.4 or more units higher which is significant at the 95% confidence level. The visual tests were performed on selected prototypes. The results indicate that the differential depth emboss process produced product with better visual perception at equal penetration depth as shown in FIG. 13.

EXAMPLE 2

Figure 14:
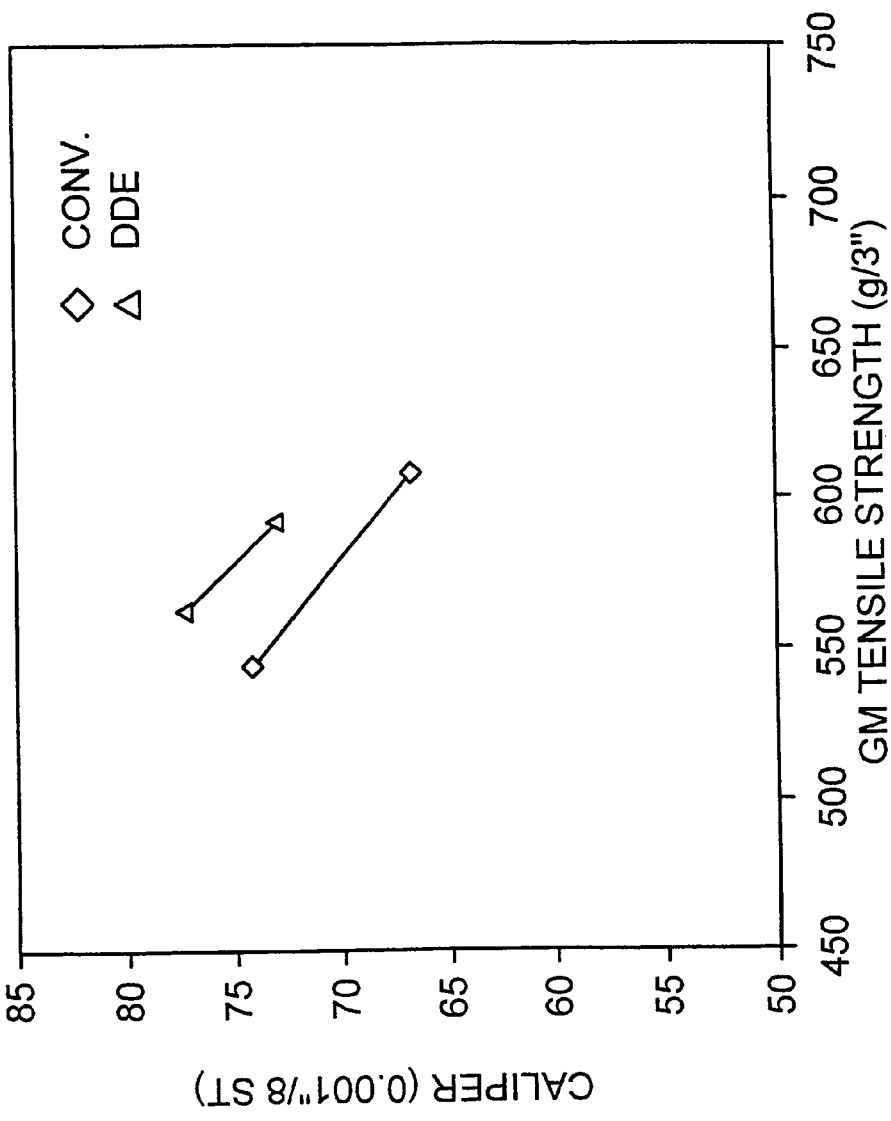
FIG. 14 is a graph of GM tensile strength versus caliper comparing the embossing technique of the present invention versus conventional embossing.
Figure 15:
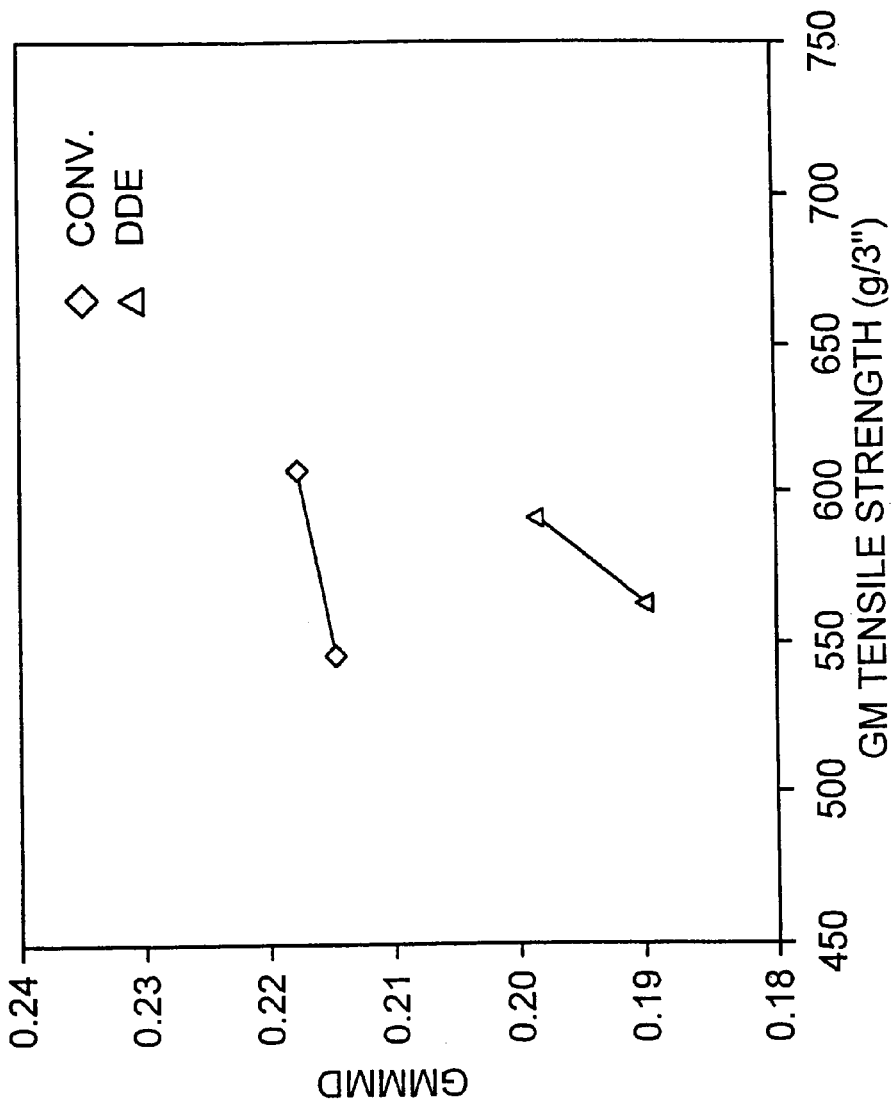
FIG. 15 is a graph of GM tensile strength versus GMMMD comparing the embossing technique of the present invention and conventional embossing.
Figure 16:
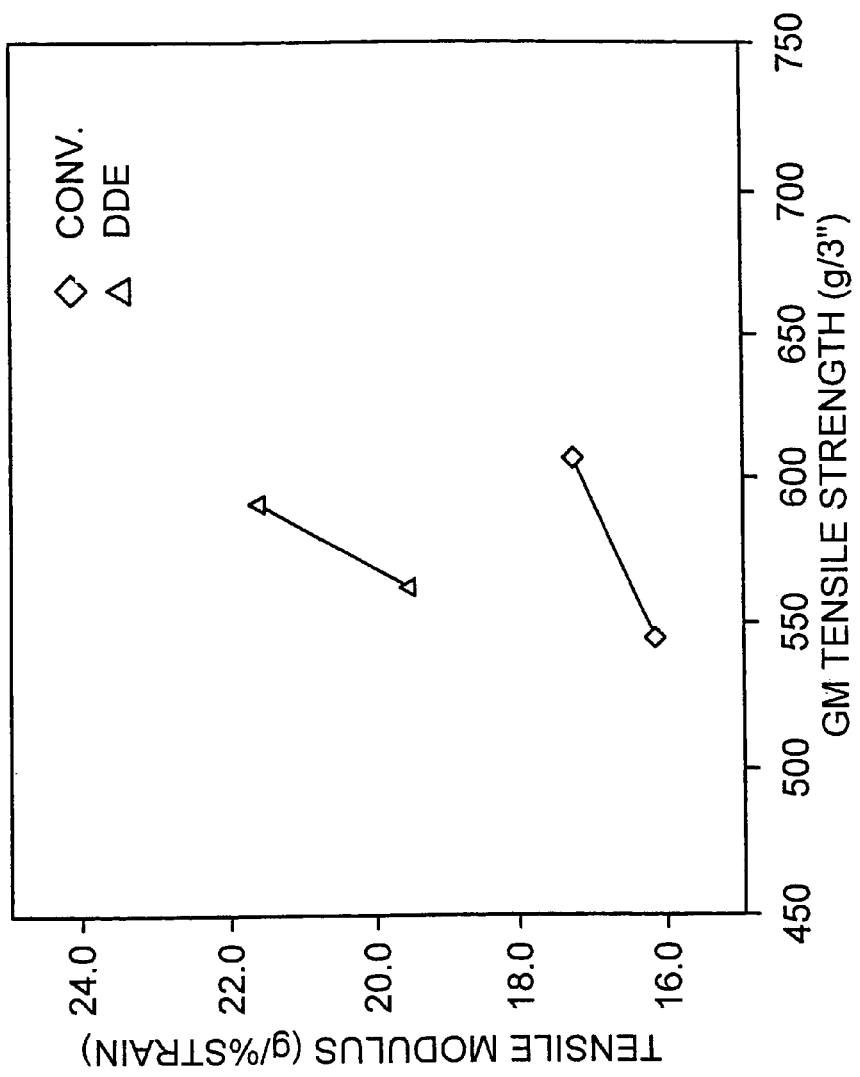
FIG. 16 is a graph of GM tensile strength versus tensile modulus comparing the embossing technique of the present invention and conventional embossing.
Figure 18A:
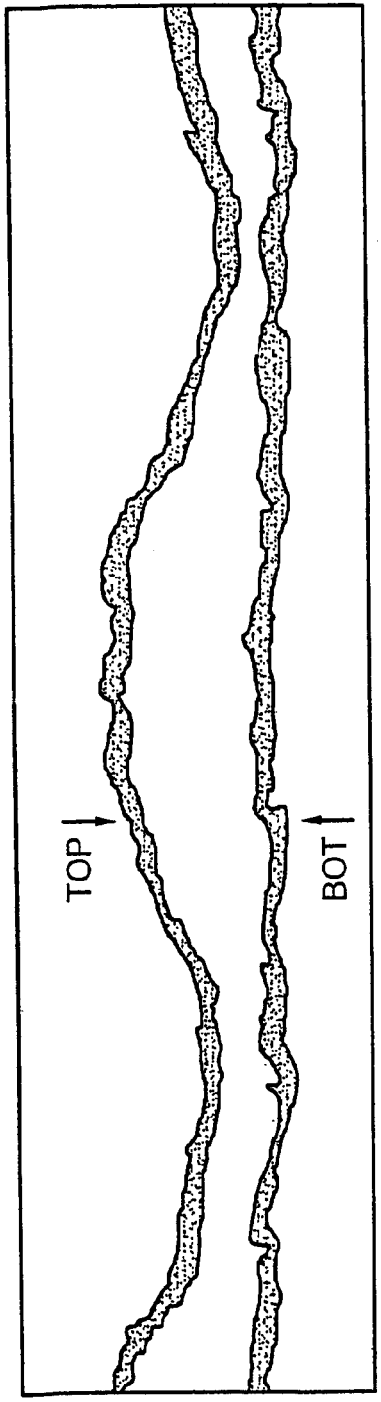
FIG. 18a is a magnified cross-section of a multi-ply tissue produced in accordance with the embossing technique of the present invention.
Figure 18B:
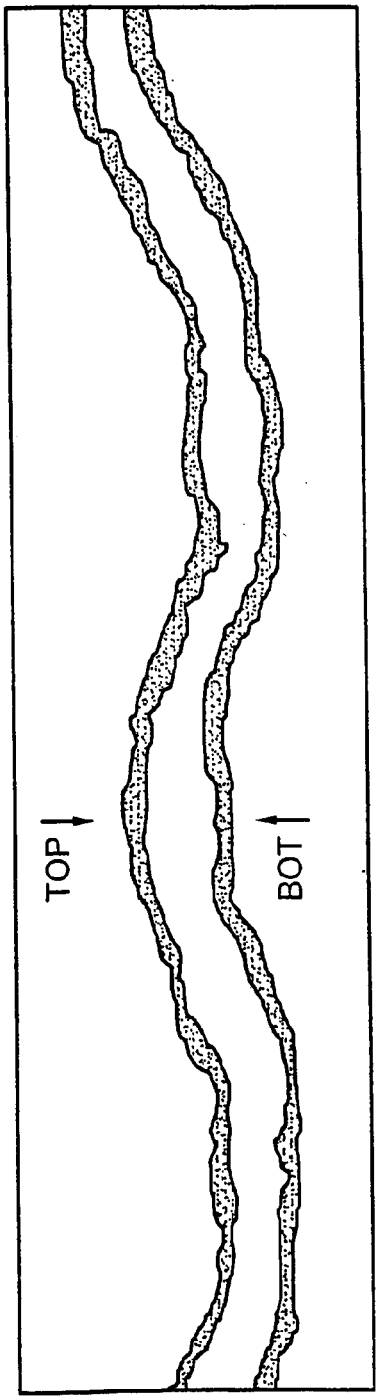
FIG. 18b is a magnified cross-sectional view of a multi-ply tissue formed in accordance with conventional embossing.
Figure 20A:
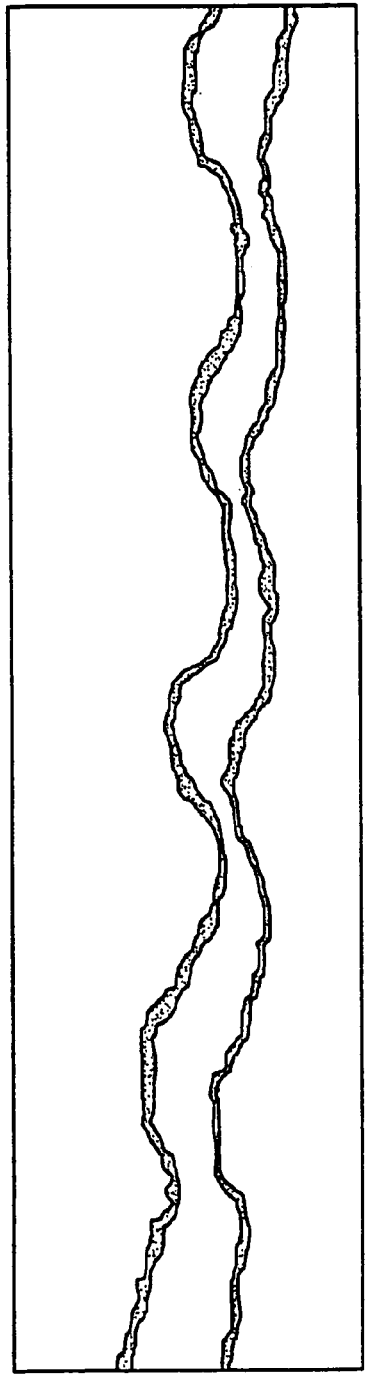
FIG. 20a is a magnified cross-sectional view of a multi-ply tissue produced in accordance with the embossing technique of the present invention.
Figure 20B:
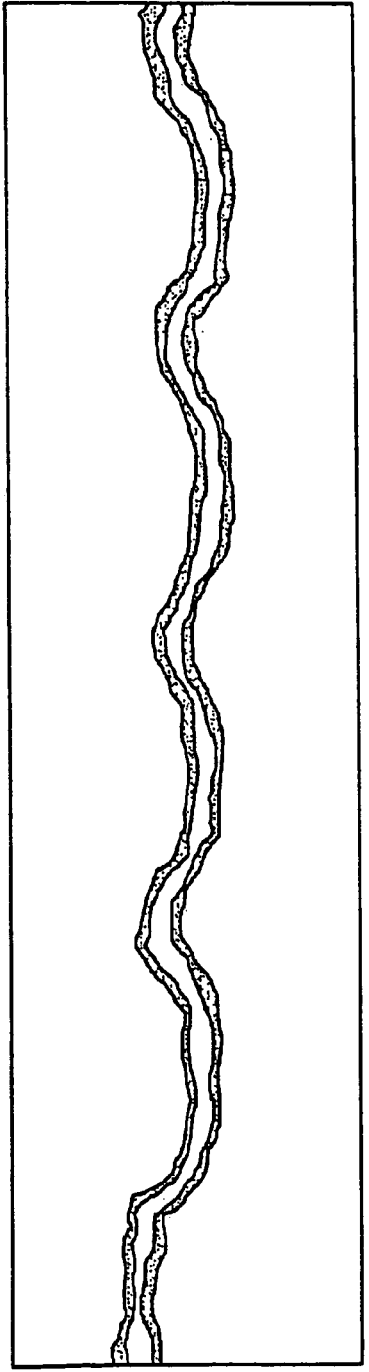
FIG. 20b is a magnified cross-sectional view of a multi-ply tissue produced in accordance with conventional embossing.
Figure 21A:
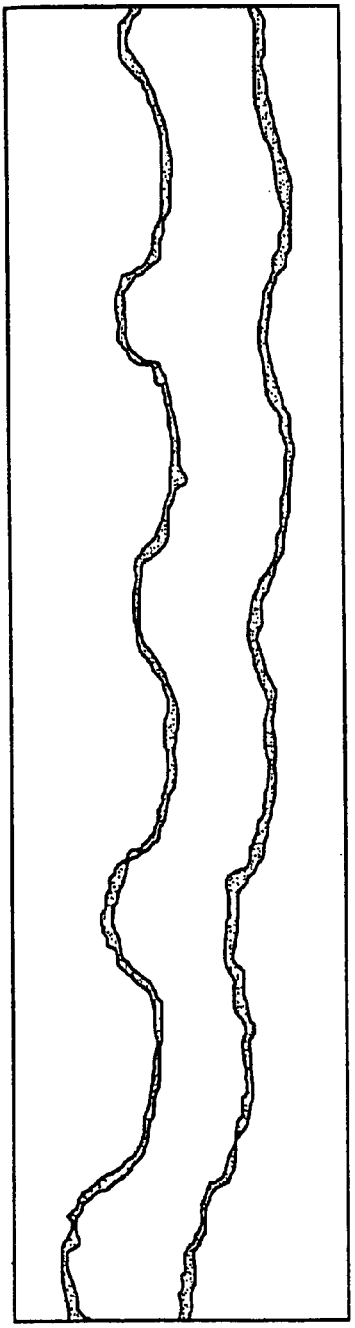
FIG. 21a is a magnified cross-sectional view of a multi-ply tissue produced in accordance with the embossing technique of the present invention.
Figure 21B:
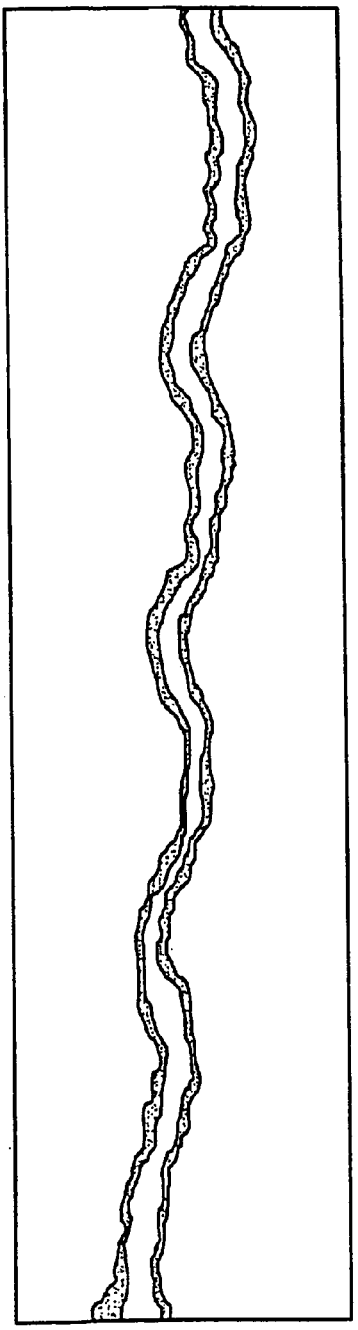
FIG. 21b is a magnified cross-sectional view of a multi-ply tissue produced in accordance with conventional embossing.

This example compares and illustrates the differences between the differential depth emboss product and the conventional tissue product. Tissue base sheets were made from a furnish containing 60% Southern hardwood kraft, 30% Northern softwood kraft and 10% Broke. Base sheets were made with square blade at 20% crepe ratio and converted into two-ply tissue using the conventional process and the differential depth emboss process. The hardness of rubber rolls used in both processes is 40 Shore Durometer A. Both processes used the same emboss pattern corresponding to the emboss pattern shown in FIG. 8. Each process converted base sheets at two penetration depths (or nip pressures). The basis weight of two-ply tissue product is 17 to 20 lbs/3000 square ft. Physical test results are plotted in FIGS. 14–16. FIGS. 14 and 15 indicate that two-ply tissue converted using the differential depth emboss process has higher caliper and lower friction at equal GM tensile strength than that converted using the conventional process. FIG. 16 shows that the differential depth embossing product has higher tensile modulus than the conventional product. The sensory softness result is shown in FIG. 17. The differential depth emboss product has a overall softness value 0.2 to 0.4 units higher than the conventional product.

EXAMPLE 3

This example illustrates the effect of the emboss process on two-ply tissue. The furnish of tissue base sheets contains 30% Northern softwood kraft, 60% Southern hardwood kraft and 10% trial broke. Base sheets were made at basis weight of 9.3 lbs/3000 square ft using a square crepe blade at 72 degrees creping angle. The conventional process and the differential depth emboss process were used to converted base sheet to two-ply tissue. The rubber rolls with hardness 40 Shore Durometer A were used in both processes. The same emboss pattern used in Example 2 above was used in this example. Two-ply tissue was converted using the conventional emboss process at penetration depth 0.085 inches. For two-ply tissue converted using the differential depth emboss process, the penetration depth is 0.095 inches for top ply (or outside) and then the top and bottom (or inside) plies are embossed together at penetration depth 0.065 inches.

Table 1 below lists all of the physical properties and sensory softness values for the differential depth embossing tissue product and the tissue product produced using the conventional method. The way in which the properties and values shown in FIG. 1, as well as subsequent tables, are obtained is known in the art and so a detailed description is not provided here.

Compared to the conventional emboss product, the differential depth emboss product has higher caliper, higher tensile modulus, and lower friction. The differential depth emboss product has a overall sensory softness value 0.74 units higher than the conventional emboss product. The difference in softness value is 0.4 units or more which is significant at 95% confidence level.

TABLE 1

Physical Properties of Two-Ply Tissue Products

|  | Conventional Emboss Product | Differential Depth Emboss Product |
| --- | --- | --- |
| Basis Weight (lbs/ream) | 18.1 | 18.4 |
| Caliper (0.001"/8st) | 78.3 | 84.8 |
| MD Dry Tensile (g/3") | 990 | 934 |
| CD Dry Tensile (g/3") | 421 | 430 |
| GM Dry Tensile (g/3") | 646 | 634 |
| Tensile Modulus (g/% strain) | 19.4 | 20.5 |
| Friction | 0.189 | 0.181 |
| Roll Diameter (inch) | 4.42 | 4.56 |
| Roll Compressibility (%) | 19.1 | 19.7 |
| Sensory Softness | 16.89 | 17.63 |

EXAMPLE 4

This example compares and illustrates the differences between the differential depth emboss tissue product and the conventional product. Tissue-base sheets similar to those used in the example 3 were converted to 2-ply tissue. An emboss pattern similar to that illustrated in FIG. 8 was used in the present example. The rubber rolls with hardness 40 Shore Durometer A were used in both processes. Two-ply tissue was converted using the conventional emboss process at penetration depth 0.080 inches. For two-ply tissue converted using the differential depth emboss process, the penetration depth is 0.090 inches for top ply and then the top and bottom plies are embossed together at a penetration depth of 0.060 inches. The physical properties of the tissue products were measured and compared. Table 2 below lists all of test results including sensory softness value. Compared to the conventional emboss product, the differential depth emboss product has higher caliper, higher tensile modulus, and lower friction. Also, the differential depth emboss product has a sensory softness value 0.4 units higher than the conventional emboss product.

TABLE 2

Physical Properties of Two-Ply Tissue Products

|  | Conventional Emboss Product | Differential Depth Emboss Product |
| --- | --- | --- |
| Basis Weight (lbs/ream) | 18.4 | 18.7 |
| Caliper (0.001"/8st) | 74.5 | 78.3 |
| MD Dry Tensile (g/3") | 1044 | 1075 |
| CD Dry Tensile (g/3") | 432 | 447 |
| GM Dry Tensile (g/3") | 672 | 693 |
| Tensile Modulus (g/% strain) | 20.2 | 24.3 |
| Friction | 0.172 | 0.158 |
| Roll Diameter (inch) | 4.33 | 4.46 |
| Roll Compressibility (%) | 19.2 | 19.6 |
| Sensory Softness | 17.35 | 17.75 |

EXAMPLE 5

This example illustrates that the effect of the emboss process on two-ply tissue. The furnish of tissue base sheet contains 30% Northern softwood kraft, 60% Southern hardwood kraft, and 10% trial broke. An emboss pattern similar to that shown in FIG. 8 was used in the present example. Two-ply tissue was converted using the conventional emboss process at a penetration depth of 0.095 inches. For two-ply tissue converted using the differential depth emboss process, the penetration depth is 0.090 inches for top ply and then top and bottom plies were embossed together at a penetration depth of 0.065 inches. Rubber rolls with hardness 40 Shore Durometer A were used in both processes. Table 3 below lists all of test results including sensory softness value.

Compared to the conventional emboss product, the differential depth emboss product has higher tensile modulus, and lower friction. Both products have similar caliper. The differential depth emboss product has a sensory softness value 0.68 units higher than the conventional emboss product. Thus, the difference in softness value is greater than 0.4 units which is significant at 95% confidence level.

TABLE 3

Properties of Two-Ply Tissue Products

| | Conventional Emboss Product | Differential Depth Emboss Product |
|---|---|---|
| Basis Weight (lbs/ream) | 18.6 | 18.8 |
| Caliper (0.001"/8st) | 72.9 | 73 |
| MD Dry Tensile (g/3") | 1129 | 1111 |
| CD Dry Tensile (g/3") | 438 | 455 |
| GM Dry Tensile (g/3") | 703 | 711 |
| Tensile Modulus (g/% strain) | 21.15 | 24.75 |
| Fricition | 0.161 | 0.144 |
| Roll Diameter (inch) | 4.31 | 4.25 |
| Roll Compressibility (%) | 19.7 | 20 |
| Sensory Softness | 17.55 | 18.23 |

EXAMPLE 6

This example illustrates that the effect of adhesive and the emboss process on two-ply tissue. Tissue base sheets similar to those used in Example 5 were converted using both the differential depth emboss process and the conventional process. The rubber rolls with hardness 40 Shore Durometer A were used in both processes. Both processes used the same emboss pattern similar to that shown in FIG. 8. Two strips of adhesive per embossed sheet at 4.5 mg/linear meter per strip were applied on the back side of the top ply to improve the ply-bond. For the differential depth embossing process, the two-ply tissue with adhesive applied was embossed at a penetration depth of 0.090 inches for the top ply, and then the top and bottom plies were embossed together at a penetration depth of 0.060 inches. A two-ply tissue converted using the conventional emboss process was embossed at a penetration depth of 0.085 inches. Compared to the conventional product, the differential depth embossing product has higher caliper, higher tensile modulus and higher friction. Higher friction for the differential depth embossing product is inconsistent with the results observed in previous examples. The sensory softness result indicates that the differential depth embossing product and the conventional product have similar softness. Based on physical attributes and softness results, applying adhesive for running the differential depth embossing process is not preferred.

TABLE 4

Properties of Two-Ply Tissue Products

| | Conventional Emboss Product (with Glue Applied) | Differential Depth Emboss Product (with Glue Applied) |
|---|---|---|
| Basis Weight (lbs/ream) | 17.9 | 18.0 |
| Caliper (0.001"/8st) | 75.7 | 80.0 |
| MD Dry Tensile (g/3") | 1001 | 965 |
| CD Dry Tensile (g/3") | 444 | 430 |
| GM Dry Tensile (g/3") | 667 | 644 |
| Perf. Tensile (g/3") | 434 | 410 |
| Tensile Modulus (g/% strain) | 20.6 | 23.4 |
| Friction | 0.175 | 0.189 |
| Roll Diameter (inch) | 4.29 | 4.40 |
| Roll Compressibility (%) | 18.9 | 20.5 |
| Sensory Softness | 17.0 | 17.16 |

EXAMPLE 7

This example illustrates the effect of adhesive on two-ply tissue converted using the differential depth emboss process. Tissue base sheets similar to those used in Example 5 were converted to two-ply tissue using the differential depth emboss process. An emboss pattern similar to that shown in FIG. 8 was used in the present example. The rubber rolls with hardness 40 Shore Durometer A were used. Two strips of adhesive per embossed sheet at 4.5 mg/linear meter per strip were applied on the top ply. The differential depth embossing product with adhesive applied was embossed at a penetration depth of 0.090 inches for the top ply, and then the top and bottom plies were embossed together at a penetration depth of 0.060 inches. The differential depth embossing product without adhesive applied was embossed at a penetration depth of 0.095 inches for the top ply and embossed at a penetration depth of 0.065 inches as the top and bottom plies were joined together. Table 5 below lists the physical attributes and softness value results. The effect of adhesive on the perforated tensile strength of two-ply tissue is not significant. The differential depth embossing product without glue applied has higher caliper, lower tensile modulus and lower friction. Based on sensory softness results, the differential depth embossing product without adhesive applied is softer than that with adhesive applied. The difference in sensory softness value is greater than 0.4 units which is significant at the 95% confidence level. As mentioned in the Example 6, the adhesive is not preferred when running the differential depth emboss process.

TABLE 5

Properties of Two-Ply Tissue Products

| | Differential Depth Emboss Product (with Glue Applied) | Differential Depth Emboss Product |
|---|---|---|
| Basis Weight (lbs/ream) | 18.01 | 18.5 |
| Caliper (0.001"/8st) | 80.0 | 81.8 |
| MD Dry Tensile (g/3") | 965 | 1034 |
| CD Dry Tensile (g/3") | 430 | 424 |
| GM Dry Tensile (g/3") | 644 | 662 |
| Perf. Tensile (g/3") | 404 | 410 |
| Tensile Modulus (g/% strain) | 23.4 | 21.7 |
| Friction | 0.189 | 0.176 |
| Roll Diameter (inch) | 4.40 | 4.53 |
| Roll Compressibility (%) | 20.5 | 20.3 |
| Sensory Softness | 17.18 | 17.85 |

EXAMPLE 8

This example illustrates that the effect of the emboss process on two-ply tissue. Tissue base sheet was made using undulatory creping blades. The blade was undulated at a spacing of 20 undulations/inch and a depth of 0.020" and had a 25 degree bevel angle. The furnish of base sheet was 30% Northern softwood kraft, 60% Southern hardwood kraft, and 10% trial broke. The rubber rolls with hardness 40 Shore Durometer A were used in both processes. Two-ply tissue converted using the conventional emboss process was embossed at a penetration depth of 0.095 inches. For two-ply tissue converted using the differential depth emboss process, the penetration depth was 0.095 inches for the top ply, and then the top and bottom plies were embossed together at a penetration depth of 0.065 inches. An emboss pattern similar to that shown in FIG. 8 was employed in the present example. Table 6 below lists all of the physical properties and sensory softness value. Compared to the conventional product, the differential depth emboss product has lower calipers higher tensile modulus, and lower friction. The differential depth emboss product has an overall sensory softness value 0.65 units higher than the conventional embossing product. The difference in sensory softness value is greater than 0.4 units which is significant at the 95% confidence level.

TABLE 6

Physical Properties of Two-Ply Tissue Products

| | Conventional Emboss Product | Differential Depth Emboss Product |
|---|---|---|
| Basis Weight (lbs/ream) | 18.4 | 18.6 |
| Caliper (0.001"/8st) | 71.3 | 69.2 |
| MD Dry Tensile (g/3") | 1043 | 1001 |
| CD Dry Tensile (g/3") | 441 | 456 |
| GM Dry Tensile (g/3") | 678 | 676 |
| Tensile Modulus (g/% strain) | 19.81 | 22.18 |
| Friction | 0.154 | 0.149 |
| Roll Diameter (inch) | 4.23 | 4.16 |
| Roll Compressibility (%) | 21.5 | 18.5 |
| Sensory Softness | 17.62 | 18.27 |

EXAMPLE 9

This example illustrates that the effect of emboss process on stratified tissue base sheet with basis weight ranging from 11 to 13 lbs/3000 square ft. Tissue base sheet is in stratified mode and the layer split of base sheet was 65% (100% Northern hardwood kraft) to the Yankee side and 35% (100% Northern softwood kraft) to the air side. Base sheets were converted to two-ply tissue using an emboss pattern similar to that illustrated in FIG. 8. The rubber rolls with hardness 40 Shore Durometer A were used in both processes. Two-ply tissue was converted using the conventional emboss process at penetration depth 0.095 inches. For two-ply tissue converted using the differential depth emboss process, the penetration depth was 0.100 inches for the top ply, and then the top and bottom plies were embossed together at a penetration depth of 0.065 inches. Table 7 below lists all of the test results including sensory softness value. Compared to the conventional product, the differential depth embossing product has lower friction and higher caliper at the similar GM tensile strength. The differential depth embossing product has lower tensile modulus which differs from previous examples. The differential depth emboss product has a better sensory softness (20.44 vs. 20.24 units).

TABLE 7

Physical Properties of Two-Ply Tissue Products

| | Conventional Emboss Product | Differential Depth Emboss Product (40/80 Sha) |
|---|---|---|
| Pene. Depth (x0.001") | 95 | 100/65 |
| Basis Weight (lbs/ream) | 26.5 | 26.4 |
| Caliper (0.001"/8st) | 105.7 | 112.2 |
| MD Dry Tensile (g/3") | 960 | 921 |
| CD Dry Tensile (g/3") | 412 | 381 |
| GM Dry Tensile (g/3") | 629 | 592 |
| Tensile Modulus (g/% strain) | 14.1 | 13.86 |
| Friction | 0.168 | 0.162 |
| Sensory Softness | 20.24 | 20.44 |

EXAMPLE 10

This example illustrates the effect of the emboss process on homogeneous tissue base sheet with basis weight ranging from 11 to 13 lbs/3000 square feet. Base sheets were in the homogeneous mode containing 35% Northern softwood kraft and 65% Northern hardwood kraft. Base sheets were converted to two-ply tissue using an emboss pattern similar to that shown in FIG. 8. Rubber rolls with hardness 40 Shore Durometer A were used in both processes. Two-ply tissue was converted using the conventional emboss process at a penetration depth 0.100 inches. For two-ply tissue converted using the differential depth emboss process, the penetration depth was 0.100 inches for the top ply, and then the top and bottom plies were embossed together at a penetration depth of 0.065 inches. Table 8 below lists all of the test results including sensory softness value. Compared to the conventional product, the differential depth emboss product has lower friction and higher caliper at equal GM tensile strength. The differential depth embossing product has lower tensile modulus which is consistent with the results in example 9. The differential depth emboss product has a better sensory softness value that is 0.56 units higher than the conventional products.

TABLE 8

Physical Properties of Two-Ply Tissue Products

| | Conventional Emboss Product | Differential Depth Emboss Product (40/80 Sha) |
|---|---|---|
| Pene. Depth (x0.001") | 100 | 100/65 |
| Basis Weight (lbs/ream) | 26.5 | 26.8 |
| Caliper (0.001"/8st) | 104.6 | 108.6 |
| MD Dry Tensile (g/3") | 1097 | 1046 |
| CD Dry Tensile (g/3") | 426 | 447 |
| GM Dry Tensile (g/3") | 684 | 683 |
| Tensile Modulus (g/% strain) | 17.13 | 16.52 |
| Friction | 0.177 | 0.175 |
| Sensory Softness | 19.19 | 19.75 |

EXAMPLE 11

This example compares and illustrates the differences between the microstructure between the differential depth emboss product and the conventional tissue product. The base sheet furnish contained 65% Southern hardwood kraft and 35% Northern softwood kraft. Two-ply tissue was converted using the conventional emboss process at a penetration depth of 0.075 inches. For the differential depth embossing product, the penetration depth was 0.085 inches for the top ply, and then the top and bottom plies were embossed together at a penetration depth of 0.050 inches. Both processes used the same emboss pattern depicted in FIG. 7. The rubber rolls with hardness 40 Shore Durometer A were used in both processes. FIGS. 18a, 18b and 19a, 19b are cross-sectional views taken at two different places of products produced conventionally and according to the present invention. The illustrations in FIGS. 18a, 18b and 19a, 19b are magnified at 50×. Compared to the cross-sectional structure of the conventional product, the bottom ply of the differential depth embossing product possesses less curvature because of the light emboss as the top and bottom plies are joined together. Based on the physical test results listed in Table 9 below, less curvature explains that the differential depth embossing product has much lower friction than the conventional product. The contours of the top ply for both the differential depth embossing product and the conventional product are similar. The differential depth embossing product can maintain an emboss definition as good as the conventional product. The softness pocket between the top and bottom plies for the differential depth embossing product is larger than that for the conventional product. The larger softness pocket can improve puffiness feel which may provide a two-ply tissue with better softness. Based on sensory softness results, the differential depth embossing product has better sensory softness than the conventional product. The differential depth embossing product has larger softness pocket between plies and less curvature on the bottom ply which contribute better softness and lower friction. In previous examples, the differential depth embossing product always has lower friction and better sensory softness than the conventional product.

TABLE 9

Physical Properties of Two-Ply Tissue Products

|  | Conventional Emboss Product | Differential Depth Emboss Product (40/40 Sha) |
|---|---|---|
| Pene. Depth (×0.001") | 75 | 85/50 |
| Basis Weight (lbs/ream) | 18.95 | 18.94 |
| Caliper (0.001"/8st) | 64.2 | 67.0 |
| MD Dry Tensile (g/3") | 1127 | 1154 |
| CD Dry Tensile (g/3") | 518 | 541 |
| GM Dry Tensile (g/3") | 764 | 790 |
| Tensile Modulus (g/% strain) | 24.5 | 25.42 |
| Friction | 0.152 | 0.139 |
| Sensory Softness | 17.1 | 18.0 |

EXAMPLE 12

This example compares microstructure between the differential depth emboss product and the conventional tissue product. Tissue base sheets were made from a furnish containing 60% Southern hardwood kraft, 30% Northern softwood kraft and 10% Broke and with square blade at 20% crepe ratio. Two-ply tissue was converted using the conventional emboss process at a penetration depth of 0.085 inches. For the differential depth embossing product, the penetration depth was 0.100 inches for the top ply, and then the top and bottom plies were embossed together at a penetration depth of 0.065 inches. The rubber roll hardness used in both processes was 40 Shore Durometer A. Both processes used the same emboss pattern illustrated in FIG. 8. Table 10 below lists the physical properties and sensory softness results. FIGS. 20a, 20b and 21a, 21b show the cross-sectional structure taken at two different positions. The illustrations in FIGS. 20a, 20b and 21a, 21b are magnified at 50×. The gap (or softness pocket) between top and bottom for the differential depth embossing product is much larger than that for the conventional product. Because of the wider softness pocket, the differential depth embossing product has a higher caliper than that of the conventional product. The larger gap between the top and bottom plies can also improve tissue softness. As can be seen from table 10 below, the differential depth embossing product has higher softness than the conventional product. The results are consistent with those observed in the example 11.

TABLE 10

Physical Properties of Two-Ply Tissue Products

|  | Conventional Emboss Product | Differential Depth Emboss Product (40/40 Sha) |
|---|---|---|
| Pene. Depth (×0.001") | 85 | 100/65 |
| Basis Weight (lbs/ream) | 17.65 | 18.2 |
| Caliper (0.001"/8st) | 72.3 | 79.2 |
| MD Dry Tensile (g/3") | 929 | 894 |
| CD Dry Tensile (g/3") | 411 | 415 |
| GM Dry Tensile (g/3") | 618 | 609 |
| Tensile Modulus (g/% strain) | 19.83 | 23.39 |
| Friction | 0.167 | 0.166 |
| Sensory Softness | 17.13 | 17.58 |

EXAMPLE 13

This example illustrates the effect of rubber roll hardness on the tissue product converted using the differential depth emboss process. A base sheet similar to that used in example 12 was used here. The base sheets were converted to two-ply tissue using the differential depth emboss process. Instead of using the same hardness (i.e., 40 Shore Durometer A) of rubber rolls for both nips, a harder rubber roll (i.e., greater than 40 Shore Durometer A) was used at the light emboss nip (or the second nip) where the two plies are joined or nested together. The rubber roll hardness ranged from 40 to 80 Shore Durometer A at the light emboss nip. For one condition, both softer rubber rolls (i.e., 40 Shore Durometer A) were replaced by harder rubber rolls (i.e., 55 Shore Durometer A). The emboss pattern shown in FIG. 8 was used in this example. Four different penetration depths were run in each condition. The basis weight of the converted two-ply tissue was 18 to 20 lbs/3000 square ft. Physical test results are plotted in FIGS. 22–25. FIG. 22 shows that the effect of rubber roll hardness on the caliper of differential depth embossing products is not significant. The difference in caliper among differential depth embossing products is within 0.003" per 8 sheets.

The effect of rubber roll hardness on the tensile modulus and friction are not significant as shown in FIGS. 23 and 24. A similar trend is observed for the sensory softness result as shown in FIG. 25. The difference in softness value among differential depth embossing products is less than 0.4 units which is significant difference at 95% confidence level. Based on results, the harder rubber roll (i.e., greater than 40 Shore Durometer A) can replace the softer roll (i.e., 40 Shore Durometer A) at the light emboss nip. The aforementioned result differs from that described in U.S. Pat. No. 3,708,366.

U.S. Pat. No. 3,708,366 states that the rubber roll used as the light emboss nip is preferred to be softer than the rubber roll used at the heavy emboss nip. While not wishing to be bound by theory, it is believed that the likely explanation for the difference in results between the present invention and the disclosure in U.S. Pat. No. 3,708,366 is due to elongated/non-elongated and gently rounded emboss patterns used in the present invention. These patterns are less likely to form sharp embossments in the ply when using hard rubber rolls.

EXAMPLE 14

This example illustrates the effect of adhesive on tissue product converted using the differential depth emboss process. Rubber rolls with 40 Shore Durometer A were used. The base sheet was similar to that used in Example 12 and was converted to two-ply tissue using the differential depth emboss process. Adhesive was applied on extrusions at the back side of the top ply across the web. The adhesive was applied using an apparatus similar to that shown in FIG. 3A. The emboss pattern illustrated in FIG. 8 was used in this example and four different penetration depths were run for each condition. FIGS. 26 and 27 show that the effects of adhesive on the caliper and the tensile modulus of the differential depth embossing tissue product are not significant. FIG. 28 shows that the differential depth embossing product without adhesive applied has a lower friction than the differential depth embossing product with adhesive applied. The differential depth embossing product without adhesive applied has better softness as shown in FIG. 29. The difference in softness value is more than 0.4 units which is a significant difference at 95% confidence level. Compared to the product with adhesive applied, the product without adhesive applied has lower friction and better softness. The aforementioned results are consistent with those found in Examples 6 and 7. Thus, applying adhesive is not preferred for running the differential depth embossing process.

EXAMPLE 15

Figure 30:
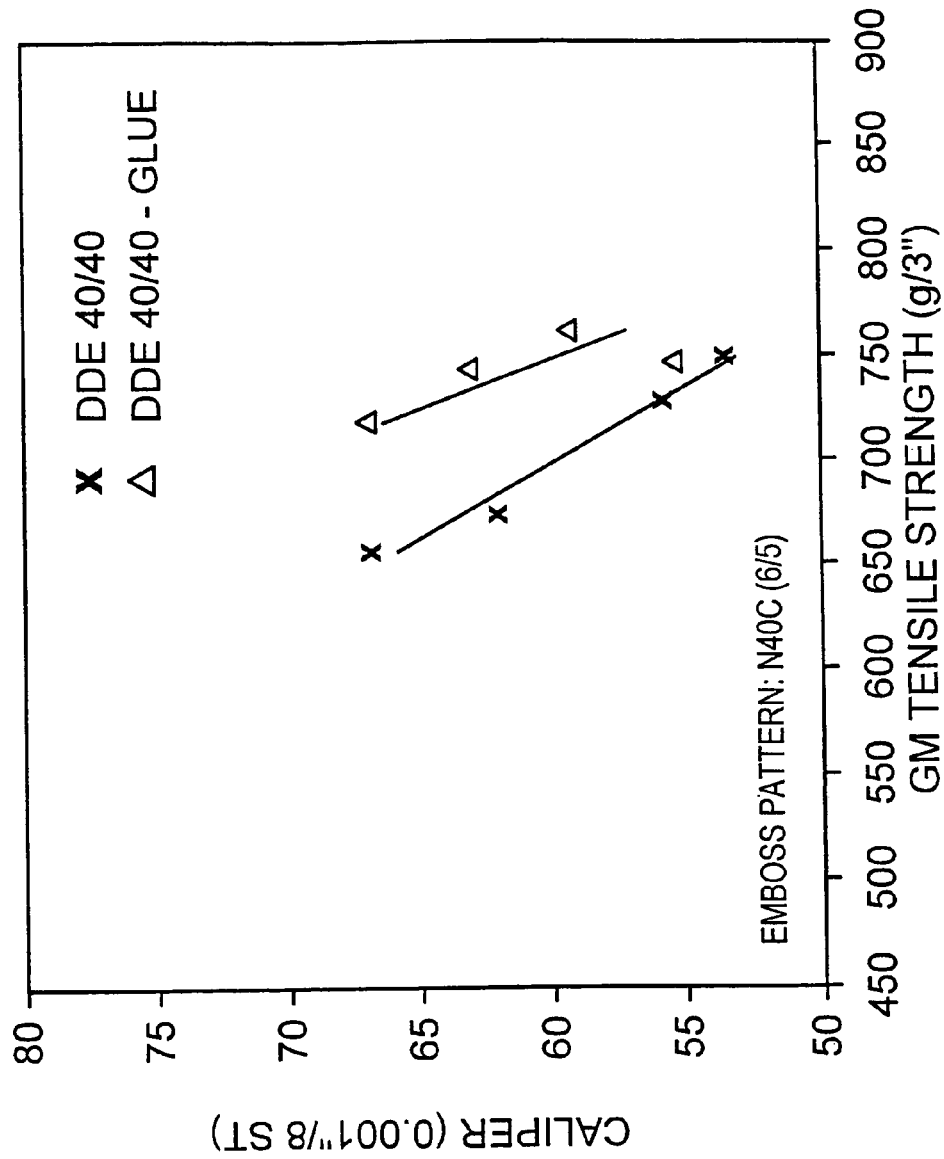
FIG. 30 is a graph of GM tensile strength versus caliper illustrating the effect of adhesive on the tissue product produced using the embossing technique of the present invention.
Figure 31:
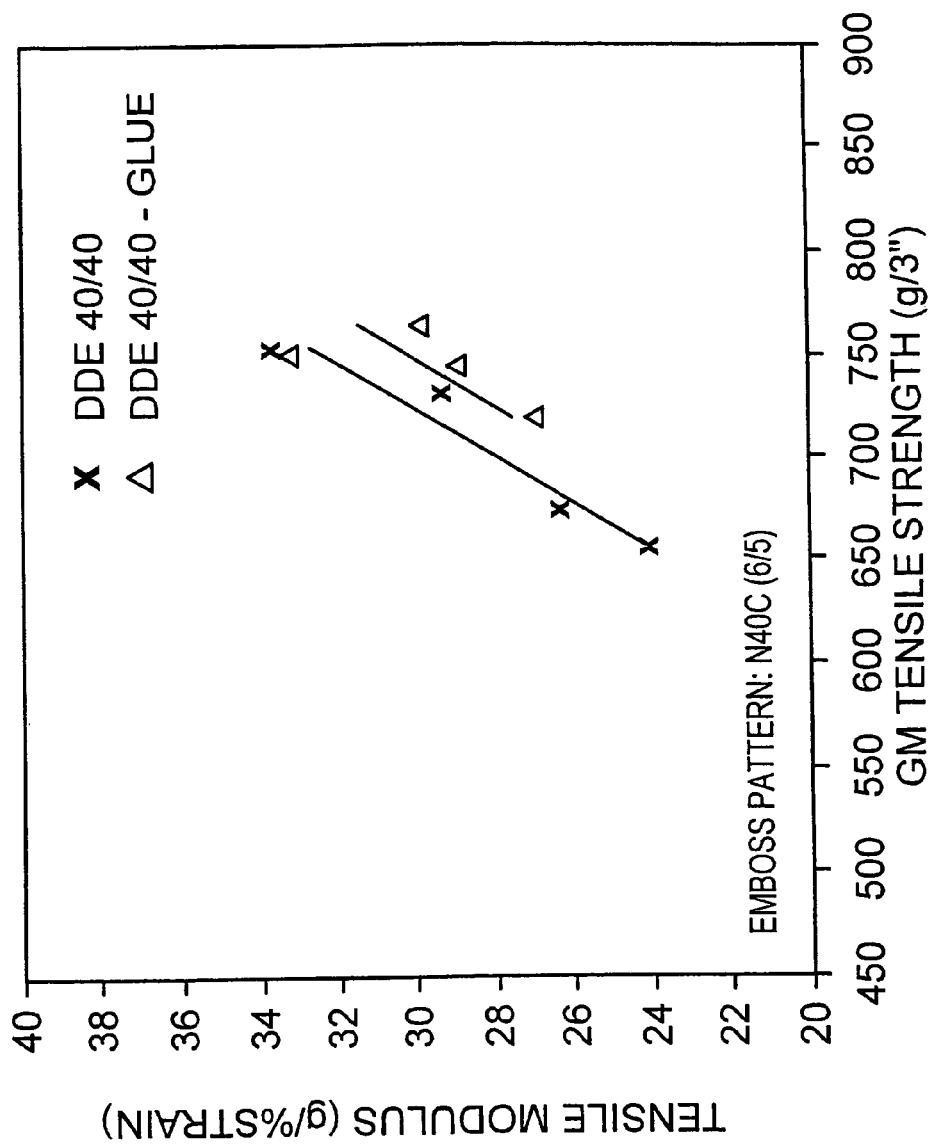
FIG. 31 is a graph of GM tensile strength versus tensile modulus illustrating the effect of adhesive on the tissue product produced in accordance with the embossing technique of the present invention.
Figure 32:
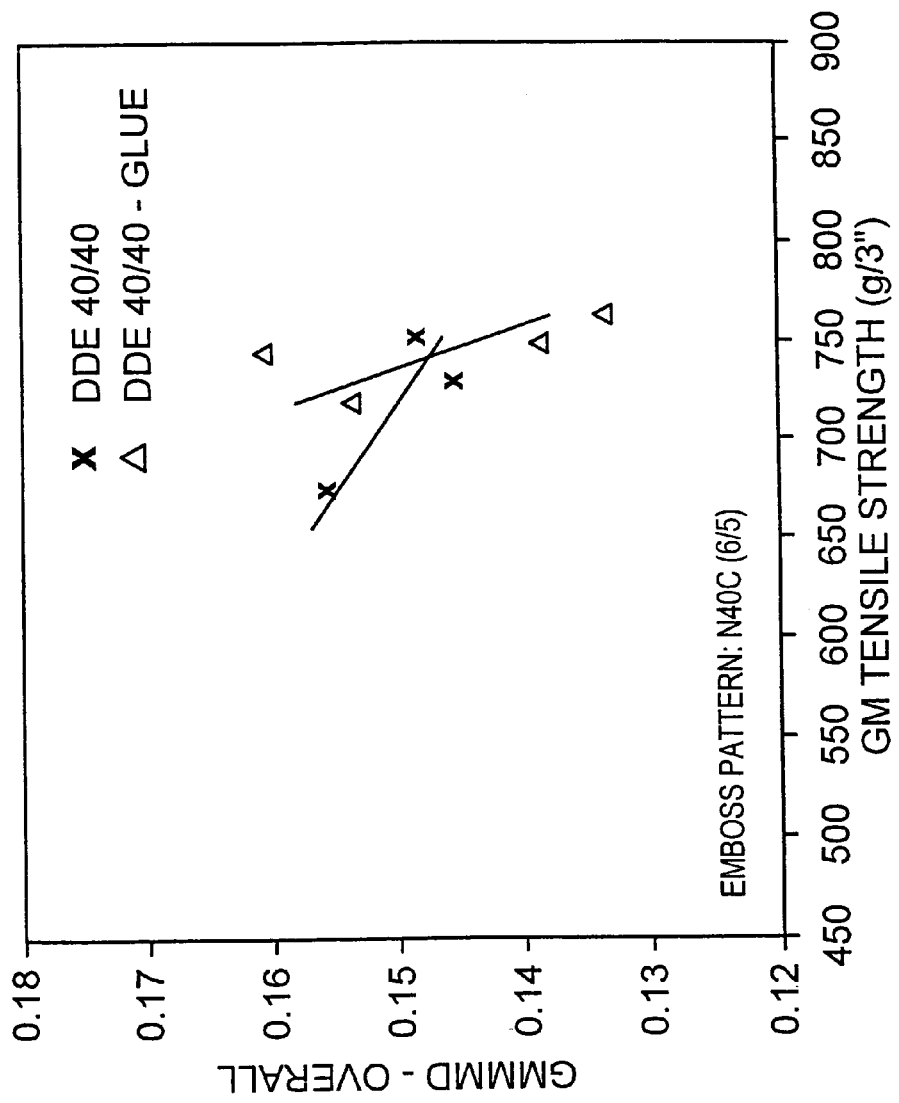
FIG. 32 is a graph of GM tensile strength versus GMMMD illustrating the effect of adhesive on a tissue product produced in accordance with the embossing technique of the present invention.
Figure 33:
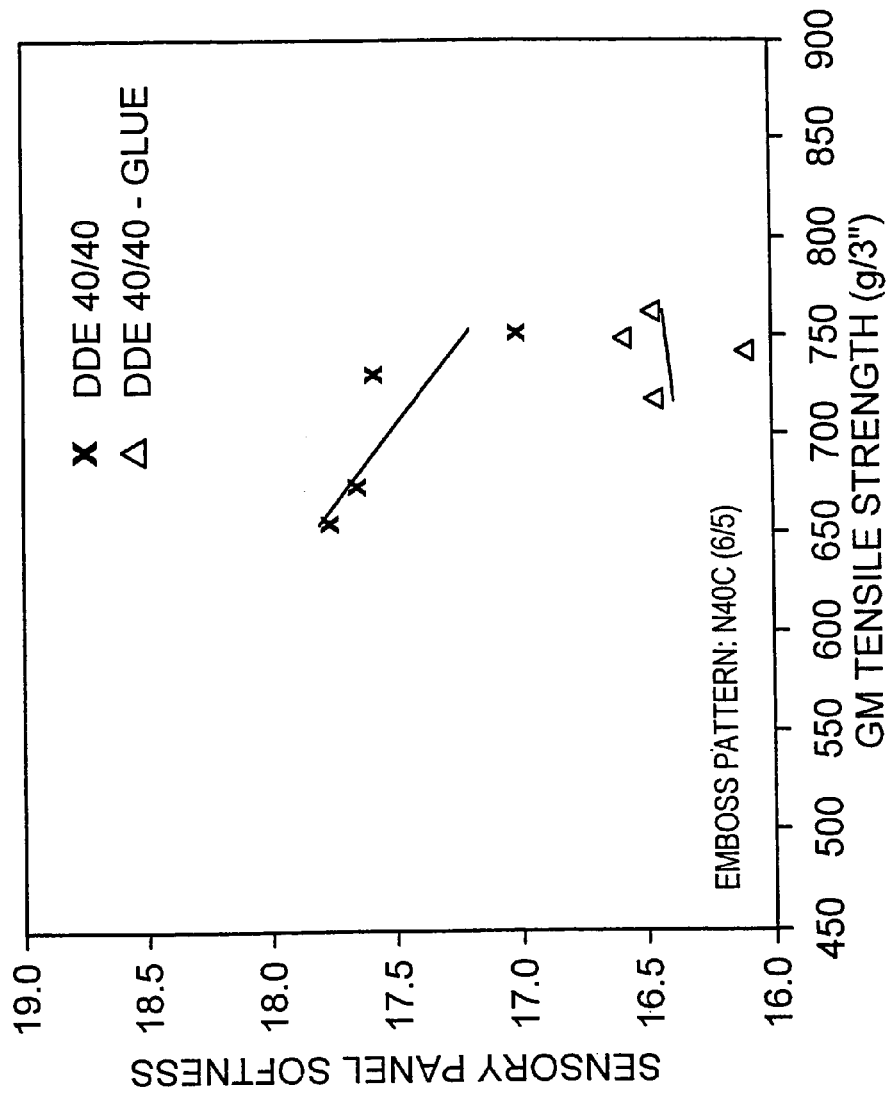
FIG. 33 is a graph of GM tensile strength versus sensory panel softness illustrating the effect of adhesive on a tissue product produced in accordance with the embossing technique of the present invention.

This example illustrates the effect of adhesive on a tissue product converted using the differential depth emboss process. The only difference between Example 14 and Example 15 is the emboss pattern. In this example, an emboss pattern like that shown in FIG. 6A was used. Four different penetration depths were run for each condition. FIG. 30 shows that the adhesive did provide a little advantage for generating bulk. FIG. 31 shows that both differential depth embossing products with and without adhesive applied have a similar tensile modulus at equal GM tensile strength. As the penetration depth increases, the differential depth embossing product without adhesive applied has lower friction as shown in FIG. 32. FIG. 33 shows that the differential depth embossing product without adhesive applied has better softness. The difference in softness value is more than 0.4 units which is significant difference at 95% confidence level. The sensory softness result is consistent with that found in Example 14. Thus, by applying adhesive for running the differential depth embossing process, the tissue softness may be reduced.

EXAMPLE 16

Figure 34:
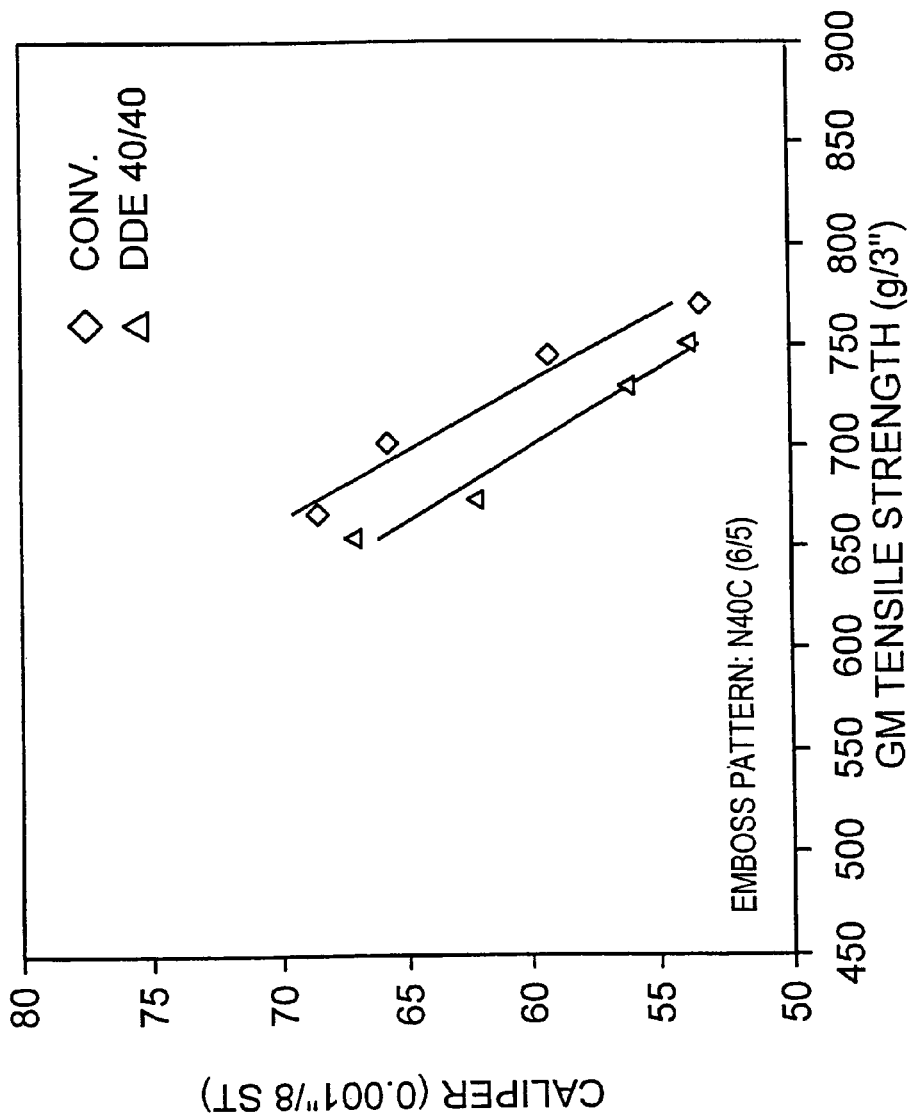
FIG. 34 is a graph of GM tensile strength versus caliper illustrating the effect of the emboss pattern and emboss process of the present invention on a two-ply tissue product.
Figure 35:
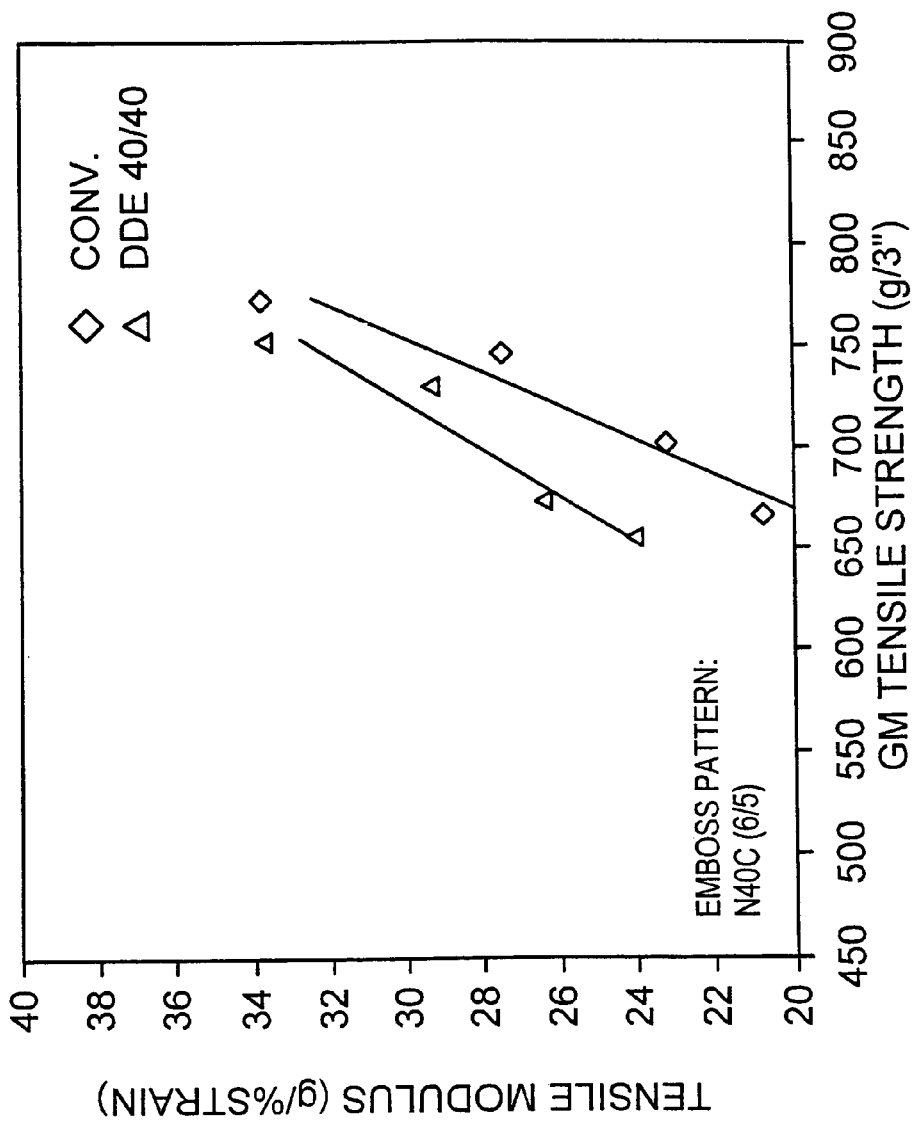
FIG. 35 is a graph of GM tensile strength versus tensile modulus illustrating the effect of the emboss pattern and the emboss process of the present invention on the fabrication of a two-ply tissue product.
Figure 36:
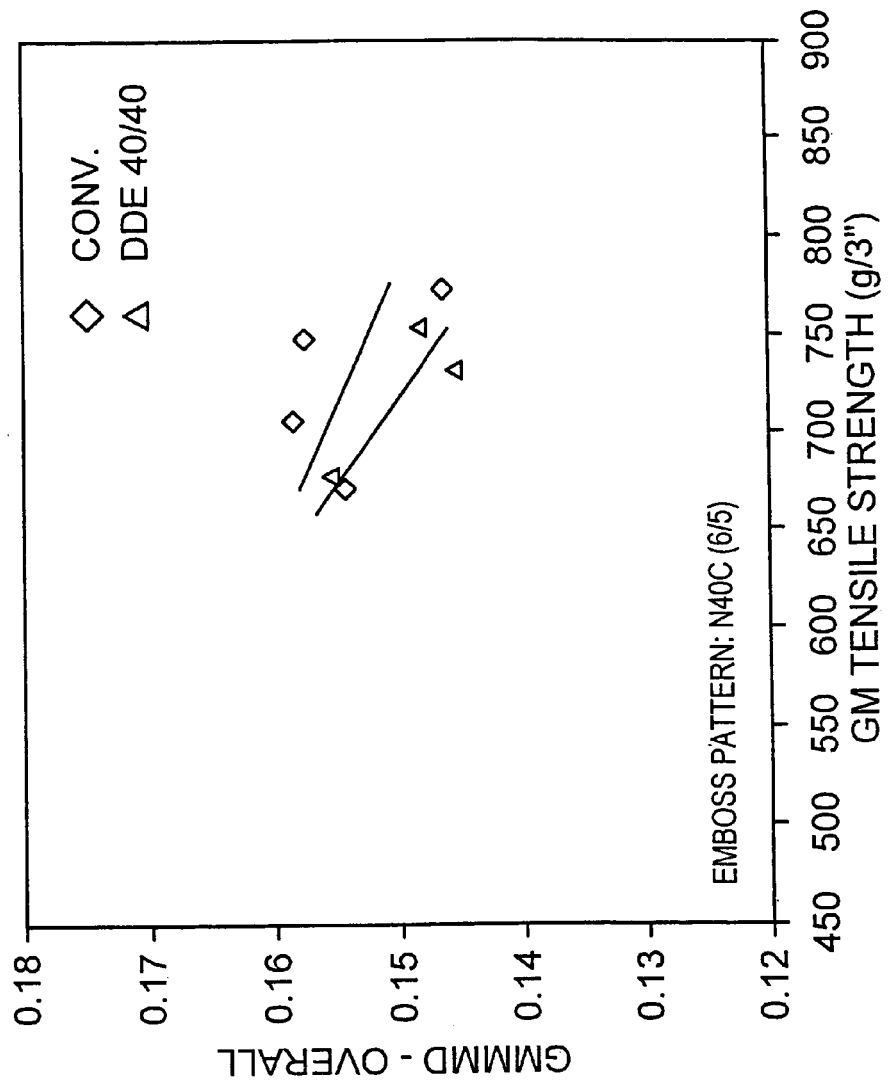
FIG. 36 is a graph of GM tensile strength versus GMMMD illustrating the effect of the emboss pattern and the emboss process of the present invention on fabrication of a two-ply tissue product.
Figure 37:
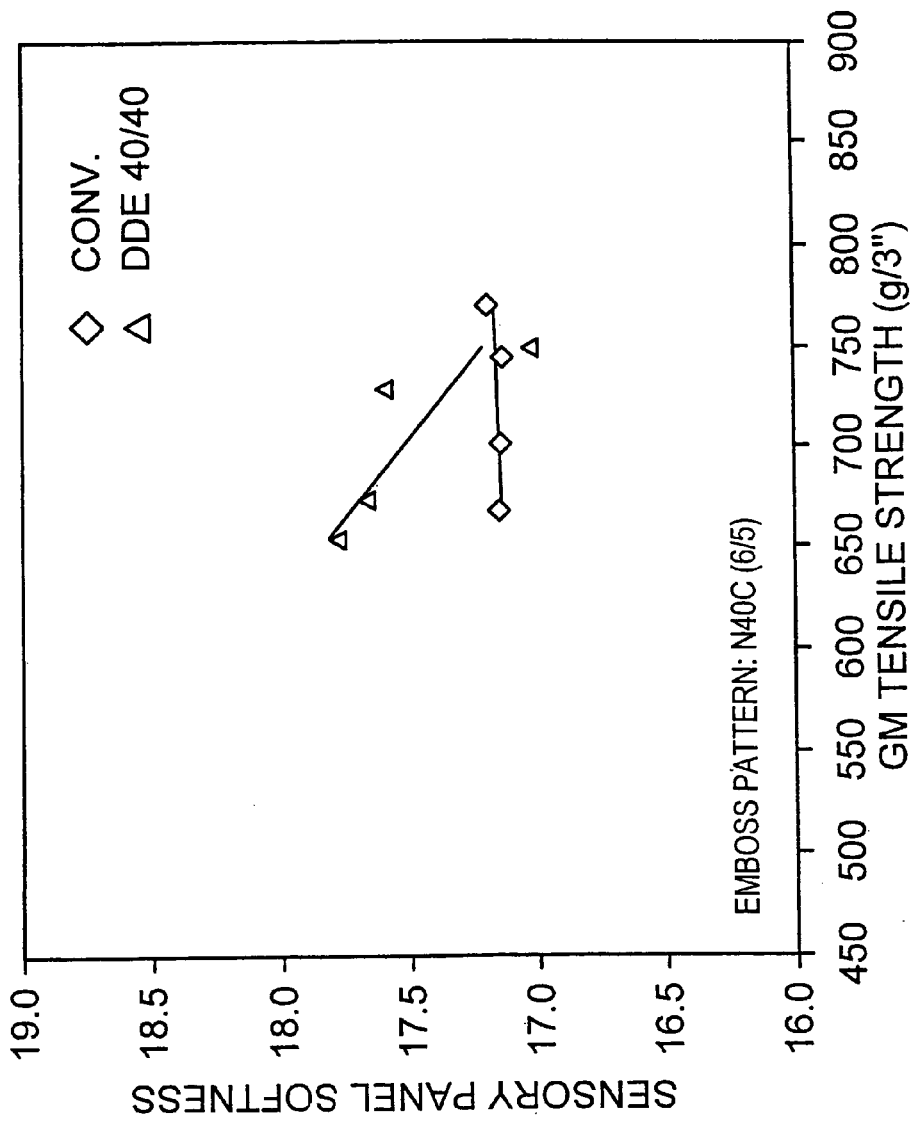
FIG. 37 is a graph of GM tensile strength versus sensory panel softness illustrating the effect of the emboss pattern and the emboss process of the present invention on the fabrication of a two-ply tissue product.

This example presents a comparison between tissue product converted using the differential depth emboss process and that converted using the conventional emboss process. Rubber rolls with 40 Shore Durometer A were used for both processes. The base sheet was similar to that used in Example 12. Four penetration depths were run for each process and the emboss pattern used for each emboss process was similar to that shown in FIG. 6A. The basis weight of the two-ply tissue product was 18 to 20 lbs/3000 square ft. The conventional product has a higher caliper than the differential depth embossing product at equal GM tensile strength as shown in FIG. 34 FIG. 35 shows that the differential depth embossing product has a higher tensile modulus at equal GM tensile strength because of the light emboss at the second nip. FIG. 36 shows that the differential depth embossing product has lower friction at equal GM tensile strength. Compared to the conventional product, the differential depth embossing product has better softness as shown in FIG. 37.

EXAMPLE 17

Figure 38:
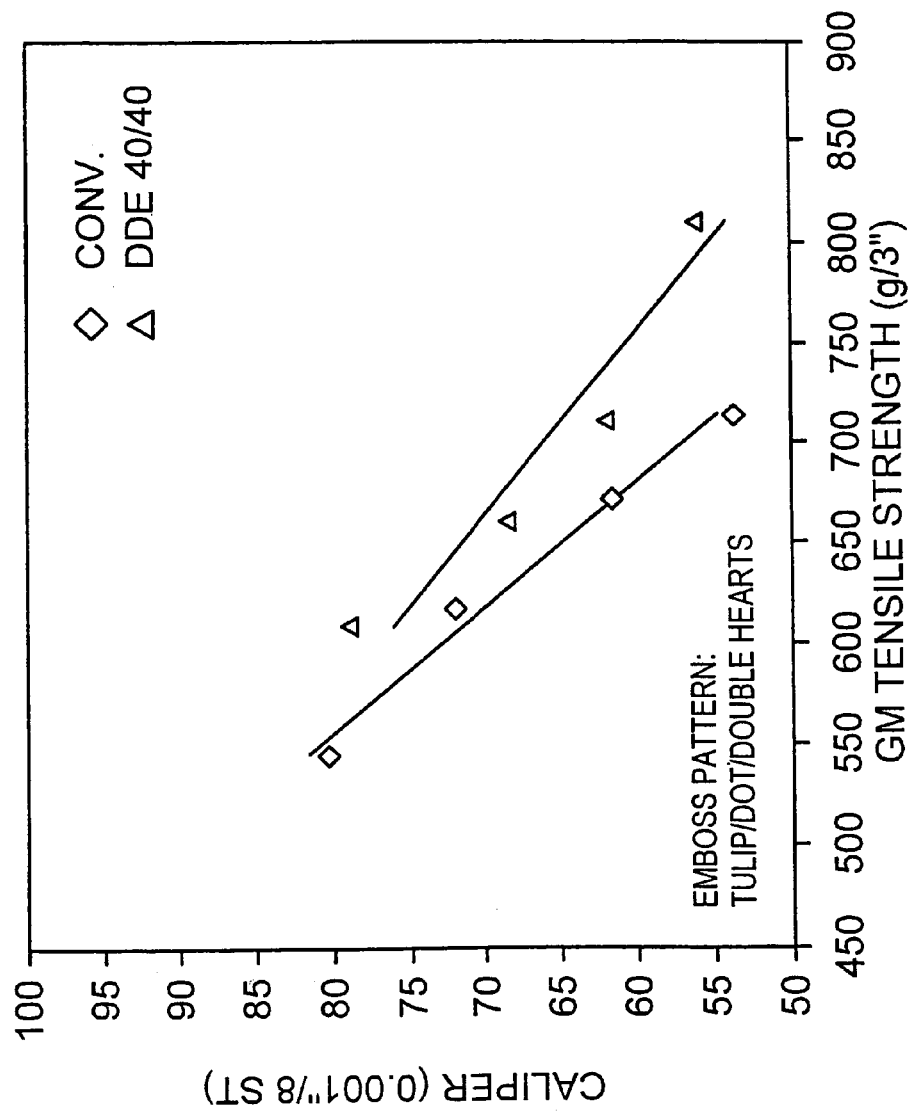
FIG. 38 is a graph of GM tensile strength versus caliper illustrating the effect of emboss pattern on a tissue product produced in accordance with the emboss technique of the present invention.
Figure 39:
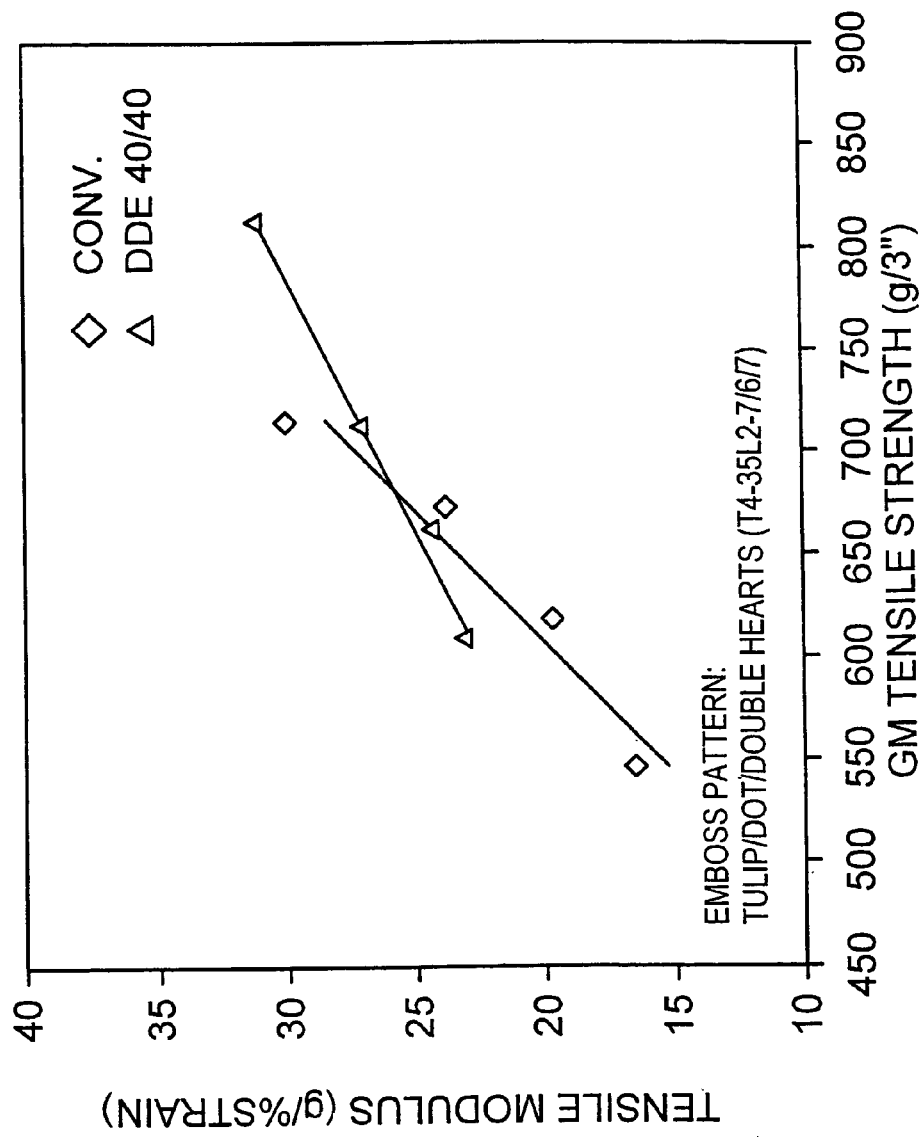
FIG. 39 is a graph of GM tensile strength versus tensile modulus illustrating the effect of the emboss pattern and the emboss process on the fabrication of a two-ply tissue product.
Figure 40:
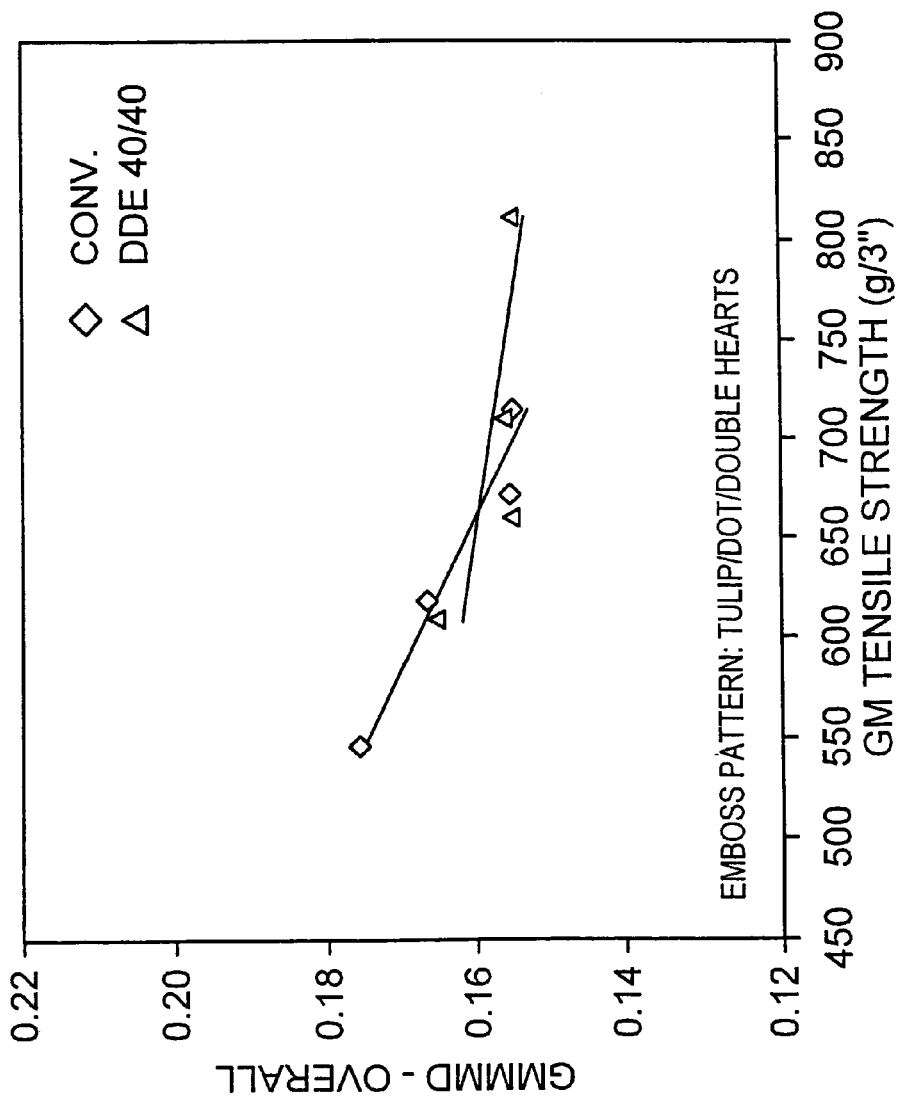
FIG. 40 is a graph of GM tensile strength versus GMMMD illustrating the effect of emboss pattern on a tissue product produced in accordance with the emboss technique of the present invention.
Figure 41:
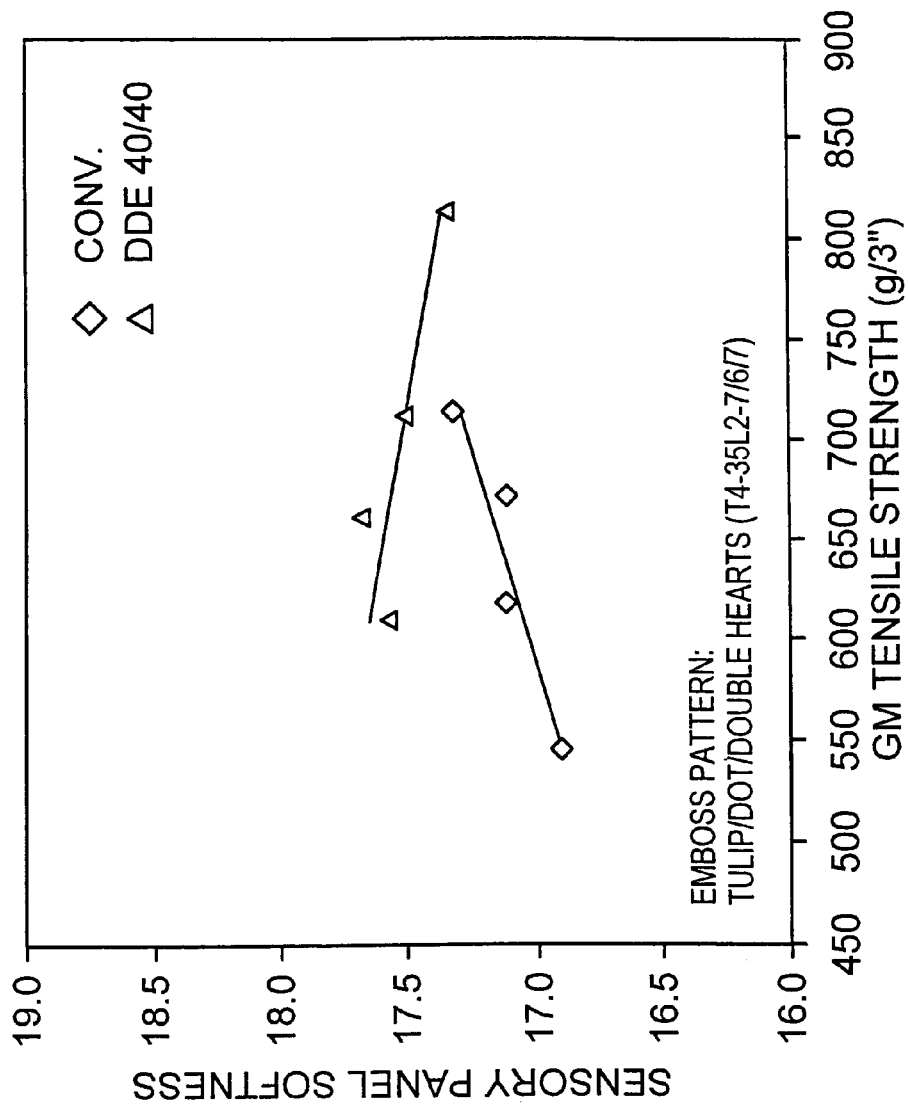
FIG. 41 is a graph of GM tensile strength versus sensory panel softness illustrating the effect of the emboss pattern and the emboss process on the fabrication of a two-ply tissue product.

This example presents a comparison between the differential depth emboss product and the conventional tissue product. The only difference between Example 16 and 17 is the emboss pattern. The emboss pattern shown in FIG. 8 was used in this example. The differential depth embossing product has higher caliper at equal GM tensile strength as shown in FIG. 38. The test results of tensile modulus, friction and sensory softness are plotted in FIGS. 39–41. Compared to Example 16, the results are consistent with the differential depth embossing product having lower friction, higher tensile modulus, and better softness. Although different emboss pattern were used in Examples 16 and 17, the differential depth emboss product always has better softness than the conventional product.

EXAMPLE 18

This example compares the differential depth emboss product and the conventional tissue product. Both products were converted on the commercial machine. Tissue base sheets were made from a furnish containing 30% Southern hardwood kraft, 20% Northern softwood kraft and 50% recycled fibers. Two-ply tissue was converted using the conventional emboss process at a penetration depth 0.047 inches. For the differential depth embossing product, the penetration depth was 0.075 inches for the top ply and then the top and bottom plies were embossed together at a penetration depth of 0.035 inches. The rubber roll hardness used in both processes is 40 Shore Durometer A. Both processes used the same emboss pattern illustrated in FIG. 8. Table 11 below lists the physical properties and sensory softness result. The differential depth embossing product has higher caliper, lower friction, higher tensile modulus and better softness. The difference in softness value is greater than 0.4 units which is significant difference at 95% confidence level. The results for commercially made products are consistent with those observed for pilot products used in Examples 3, 4 and 5.

TABLE 11

Physical Properties of Two-Ply Tissue Products

| | Conventional Emboss Product | Differential Depth Emboss Product (40/40 Sha) |
|---|---|---|
| Pene. Depth (x0.001") | 47 | 75/35 |
| Basis Weight (lbs/ream) | 18.7 | 18.8 |

TABLE 11-continued

Physical Properties of Two-Ply Tissue Products

|  | Conventional Emboss Product | Differential Depth Emboss Product (40/40 Sha) |
|---|---|---|
| Caliper (0.001"/8st) | 72.6 | 73.3 |
| MD Dry Tensile (g/3") | 1065 | 1056 |
| CD Dry Tensile (g/3") | 417 | 405 |
| GM Dry Tensile (g/3") | 666 | 654 |
| Tensile Modulus (g/% strain) | 19.0 | 21.1 |
| Friction | 0.154 | 0.151 |
| Roll Diameter (inch) | 4.2 | 4.19 |
| Roll Compressibility (%) | 19.0 | 21.1 |
| Sensory Softness | 17.16 | 17.72 |

EXAMPLE 19

This example illustrates a comparison between the differential depth emboss product and the conventional tissue product. The differences between Example 18 and Example 19 involve the base sheet and the penetration depth. The basis weight of the tissue base sheet ranges from 11–13 lbs/3000 square feet. Base sheets were made from a furnish containing 60% Northern hardwood kraft and 40% Northern softwood kraft. Two-ply tissue was converted using the conventional emboss process at a penetration depth of 0.057 inches. For the differential depth embossing tissue product, the penetration depth was 0.088 inches for the top ply, and then the top and bottom plies were embossed together at a penetration depth of 0.038 inches. Table 12 below lists the physical properties and sensory softness result. The differential depth embossing product has a higher caliper, lower friction, and better softness. The difference in softness value is greater than 0.4 units which is significant difference at 95% confidence level. Both tissue products have similar tensile modulus value. The sensory softness result is thus consistent with those found in Example 10.

TABLE 12

Physical Properties of Two-Ply Tissue Products

|  | Conventional Emboss Product | Differential Depth Emboss Product (40/80 Sha) |
|---|---|---|
| Pene. Depth (×0.001") | 57 | 88/38 |
| Basis Weight (lbs/ream) | 26.6 | 26.6 |
| Caliper (0.001"/8st) | 102.9 | 106.1 |
| MD Dry Tensile (g/3") | 896 | 868 |
| CD Dry Tensile (g/3") | 346 | 332 |
| GM Dry Tensile (g/3") | 557 | 537 |
| Tensile Modulus (g/% strain) | 13.2 | 13.4 |
| Friction | 0.159 | 0.156 |
| Roll Diameter (inch) | 4.15 | 4.18 |
| Roll Compressibility (%) | 22.2 | 21.1 |
| Sensory Softness | 19.15 | 19.91 |

EXAMPLE 20

Figure 42:
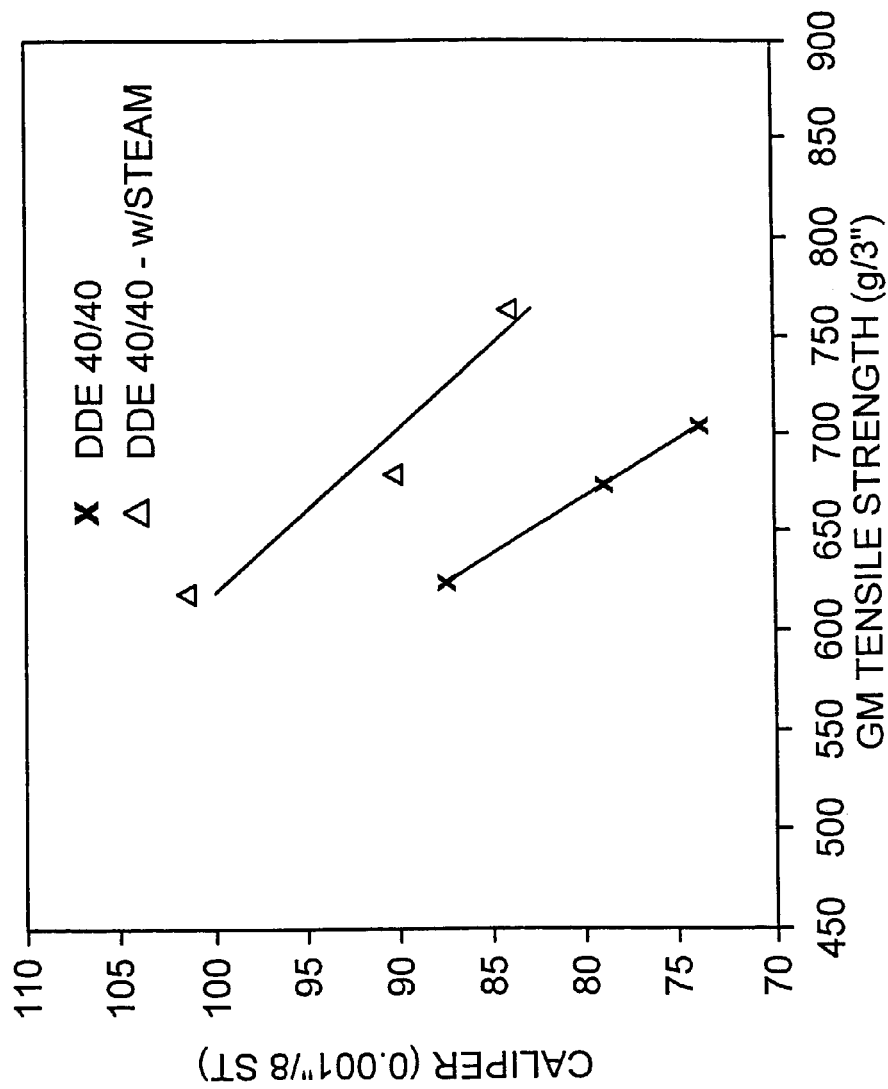
FIG. 42 is a graph of GM tensile strength versus caliper illustrating the effect of steam preconditioning on the production of a two-ply tissue product in accordance with the embossing technique of the present invention.
Figure 43:
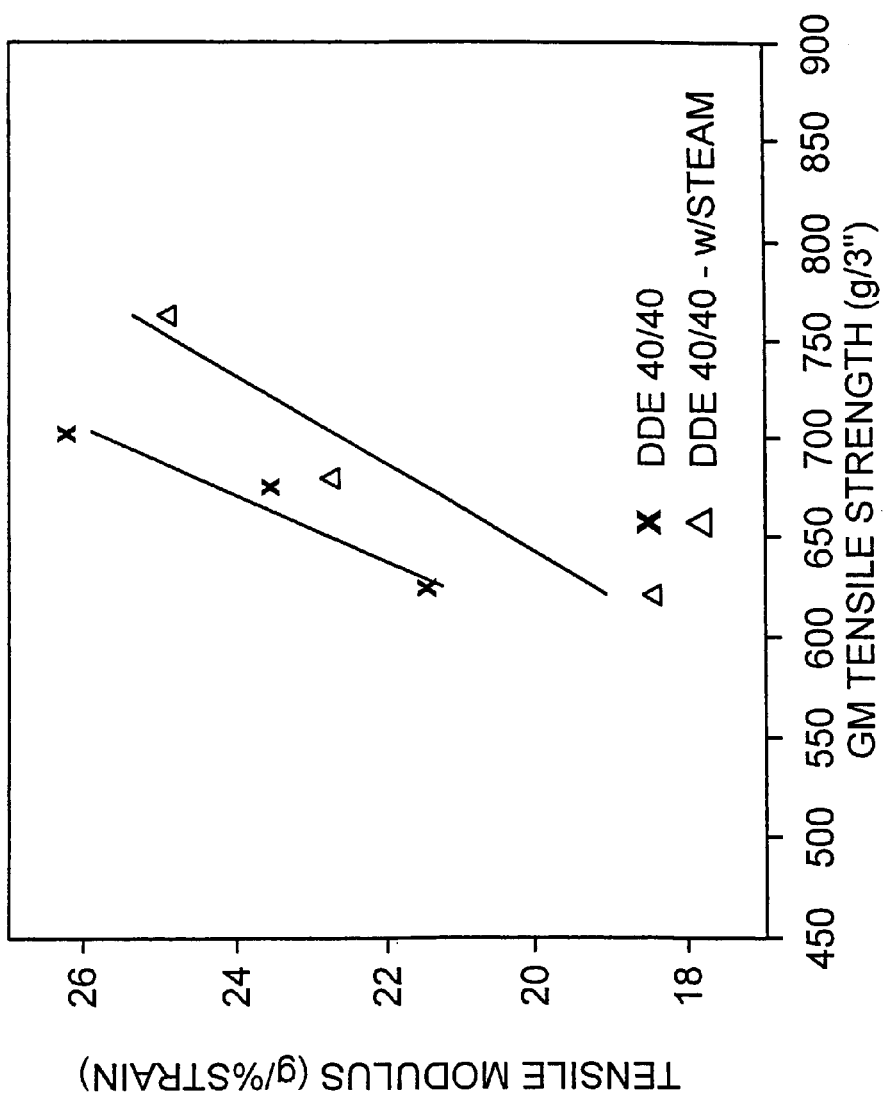
FIG. 43 is a graph of GM tensile strength versus tensile modulus illustrating the effect of steam preconditioning on the fabrication of a two-ply tissue product in accordance with the embossing technique of the present invention.
Figure 44:
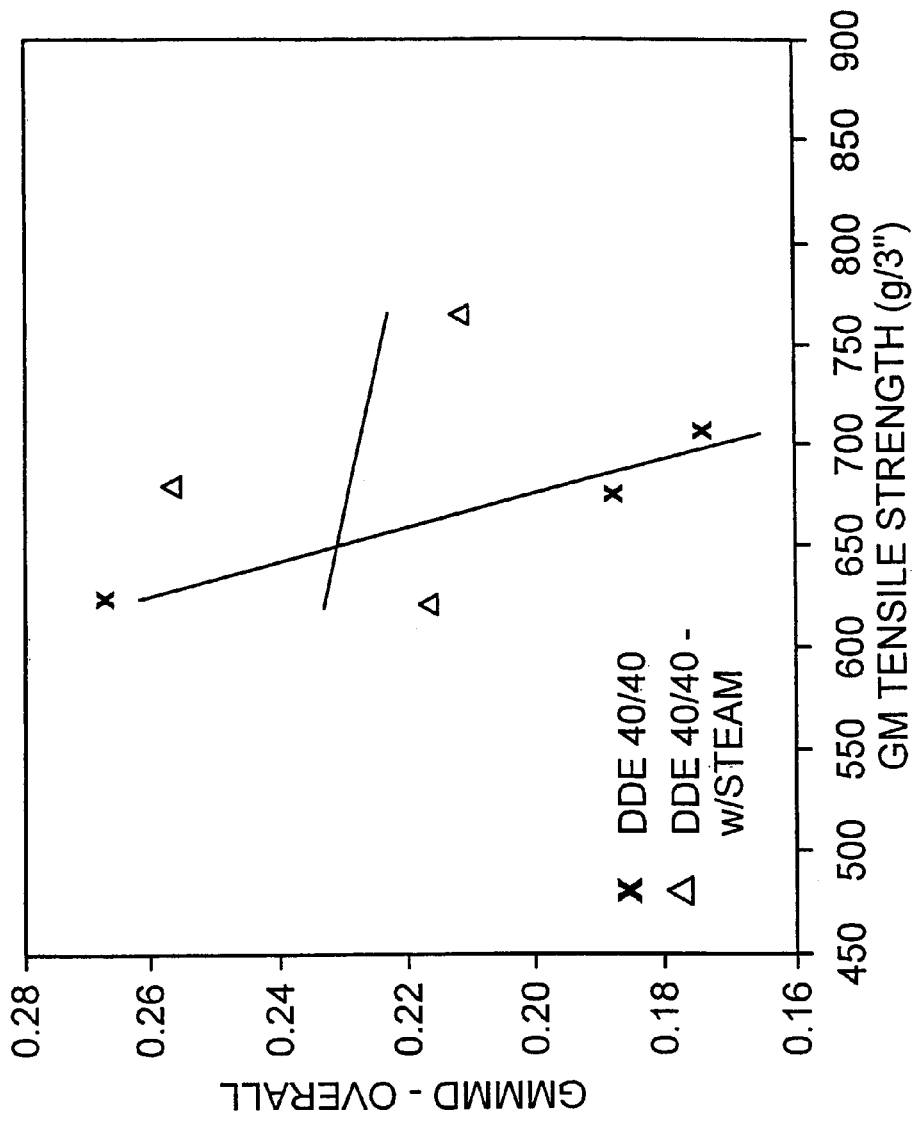
FIG. 44 is a graph of GM tensile modulus versus GMMMD illustrating the effect of steam preconditioning on the fabrication of a two-ply tissue product produced using the embossing technique of the present invention.

This example illustrates the effect of steam preconditioning on two-ply tissue converted using the differential depth emboss process. Base sheets were made from a furnish containing 35% Northern hardwood kraft and 65% Northern softwood kraft. The emboss pattern shown in FIG. 8 was used in this example. The base sheets were converted using the differential emboss process with steam preconditioning at both nips as shown in FIG. 5. The set-up was substantially the same as that shown in FIG. 5. Three penetration depths were run for each condition. Compared to the differential depth embossing product without steam preconditioning, the differential depth embossing product with steam preconditioning has a much higher caliper and lower tensile modulus at equal GM tensile strength as shown in FIGS. 42 and 43. FIG. 44 shows that the effect of friction on both products are not obvious. The friction for the differential depth embossing product with steam preconditioning is quite variable as shown in FIG. 44. Running the differential depth emboss process with steam preconditioning can provide two-ply tissue with more bulk and lower modulus which can improve tissue softness.

EXAMPLE 21

Figure 45:
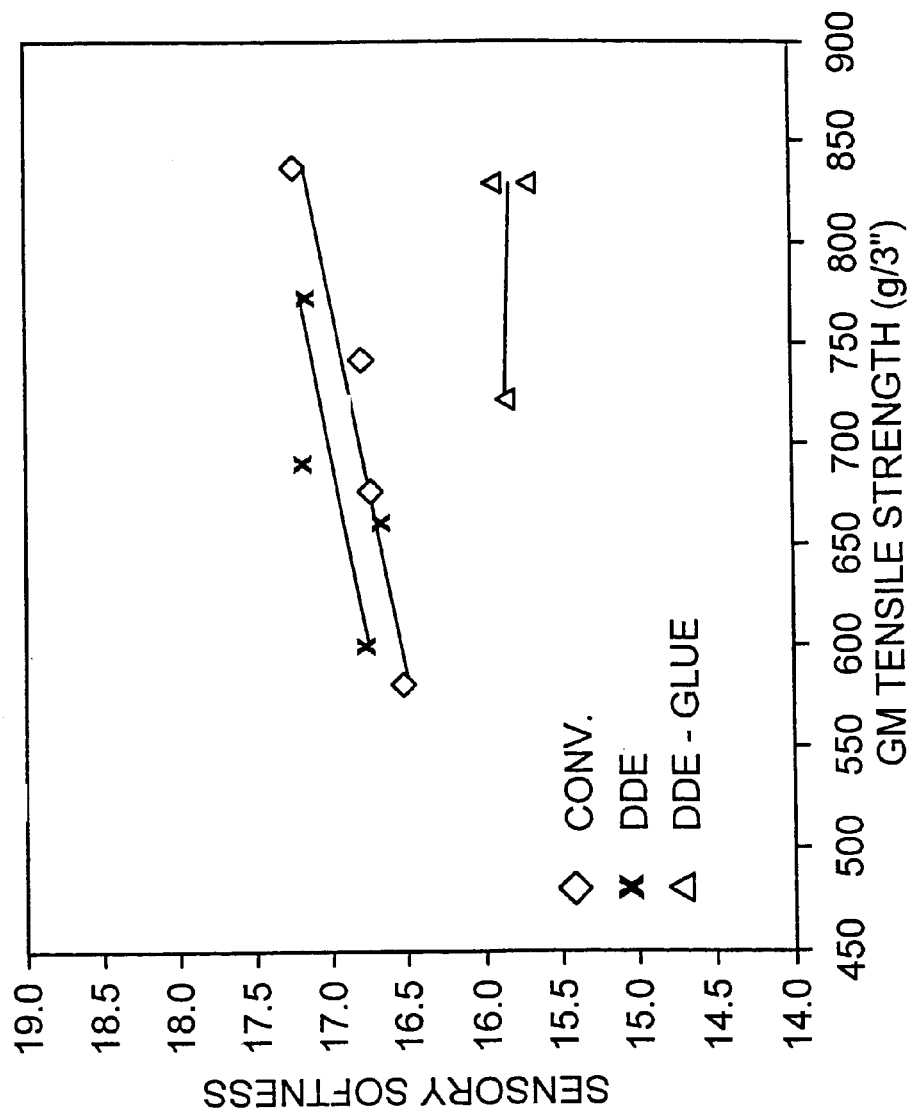
FIG. 45 is a graph of GM tensile strength versus sensory softness illustrating the effect of the emboss pattern used in the prior art on a two-ply tissue product using various emboss.
Figure 46:
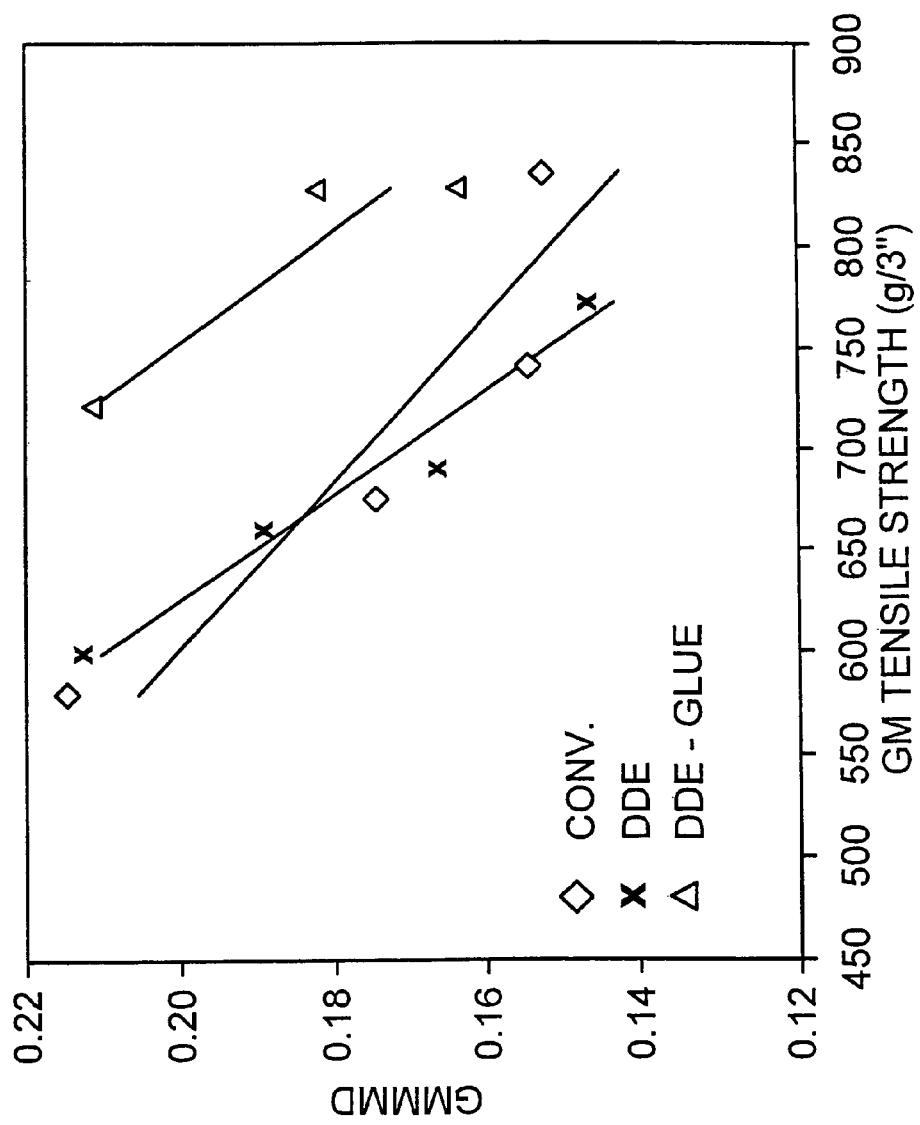
FIG. 46 is a graph of GM tensile strength versus GMMMD illustrating the effect of the emboss pattern used in the prior art on the production of a two-ply tissue product using different emboss techniques.
Figure 47:
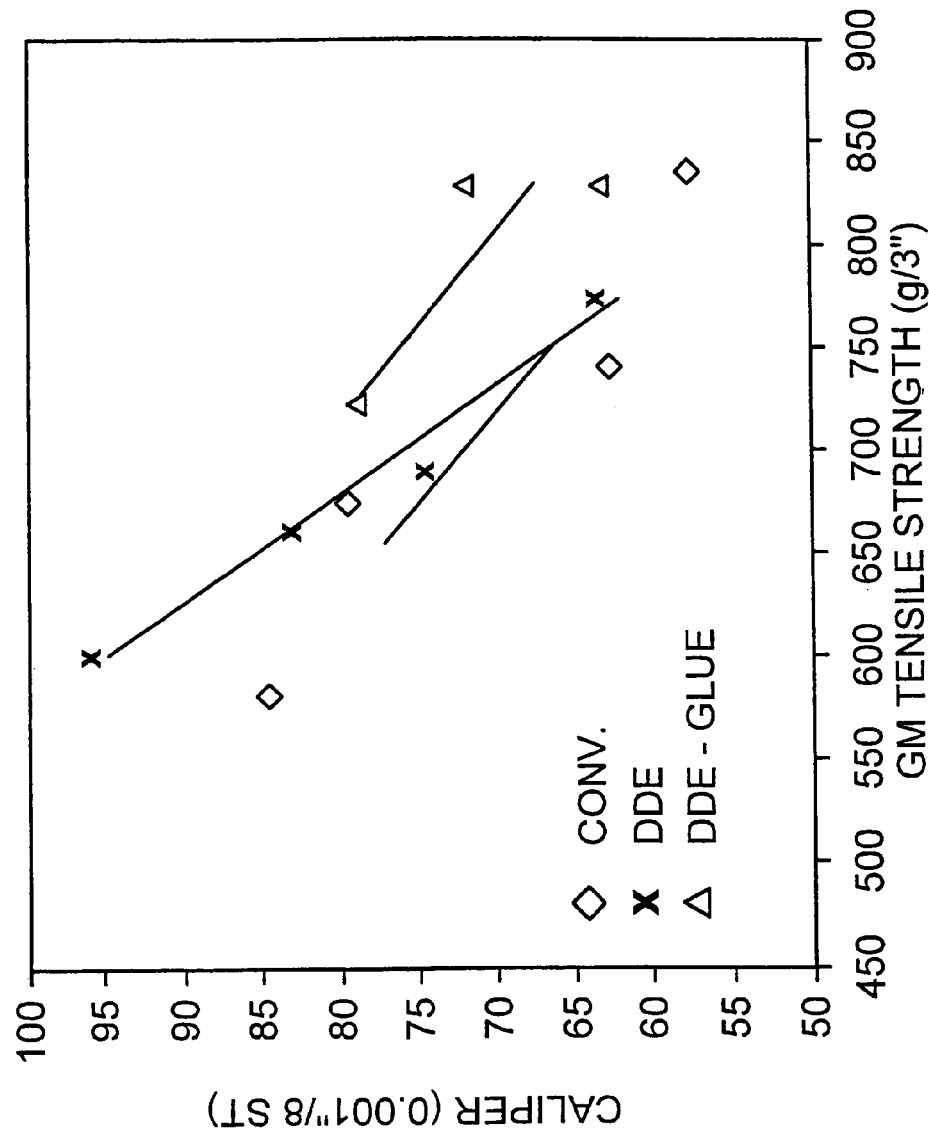
FIG. 47 is a graph of GM tensile strength versus caliper illustrating the effect of the emboss pattern used in the prior art on the fabrication of a two-ply tissue product using different emboss techniques.
Figure 48:
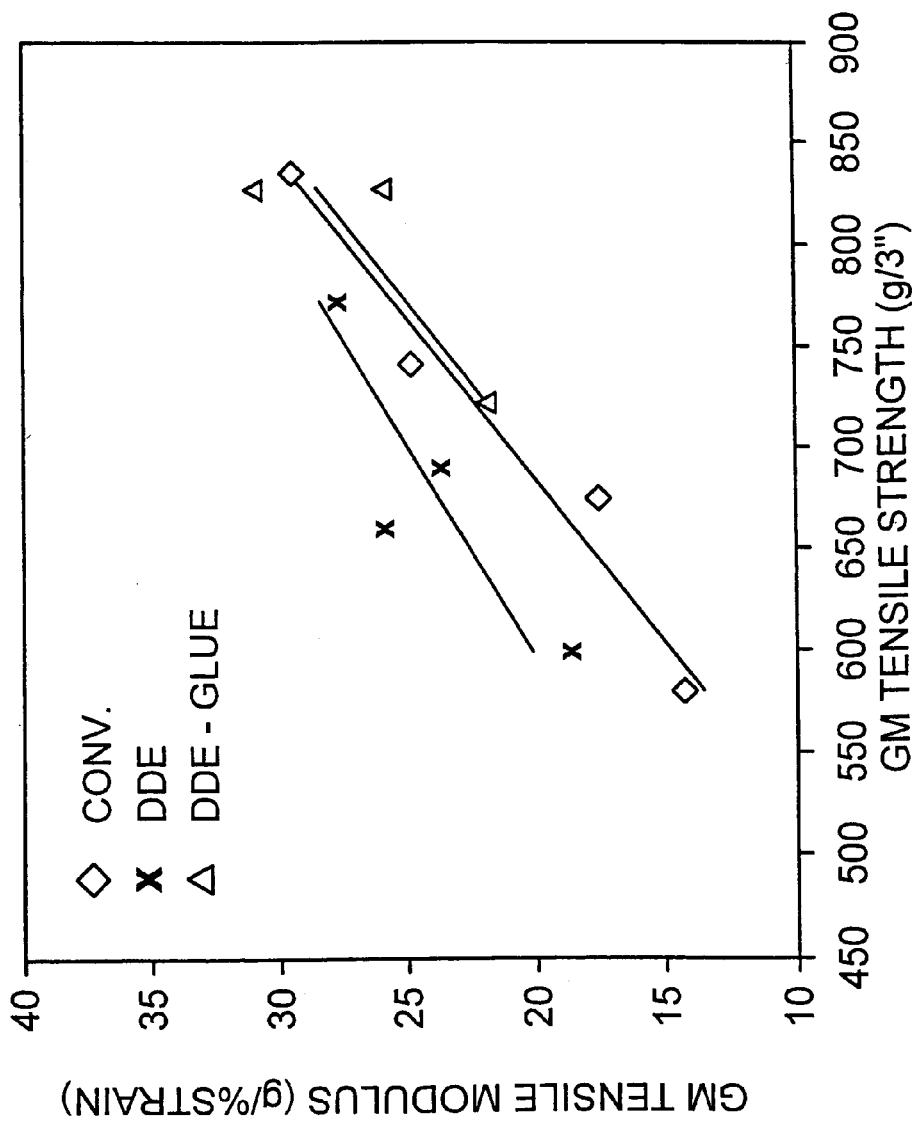
FIG. 48 is a graph of GM tensile strength versus GM tensile modulus illustrating the effect of the emboss pattern used in the prior art on the fabrication of a two-ply tissue product using different emboss techniques.

This example provides a comparison between the differential depth embossing product and the conventional product converted using the emboss pattern described in U.S. Pat. No. 3,708,366. A base sheet similar to that used in Example 17 was converted to 2-ply tissue using the differential depth embossing process and the conventional emboss process. Each process was run at four penetration depths. The effect of adhesive on the differential depth embossing product was also studied. The sensory softness test result is plotted in FIG. 45. The difference in softness value between the differential depth embossing product and the conventional product is less than 0.4 units which is significant difference at 95% confidence level. In the previous examples, the differential depth embossing product always possessed better softness and 0.4 units or more higher than the conventional product. The differential depth embossing product with adhesive applied has lower softness value than the differential depth embossing product without adhesive applied. The aforementioned result is consistent with the results observed in Example 13. Applying adhesive when running the differential depth emboss process decreases tissue softness. The physical attributes are measured and plotted in FIGS. 46–48. FIG. 46 shows no significant difference between the differential depth embossing product and the conventional product. In previous examples, the differential depth embossing product had lower friction than the conventional product. Thus, as can be seen, improving tissue softness requires not only the differential depth emboss process but also a specific emboss pattern as described above.

Table 13 below sets forth a comparison of the aspect ratio of the three emboss patterns shown in FIGS. 6A, 7 and 8 as well as the emboss pattern described in U.S. Pat. No. 3,708,366. The table also sets forth a comparison of the sensory softness for tissue embossed using differential depth embossing as well as the conventional process for each of the emboss patterns.

TABLE 13

Comparison between The Current Invention and The Prior Art

| Emboss Pattern | Aspect Ratio (Length/Width) | Radius (×0.001") | Sensory Softness (DDE) | Sensory Softness (Conv.) |
|---|---|---|---|---|
| FIG. 8 emboss design | 4.01 | 10 | 17.6 | 17.2 |
| FIG. 7 emboss design | 5.08 | 10 | 18.1 | 17.0 |

TABLE 13-continued

Comparison between The Current Invention and The Prior Art

| Emboss Pattern | Aspect Ratio (Length/Width) | Radius (×0.001") | Sensory Softness (DDE) | Sensory Softness (Conv.) |
|---|---|---|---|---|
| FIG. 6A emboss design | 6.58 | 10 | 17.8 | 17.1 |
| Prior art emboss design embodied in U.S. Pat. No. 3,708,366 | 1.0 | 5 | 16.9 | 16.7 |

It is apparent from the foregoing that utilizing the differential depth embossing technique with a known emboss pattern such as that described in U.S. Pat. No. 3,708,366 does not improve sensory softness. It is only when the differential depth embossing technique is combined with the unique emboss patterns having the characteristics described above and illustrated by way of example in the drawing figures that an improvement in sensory softness is achieved.

Figure 50:
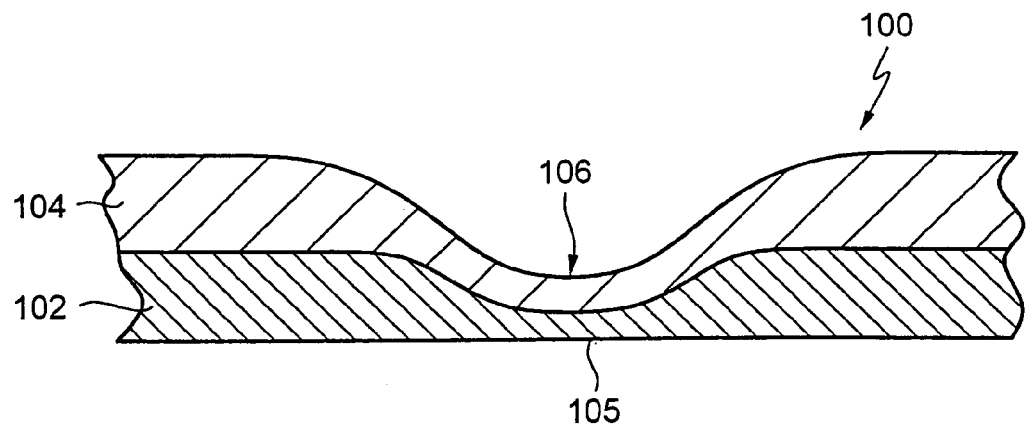
FIG. 50 is an enlarged cross-sectional view of a portion of a multi-ply product produced using the apparatus shown in FIG. 49.

The embodiment of the present invention described above involves treatment of the paper product utilizing an embossing technique. However, a different type of paper treatment can also be utilized to apply a marking to the paper having the characteristics shown in FIGS. 6A, 7 and 8. For example, a debossing paper treatment can be employed to produce a multi-ply paper product as shown in FIG. 50. The multi-ply paper product 100 includes at least two plies 102, 104. The two plies 102, 104 are bonded or connected together by the pattern 106 that is impressed upon the multi-ply paper product. The pattern 106 that is impressed upon the multi-plies 102, 104 advantageously has the shape and characteristics of any one of the emboss patterns described above and illustrated in FIGS. 6A, 7 and 8. The impressed pattern is applied to the paper product so one surface 105 of the paper product is essentially flat and the other is impressed with the pattern 106.

Figure 49:
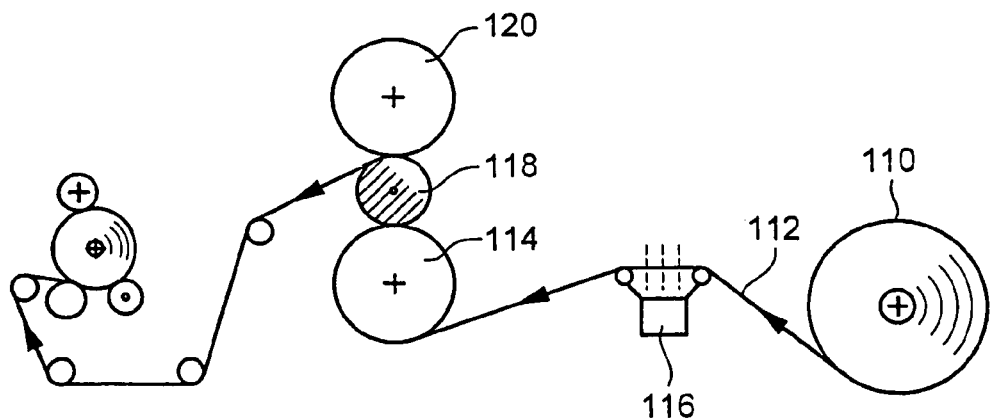
FIG. 49 is a schematic illustration of an apparatus used to impress a pattern on a multi-ply paper product in accordance with another aspect of the invention.

The multi-ply paper product 100 shown in FIG. 50 can be produced using an apparatus similar to that shown in FIG. 49. The apparatus includes an unwind roll 110 on which is wound a multi-ply paper product such as tissue 112. As the sheet passes from the unwind roll 110 to a first receiving roll 114, the multi-ply paper product 112 can be brought into contact with water. The water can be applied to the sheet 112 in the form of steam by passing the sheet 112 over a tank 116 containing water that is heated to a temperature greater than or equal to the boiling point of water. Steam is thus released from the tank and comes into contact with the surface of the sheet 112. The amount of steam applied can vary, although it is preferably less than approximately 3% by weight of the sheet 112, more preferably less than 2% by weight. The small amount of water in the form of steam that is applied to the sheet constitutes a preparatory step for the next step in the formation of the impressed pattern on the multi-ply sheet that is designed to considerably improve the quality of the impressed pattern. In this regard, the steam has an advantageous affect on the definition and uniformity of the pressed pattern. Of course, liquid can be applied to the sheet 112 in forms other than steam, such as, for example, by spraying fine droplets.

The sheet 112 is conveyed to the first receiving roll 114, and is then passed between the first receiving roll 114 and a steel engraved roll 118. The steel engraved roll 118 is a hard and non-deformable roll. The first receiving roll 114 is substantially elastic. The sheet 112 then makes a second pass between the engraved roll 118 and a second receiving roll 120. The second receiving roll 120 is preferably substantially elastic.

The engraved roll 118 can be heated, preferably to a temperature lying within the range of approximately 50° C.–100° C., or preferably approximately 75° C. It has been found that the combination of the application of water in the form of steam and the use of a heated engraved roll provides an advantageous impressed pattern upon the multi-ply sheet 100 shown in FIG. 50.

The first and second receiving rolls 114, 120 possess a high hardness, greater than Shore-D 80 and preferably greater than Shore-D 90.

Figure 51:
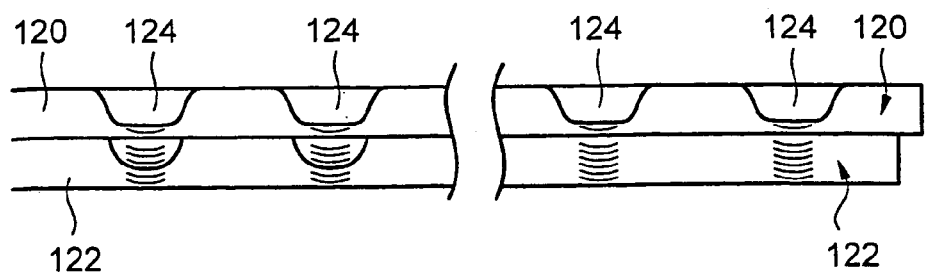
FIG. 51 is an enlarged cross-sectional view of a portion of another multi-ply product produced in accordance with the present invention.

FIG. 51 illustrates a slightly different two-ply paper product in which a pattern is impressed upon the two-ply paper product in a slightly different manner from that described above. Once again, the impression or marking that is applied to the paper product advantageously possesses the shape and characteristics of any one of the embossed patterns described above and illustrated in FIGS. 6A, 7 and 8.

As seen in FIG. 51, the paper product includes two plies 120, 122. The sheet is provided with a series of impressed regions 124 having the shape and characteristics of any one of the embossed patterns described above and illustrated in FIGS. 6A, 7 and 8. The sheet is produced by passing the two-ply paper product through a nip formed between an engraved roll and a back up roll. As the two plies 120, 122 pass into the nip, portions of the two-ply paper product corresponding to the projections on the engraved roll are impressed. This compression causes the cellulosic fibers in the two plies 120, 122 to become intermingled and connected with one another.

Figure 52:
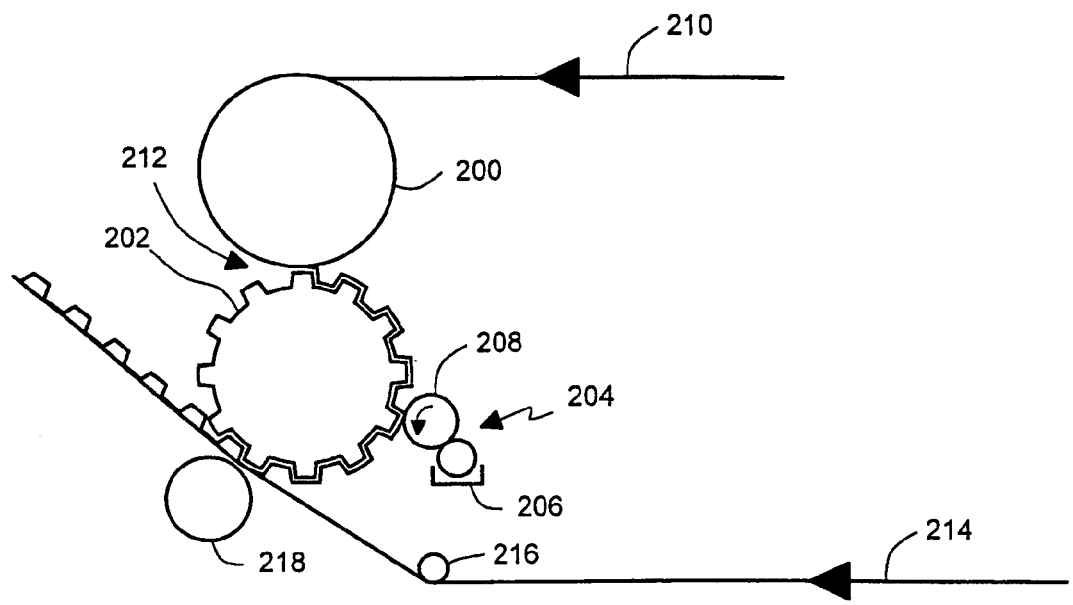
FIG. 52 is a schematic illustration of an apparatus used to produce a two-ply tissue product having a heavily embossed pattern in accordance with another aspect of the invention.
Figure 53:
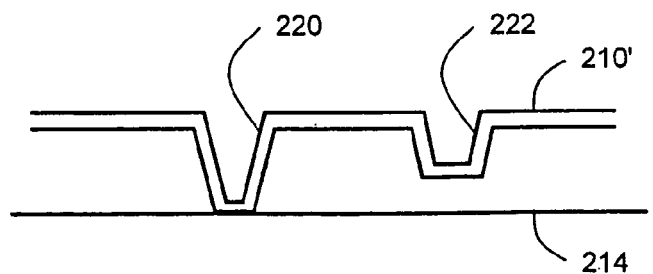
FIG. 53 is a side view of a portion of a tissue product having a different depth or double depth emboss pattern.

Another aspect of the present invention illustrated in FIGS. 52 and 53 relates to a different process for producing for producing a two-ply tissue. This method involves the production of a tissue having a heavily embossed pattern, but which is not perceived as being rough to the consumer. Referring to FIG. 52, a rubber roll 200 is positioned in abutting relation to a steel engraving roll 202. An adhesive applying device 204 is positioned adjacent the steel engraving roll 202. The adhesive applying device 204 includes an adhesive supply 206 and a rotatable application roller 208.

A base sheet or substrate 210 is conveyed around the rubber roll 200 and then enters a nip 212 between the rubber roll 200 and the steel engraved roll 202. The rubber roll 200 presses the base sheet 210 into the pattern formed on the engraved steel roll 202 to produce the desired embossing pattern. The rubber roll 200 can be a relatively soft rubber having a low durometer to thereby impart a heavy boss to the base sheet 210. As the base sheet 210 is conveyed around the outer surface of the steel engraved roll 202, the backside of the embossed base sheet 210 passes by the adhesive application roller 208 which applies adhesive only to the protuberances or nips on the back of the heavily embossed sheet.

As the embossed base sheet 210 is being conveyed, an essentially or substantially flat backing sheet 214 is conveyed past a roller 216 and then into engagement with the back surface of the embossed base sheet 210. As a result, the backing sheet 214 is adhered to the embossed base sheet 210. A marrying roll 218 is preferably provided adjacent the outer surface of the steel engraved roll 202 to facilitate adherence between the two sheets 210, 214. Because the adhesive is only applied to the nips or projections on the embossed sheet 210, the flat backing sheet 214 is adhered to the embossed base sheet 210 only at those places. This selective positioning of the adhesive is advantageous from the standpoint of not excessively interfering or hindering the perceived softness of the resulting sheet. At the same time, the perceived strength of the sheet is increased significantly.

It is also possible with this method to improve the perceived quilted appearance of the resulting product by making it appear puffier. This can be achieved by utilizing mismatch in the stretch between the two sheets 210, 214. This mismatch in the stretch of the two sheets can be achieved or controlled by controlling the relative feed rates of the two sheets, so that one sheet is fed at a faster rate than the other.

In the resulting product, the protuberances or nubs on the backside of the heavily embossed sheet 210 are masked or covered by the substantially flat un-embossed backing sheet. The perceived softness of the resulting two-ply tissue is thus improved. This method also makes it possible to easily color decorate the resulting tissue product by using colored adhesive to join the sheets.

A further advantage associated with this method is illustrated in FIG. 53. In this variation, dual depth embossing is employed. With dual depth embossing, some of the embossments 220 are deeper than other embossments 222. This could be easily achieved by appropriately configuring the outer surface of the steel engraved roll 202. In addition to different depth embossing, the different depth embossments 220, 222 can be of a different configuration to impart an attractive appearance to the finished tissue product. For example, the deeper embossments 220 can be in the form of tulip-shaped embossments while the shallower embossments 222 can be dot-shaped embossments.

A further refinement provided by the variation shown in FIG. 53 is that adhesive can be applied even more selectively to only portions of the backing side of the embossed sheet 210'. That is, through use of an adhesive application device such as that shown in FIG. 52, adhesive is applied to only the longest protuberances or nubs forming a part of the embossed pattern. Thus, adhesive is only applied in very small selected areas between the two sheet 210', 214 so as not to significantly interfere with the perceived softness of the resulting sheet, while at the same time allowing realization of an increase in the perceived strength of the resulting sheet.

Figure 54:
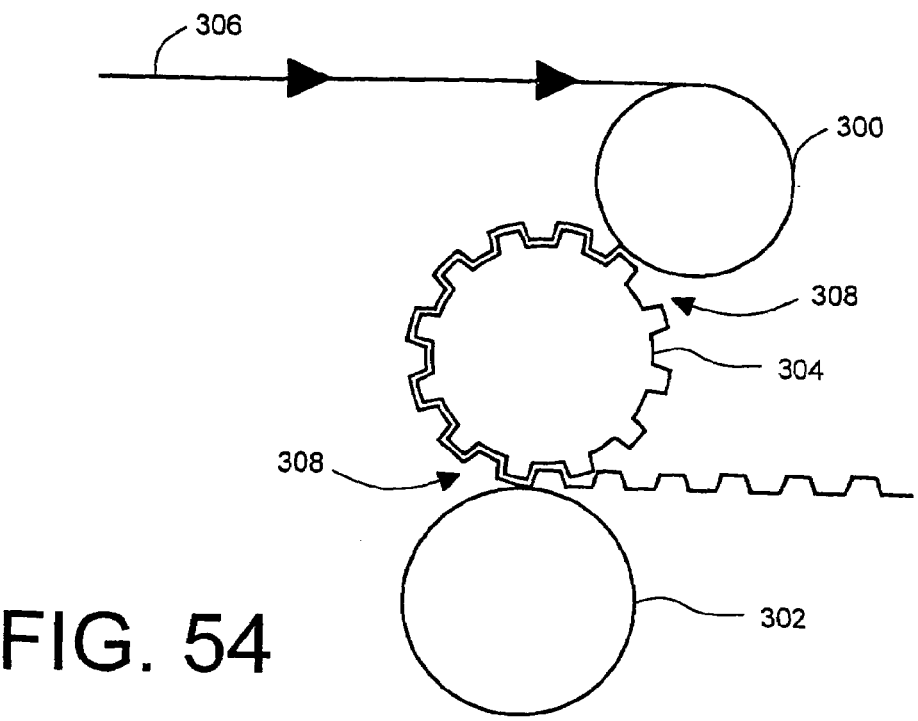
FIG. 54 is a schematic illustration of an apparatus used to produce a one ply tissue product in accordance with another aspect of the invention.
Figure 55:
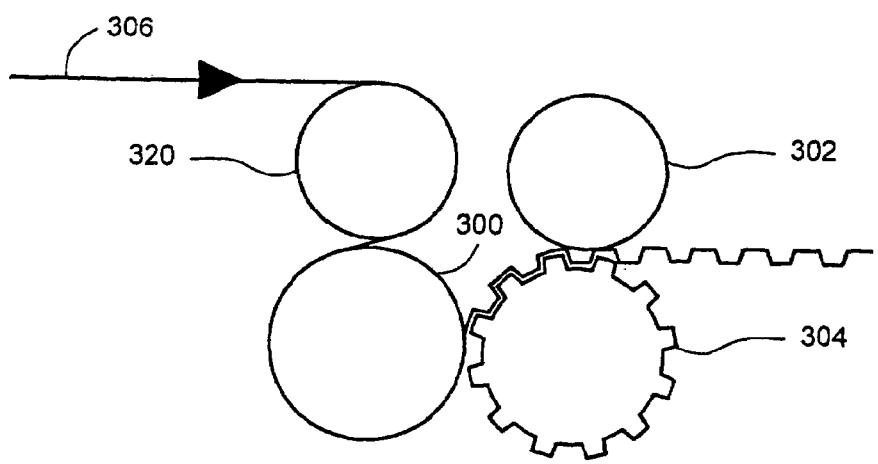
FIG. 55 is a schematic illustration of an apparatus used to produce a one ply tissue product in accordance with another aspect of the invention.

Another aspect of the present invention illustrated in FIGS. 54 and 55 relates to a different process for producing a single ply tissue having a one-sided finished product appearance. In accordance with this aspect of the present invention, double nip embossing is carried out through use of one steel roll and two rubber rolls possessing different durometer or hardness characteristics. As illustrated in FIG. 54, the arrangement for producing double nip embossing on the same steel engraved roll includes a first rubber roll 300, a second rubber roll 302 and a steel engraved roll 304 located between the first and second rubber rolls 300, 302. The first rubber roll 300 and the second rubber roll 302 possess different hardness or durometer characteristics. The first rubber roll 300 is made of a rubber material possessing relatively medium durometer characteristics while the second rubber roll 302 is made of a rubber possessing relatively soft durometer characteristics. Both the first and second rubber rolls 300, 302 engage the steel engraved roll 304 and press against the steel engraved roll. The steel engraved roll 304 is preferably engraved so that between 5% and 50% of its exterior surface constitutes an indented pattern while the remaining portion is not indented.

As further illustrated in FIG. 54, a single base sheet or substrate 306 is conveyed around the exterior surface of the first rubber roll 300 and is then conveyed into the nip 308 between the first rubber roll 300 and the steel engraved roll 304. As the substrate 306 is conveyed into the nip 308, the first rubber roll 300 starts forming the base sheet or substrate 306 around the protruding elements of the steel engraved roll 304 or presses the base sheet 306 into the indented portions of the steel engraved roll 304.

The base sheet 306 continues to be conveyed along the rotating exterior surface of the steel engraved roll 304 and then enters a second nip 310 formed between the second rubber roll 302 and the steel engraved roll 304. Because the second rubber roll 302 is made of a softer rubber material having a lower durometer, the rubber will flow more deeply into the steel engraved roll 304. The embossed sheet exiting the second nip 310 will possess a one-sided appearance.

The use of this arrangement involving two rubber-to-steel nips improves the softness perception of the resulting tissue product, imparts more bulk to the resulting tissue product, contributes to providing a tissue product having a better appearance, and creates a truer looking one-sided tissue product.

A variation on the arrangement shown in FIG. 54 is illustrated in FIG. 55 and involves the use of the first rubber roll 300, the second rubber roll 302, and the steel engraved roll 304. In addition, a third rubber roll 320 is employed and is positioned adjacent the first rubber roll 300. Thus, the same effects and advantages discussed above in connection with the arrangement shown in FIG. 54 are achieved. In addition, the inclusion of the third rubber roll 320 provides a rubber-to-rubber station that imparts additional calendering and softness treatment to the base sheet 306.

It is thus possible in accordance with this aspect of the present invention to produce a one ply embossed tissue having a one-sided finished product appearance. The first rubber roll is designed to emboss in a way that begins to set the desired pattern while the softer second rubber roll causes the sheet to flow deeper into the indented pattern on the engraved roll, thus developing the one-sidedness required and desired for a premium single ply product.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

The invention claimed is:

1. A multi-ply tissue comprising:
a first cellulosic embossed ply having an emboss pattern applied over from three to twelve percent of its surface to a depth of at least about thirty thousandths of an inch; and
a second cellulosic embossed ply of tissue, the depth of emboss applied to said second ply being no more than about 80% of the depth of emboss applied to said first ply;
said first ply being contact laminated to said second ply, the primary adhesion between the plies of tissue being the result of contact between cellulosic fibers rather than through an intermediate adhesive, the first and second plies contacting one another in contact areas, the contact areas between said first and second plies defining compliant voids, the total contact area being no more than about fifteen percent of the area of the tissue sheets.

2. The multi-ply tissue according to claim 1, wherein the contact areas between the first ply and the second ply are elongated contact areas.

3. The multi-ply tissue according to claim 1, wherein the contact areas between the first ply and the second ply are rounded.

4. The multi-ply tissue according to claim 1, wherein the emboss patterns on the first and second plies are formed by emboss elements possessing an aspect ratio greater than 1.

5. The multi-ply tissue according to claim 1, wherein the emboss pattern on the first and second plies are formed by emboss elements possessing an aspect ratio greater than 5.

* * * * *